(12) United States Patent
Pivovar et al.

(10) Patent No.: US 10,790,514 B2
(45) Date of Patent: Sep. 29, 2020

(54) PLATINUM NICKEL NANOWIRES AS OXYGEN REDUCING ELECTROCATALYSTS AND METHODS OF MAKING THE SAME

(71) Applicant: Alliance for Sustainable Energy, LLC, Golden, CO (US)

(72) Inventors: Bryan Pivovar, Arvada, CO (US); Shaun Alia, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 817 days.

(21) Appl. No.: 14/932,740

(22) Filed: Nov. 4, 2015

(65) Prior Publication Data

US 2016/0126562 A1    May 5, 2016

Related U.S. Application Data

(60) Provisional application No. 62/075,109, filed on Nov. 4, 2014.

(51) Int. Cl.
| | | |
|---|---|---|
| *B22F 9/24* | (2006.01) | |
| *B22F 9/20* | (2006.01) | |
| *B22F 9/18* | (2006.01) | |
| *B22F 1/00* | (2006.01) | |
| *H01M 4/92* | (2006.01) | |

(Continued)

(52) U.S. Cl.
CPC ........... *H01M 4/921* (2013.01); *B22F 1/0044* (2013.01); *B22F 9/18* (2013.01); *B22F 9/20* (2013.01); *B22F 9/24* (2013.01); *B82Y 40/00* (2013.01); *H01M 4/9041* (2013.01); *B22F 2201/013* (2013.01); *B22F 2201/03* (2013.01); *B22F 2301/15* (2013.01); *B22F 2301/25* (2013.01); *B22F 2304/05* (2013.01); *B82Y 30/00* (2013.01)

(58) Field of Classification Search
CPC ...... B22F 1/0025; B22F 1/004; B22F 1/0044; B22F 2001/0029; B22F 9/16; B22F 9/18; B22F 9/20; B22F 9/22; B22F 9/24; B22F 9/26; B22F 2201/013; B22F 2304/05; B22F 2304/052; B22F 2304/054; B22F 2304/056; B22F 2304/058; B22F 2301/15; B22F 2301/25; B22F 2201/03
See application file for complete search history.

(56) References Cited

U.S. PATENT DOCUMENTS

| | | |
|---|---|---|
| 6,815,391 B2 | 11/2004 | Xing et al. |
| 7,638,431 B2 | 12/2009 | Yasseri et al. |

(Continued)

FOREIGN PATENT DOCUMENTS

| | | |
|---|---|---|
| WO | WO 2007/100811 A2 | 9/2007 |
| WO | WO 2007/100811 A3 | 9/2007 |

(Continued)

OTHER PUBLICATIONS

Printout of the dates of the 224th ECS (The Electrochemical Society) Meeting in San Francisco, California, held on Oct. 27-Nov. 1, 2013. (Year: 2013).*

(Continued)

Primary Examiner — Vanessa T. Luk
(74) Attorney, Agent, or Firm — Michael A. McIntyre

(57) ABSTRACT

Aspects disclosed herein relate to methods for producing nanostructured metal catalysts that can be used in various alternative fuel applications.

15 Claims, 37 Drawing Sheets

(51) Int. Cl.
H01M 4/90 (2006.01)
B82Y 40/00 (2011.01)
B82Y 30/00 (2011.01)

(56) References Cited

U.S. PATENT DOCUMENTS

| | | | | |
|---|---|---|---|---|
| 2004/0231462 | A1* | 11/2004 | Shiraishi | B22F 1/0018 75/348 |
| 2006/0135359 | A1 | 6/2006 | Adzic et al. | |
| 2009/0220835 | A1* | 9/2009 | Yushan | C22C 5/04 429/532 |
| 2010/0099012 | A1 | 4/2010 | Adzic | |
| 2011/0197710 | A1* | 8/2011 | Sun | B22F 9/24 75/351 |
| 2013/0177838 | A1* | 7/2013 | Wang | B01J 23/52 429/524 |
| 2013/0260282 | A1* | 10/2013 | Yan | H01M 4/92 429/487 |
| 2015/0017570 | A1* | 1/2015 | Yang | H01M 4/926 429/523 |

FOREIGN PATENT DOCUMENTS

| | | |
|---|---|---|
| WO | WO 2012/009467 A1 | 1/2012 |
| WO | WO 2012/064768 A2 | 5/2012 |
| WO | WO 2013/103420 A2 | 7/2013 |

OTHER PUBLICATIONS

Melinda Mohl, Dorina Dobo, Akos Kukovecz, Zoltan Konya, Krisztian Kordas, Jinquan Wei, Robert Vajtai, Pulickel Ajayan, "Formation of CuPd and CuPt Bimetallic Nanotubes by Galvanic Replacement Reaction," The Journal of Physical Chemistry C, 2011, 115, pp. 9403-9409 plus supporting info (5 pages). (Year: 2011).*

Alia et al., "Porous Platinum Nanotubes for Oxygen Reduction and Methanol Oxidation Reactions", Advanced Functional Materials, 2010, vol. 20, No. 21, pp. 3742-3746.

Alia et al., "Platinum-Coated Palladium Nanotubes as Oxygen Reduction Reaction Electrocatalysts", ACS Catalysis, 2012, vol. 2, No. 5, pp. 858-863.

Alia et al., "Platinum Coated Nickel Nanowires as Oxygen Reducing Electrocatalysts", Abstract #1308, 224th ECS Meeting, 2013, The Electrochemical Society, p. 1.

Alia et al., "Platinum-Coated Copper Nanowires with High Activity for Hydrogen Oxidation Reaction in Base", Journal of the American Chemical Society, 2013, vol. 135, No. 36, pp. 13473-13478.

Alia et al., "Platinum Coated Copper Nanowires and Platinum Nanotubes as Oxygen Reduction Electrocatalysts", ACS Catalysis, 2013, vol. 3, No. 3, pp. 358-362.

Alia et al., "Nickel Nanowire Oxidation and Its Effect on Platinum Galvanic Displacement and Methanol Oxidation", ECS Transactions, 2014, vol. 64, No. 3, pp. 89-95.

Alia et al., "Platinum-Coated Nickel Nanowires as Oxygen-Reducing Electrocatalysts", ACS Catalysis, 2014, vol. 4, No. 4, pp. 1114-1119.

Alia et al., "Galvanic Displacement as a Route to Highly Active and Durable Extended Surface Electrocatalysts", Catalysis Science & Technology, 2014, vol. 4, pp. 3589-3600.

Ashley et al., "Sampling and Analysis of Soluble Metal Compounds", NIOSH Manual of Analytical Methods, Mar. 15, 2003, pp. 167-178.

Borup et al., "Scientific Aspects of Polymer Electrolyte Fuel Cell Durability and Degradation", Chemical Reviews, 2007, pp. 3904-3951.

Chen et al., "Supportless Pt and PtPd Nanotubes as Electrocatalysts for Oxygen-reduction Reactions", Angewandte Chemie, May 2007, vol. 46, No. 22, pp. 4060-4063.

Chen et al., "Highly Crystalline Multimetallic Nanoframes with Three-Dimensional Electrocatalytic Surfaces", Science, Mar. 2014, vol. 343, No. 6177, pp. 1339-1343.

Cui et al., "Octahedral PtNi Nanoparticle Catalysts: Exceptional Oxygen Reduction Activity by Tuning the Alloy Particle Surface Composition", NANO Letters, 2012, vol. 12, No. 11, pp. 5885-5889.

Cui et al., "Compositional Segregation in Shaped Pt Alloy Nanoparticles and their Structural Behaviour During Electrocatalysis", Nature Materials, 2013, vol. 12, pp. 765-771.

Darling et al., "Kinetic Model of Platinum Dissolution in PEMFCs", Journal of the Electrochemical Society, 2003, vol. 150, No. 11, pp. A1523-A1527.

Debe, "Advanced Cathode Catalysts and Supports for PEM Fuel Cells", 2008 DOE Hydrogen Program Review—Presentation, Jun. 10, 2008, pp. 1-20.

Debe, "Advanced Cathode Catalysts and Supports for PEM Fuel Cells", 2009 DOE Hydrogen Program Review—Presentation, May 20, 2009, pp. 1-40.

Du et al., "A Simple Approach for PtNi—MWCNT Hybrid Nanostructures as High Performance Electrocatalysts for the Oxygen Reduction Reaction", Journal of Materials Chemistry A, 2014, vol. 2, pp. 692-698.

Elie et al., "Water-Soluble (Phosphane)gold(I) Complexes—Applications as Recyclable Catalysts in a Three-Component Coupling Reaction and as Antimicrobial and Anticancer Agents", European Journal of Inorganic Chemistry, 2009, pp. 3421-3430.

Ferreira et al., "Instability of Pt/C Electrocatalysts in Proton Exchange Membrane Fuel Cells A Mechanistic Investigation", Journal of the Electrochemical Society, 2005, vol. 152, No. 11, pp. A2256-A2271.

Garsany et al., "Experimental Methods for Quantifying the Activity of Platinum Electrocatalysts for the Oxygen Reduction Reaction", Analytical Chemistry, 2010, vol. 82, No. 15, pp. 6321-6328.

Gong et al., "Platinum-Monolayer Shell on AuNi0.5Fe Nanoparticle Core Electrocatalyst with High Activity and Stability for the Oxygen Reduction Reaction", Journal of the American Chemical Society, 2010, vol. 132, No. 41, pp. 14364-14366.

Greeley et al., "Alloys of Platinum and Early Transition Metals as Oxygen Reduction Electrocatalysts", Nature Chemistry, Oct. 2009, vol. 1, pp. 552-556.

Kocha, "Principles of MEA Preparation", in Handbook of Fuel Cells—Fundamentals, Technology and Applications, vol. 3, Part 3, John Wiley & Sons, Ltd., 2003, pp. 538-565.

Kounaves et al., "Deposition and Stripping Properties of Mercury on Iridium Electrodes", Journal of the Electrochemical Society, Dec. 1986, vol. 133, No. 12, pp. 2495-2498.

Kuttiyiel et al., "Nitride Stabilized PtNi Core—Shell Nanocatalyst for high Oxygen Reduction Activity", NANO Letters, 2012, vol. 12, No. 12, pp. 6266-6271.

Larsen et al., "Platinum Nanoplates as Fuel Cell Electrocatalysts", Journal of The Electrochemical Society, 2012, vol. 159, No. 10, pp. F622-F627.

Lima et al., "Catalytic Activity-d-Band Center Correlation for the O2 Reduction Reaction on Platinum in Alkaline Solutions", The Journal of Physical Chemistry, 2007, vol. 111, No. 1, pp. 404-410.

Maijenburg et al., "Electrodeposition of Micropatterned Ni Pt Multilayers and Segmented Ni Pt Ni Nanowires", Electrochimica Acta, 2012, vol. 81, pp. 123-128.

Man et al., "Universality in Oxygen Evolution Electrocatalysis on Oxide Surfaces", ChemCatChem, 2011, vol. 3, pp. 1159-1165.

Marković et al., "Structural Effects in Electrocatalysis: Oxygen Reduction on Platinum Low Index Single-crystal Surfaces in Perchloric Acid Solutions", Journal of Electroanalytical Chemistry, 1994, vol. 377, pp. 249-259.

Mohr et al., "Water-soluble and Water-stable Gold(I), Gold (II) and Gold(III) Phosphine Complexes: the Early Years", Gold Bulletin, 2006, vol. 39, No. 4, pp. 212-215.

Neyerlin et al., "Determination of Catalyst Unique Parameters for the Oxygen Reduction Reaction in a PEMFC", Journal of the Electrochemical Society, 2006, vol. 153, No. 10, pp. A1955-A1963.

Neyerlin et al., "Activity of Pt Extended Network Electrocatalyst Structures Made From Spontaneous Galvanic Displacement", ECS Transactions, 2012, vol. 50, No. 2, pp. 1405-1413.

(56) References Cited

OTHER PUBLICATIONS

Noonan et al., "Phosphonium-Functionalized Polyethylene: A New Class of Base-Stable Alkaline Anion Exchange Membranes", Journal of the American Chemical Society, 2012, vol. 134, No. 44, pp. 18161-18164.

Nørskov et al., "Origin of the Overpotential for Oxygen Reduction at a Fuel-Cell Cathode", The Journal of Physical Chemistry B, 2004, vol. 108, No. 46, pp. 17886-17892.

Paulus et al., "Oxygen Reduction on High Surface Area Pt-based Alloy Catalysts in Comparison to Well Defined Smooth Bulk Alloy Electrodes", Electrochimica Acta, 2002, vol. 47, pp. 3787-3798.

Paulus et al., "Oxygen Reduction on Carbon-Supported Pt-Ni and Pt-Co Alloy Catalysts", The Journal of Physical Chemistry B, 2002, vol. 106, No. 16, pp. 4181-4191.

Pivovar, "Alkaline Membrane Fuel Cell Workshop Welcome and Overview", 2011 Alkaline Membrane Fuel Cell (AMFC) Workshop, May 8, 2011, pp. 1-27.

Pivovar, "Extended, Continuous Pt Nanostructures in Thick, Dispersed Electrodes", 2013 DOE Hydrogen and Fuel Cells Program Review, May 16, 2013, available at http://www.hydrogen.energy.gov/pdfs/review13/fc007_pivovar_2013_o.pdf, pp. 1-27.

Reier et al., "Electrocatalytic Oxygen Evolution Reaction (OER) on Ru, Ir, and Pt Catalysts: A Comparative Study of Nanoparticles and Bulk Materials", ACS Catalysis, 2012, vol. 2, No. 8, pp. 1765-1772.

Ruban et al., "Surface Electronic Structure and Reactivity of Transition and Noble Metals", Journal of Molecular Catalysis A: Chemical, 1997, 115, pp. 421-429.

Spendelow et al., "Electrocatalysis of Oxygen Reduction and Small Alcohol Oxidation in Alkaline Media", Physical Chemistry Chemical Physics, 2007, vol. 9, No. 21, pp. 2654-2675.

Stamenković et al., "Surface Composition Effects in Electrocatalysis: Kinetics of Oxygen Reduction on Well-Defined Pt3Ni and Pt3Co Alloy Surfaces", The Journal of Physical Chemistry B, 2002, vol. 106, No. 46, pp. 11970-11979.

Stamenković et al., "Changing the Activity of Electrocatalysts for Oxygen Reduction by Tuning the Surface Electronic Structure", Angewandte Chemie, Apr. 28, 2006, vol. 118, No. 18, pp. 2963-2967.

Stamenković et al., "Improved Oxygen Reduction Activity on Pt3Ni(111) via Increased Surface Site Availability", Science, Jan. 2007, vol. 315, No. 5811, pp. 493-497.

Stamenković et al., "Nanosegregated Cathode Catalysts with Ultra-Low Platinum Loading", 2014 DOE Hydrogen and Fuel Cells Program Review, Materials Science Division, Argonne National Laboratory, pp. 1-24.

Steward et al., "Lifecycle Cost Analysis of Hydrogen Versus Other Technologies for Electrical Energy Storage", Technical Report NREL/TP-560-46719, Nov. 2009, pp. 1-50.

Strmcnik et al., "Improving the Hydrogen Oxidation Reaction Rate by Promotion of Hydroxyl Adsorption", Nature Chemistry, 2013, vol. 5, pp. 300-306.

Subbaraman et al., "Trends in Activity for the Water Electrolyser Reactions on 3d M(Ni,Co,Fe,Mn) hydr(oxy)oxide Catalysts", Nature Materials, 2012, vol. 11, pp. 550-557.

Takahashi et al., "Examination of the Activity and Durability of PEMFC Catalysts in Liquid Electrolytes", Journal of Power Sources, 2010, vol. 195, pp. 6312-6322.

Van der Vliet et al., "Platinum-alloy Nanostructured Thin Film Catalysts for the Oxygen Reduction Reaction", Electrochimica Acta, 2011, vol. 56, No. 24, pp. 8695-8699.

Xin et al., "Predictive Structure—Reactivity Models for Rapid Screening of Pt-Based Multimetallic Electrocatalysts for the Oxygen Reduction Reaction", ACS Catalysis, 2012, vol. 2, No. 1, pp. 12-16.

Xu, "High-Performance, Long-Lifetime Catalysts for Proton Exchange Membrane Electrolysis", Giner Inc.,—Presentation, Jun. 18, 2014, available at https://www.hydrogen.energy.gov/pdfs/review15/pd103_xu_2015_o.pdf, pp. 1-24.

Yang et al., "Regulated Oxidation of Nickel in Multisegmented Nickel-Platinum Nanowires: An Entry to Wavy Nanopeapods", Angewandte Chemie International Edition, 2011, vol. 50, pp. 10855-10858.

Yu et al., "Guiding Principles in the Galvanic Replacement Reaction of an Underpotentially Deposited Metal Layer for Site-Selective Deposition and Shape and Size Control of Satellite Nanocrystals", Chemistry of Materials, 2013, vol. 25, pp. 4746-4756.

Zhang et al., "Platinum Monolayer on Nonnoble Metal—Noble Metal Core—Shell Nanoparticle Electrocatalysts for O2 Reduction", The Journal of Physical Chemistry B Letters, 2005, vol. 109, pp. 22701-22704.

* cited by examiner

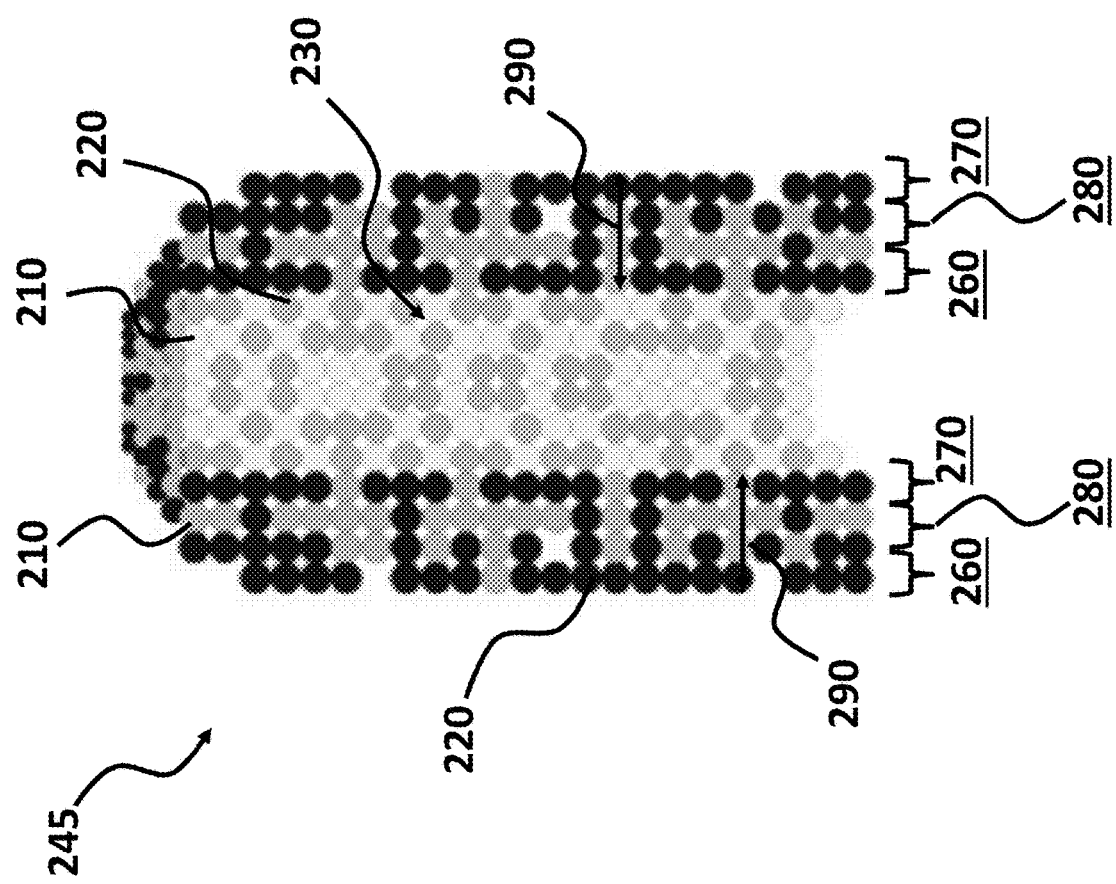

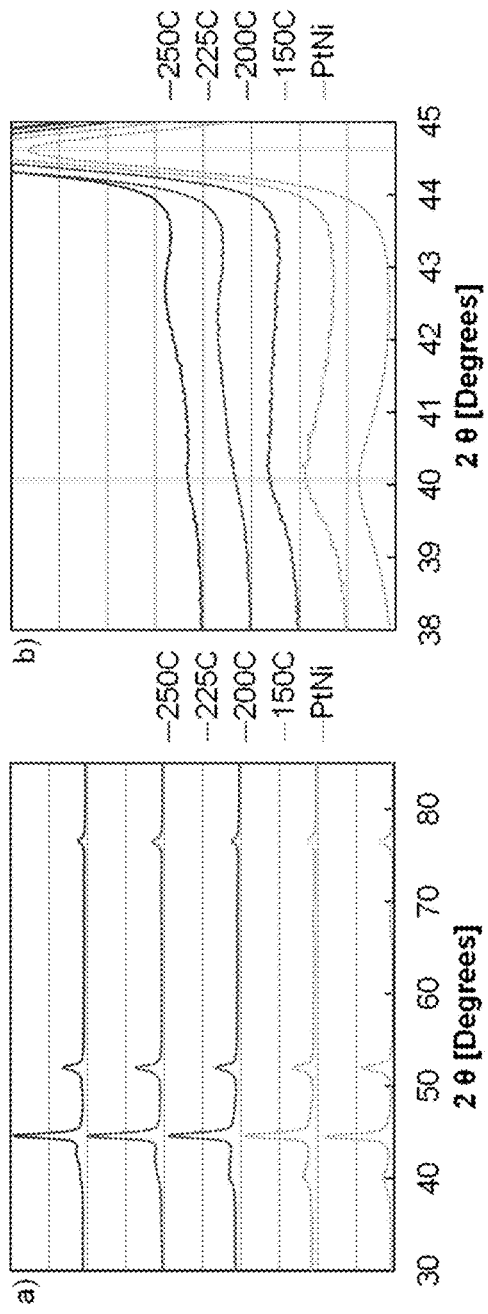
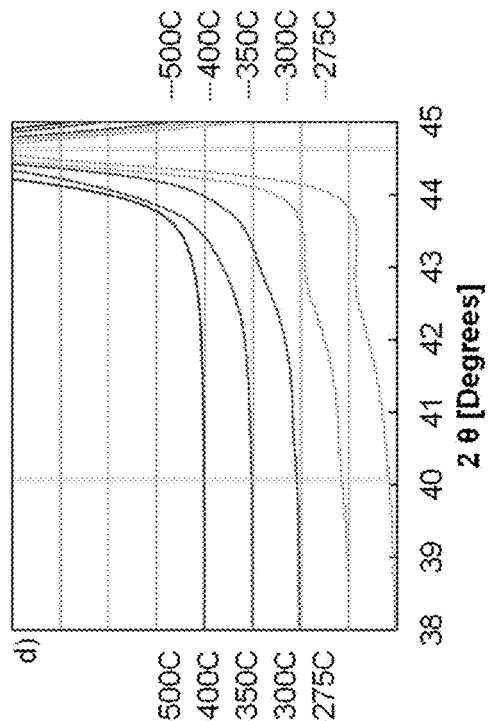
FIGURE 5a  FIGURE 5b  FIGURE 5c  FIGURE 5d

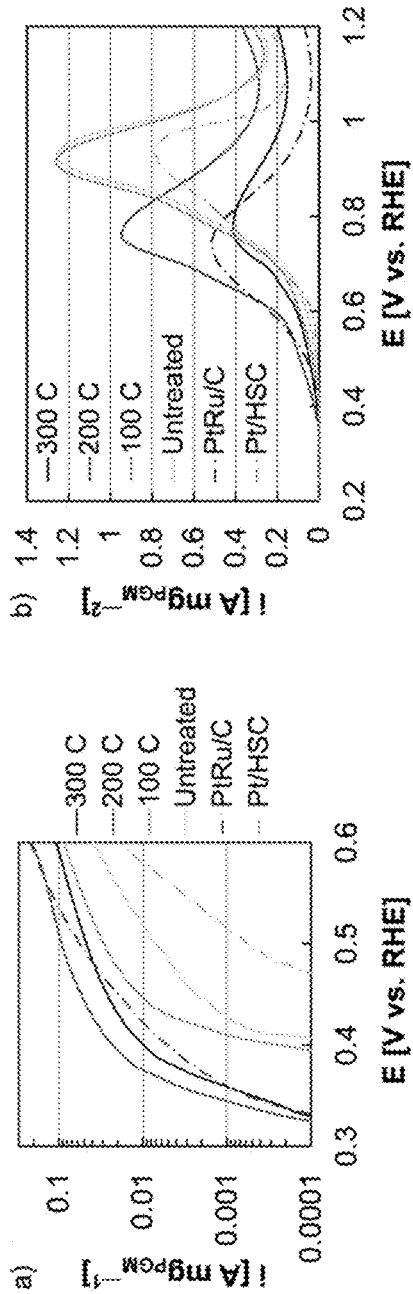
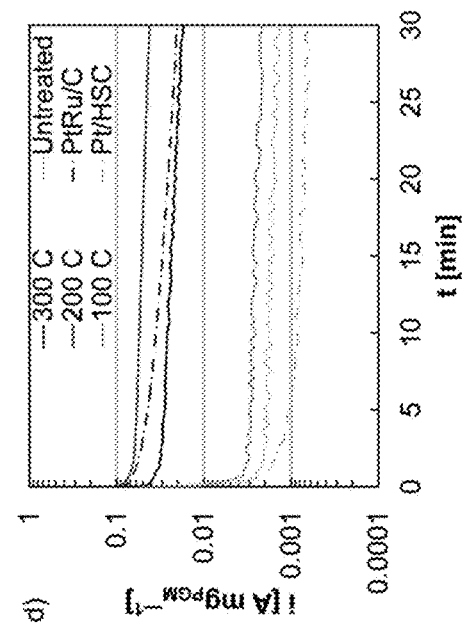
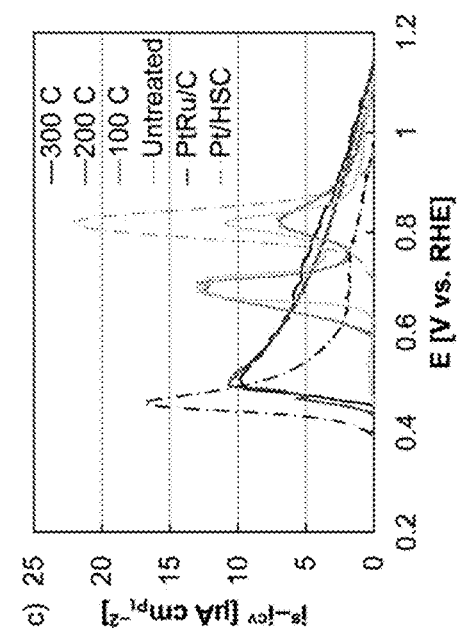
FIGURE 15a
FIGURE 15b
FIGURE 15c
FIGURE 15d

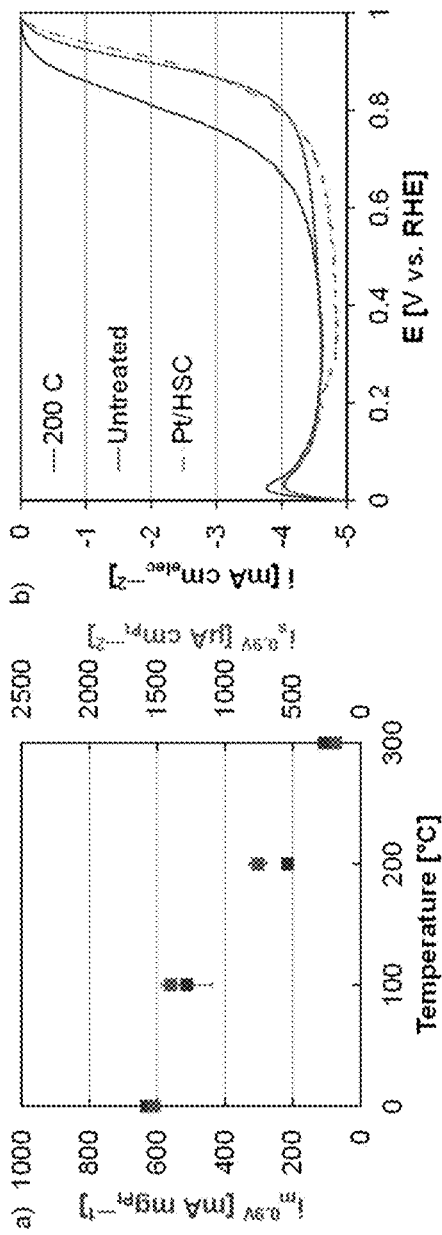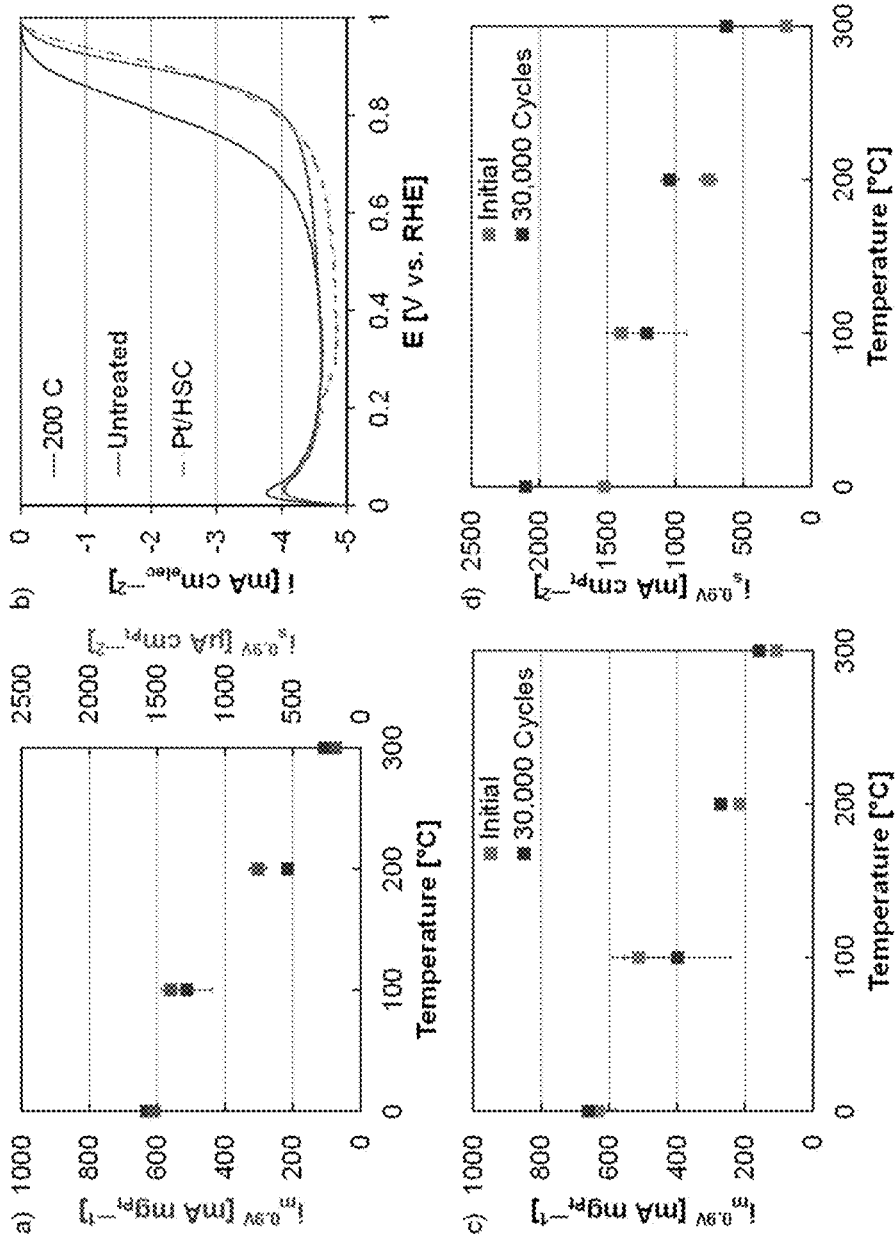
FIGURE 17a
FIGURE 17b
FIGURE 17c
FIGURE 17d

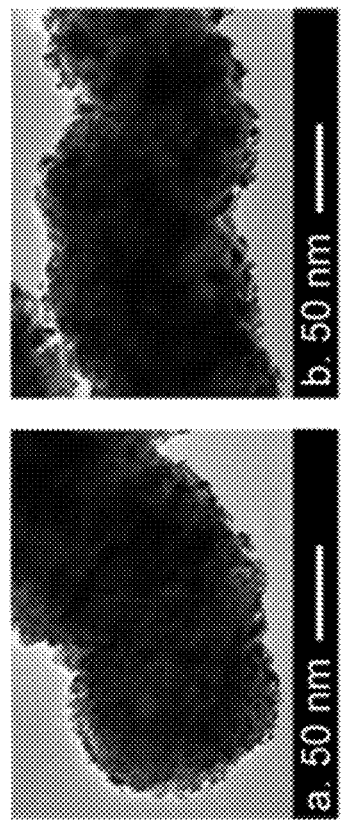
FIGURE 18a
FIGURE 18b
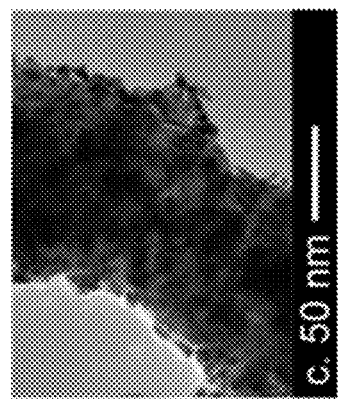
FIGURE 18c

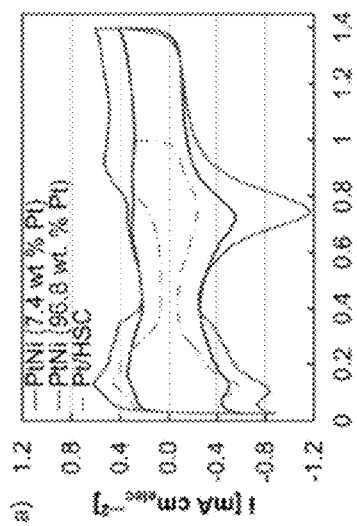
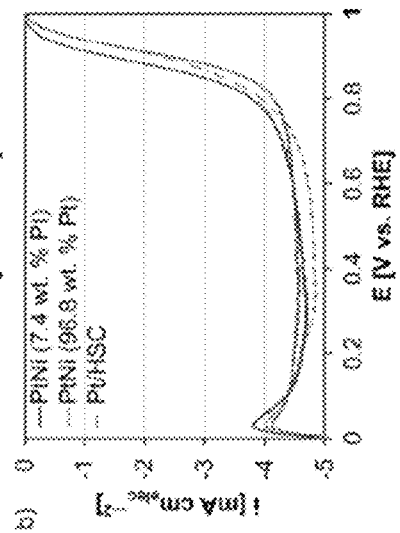
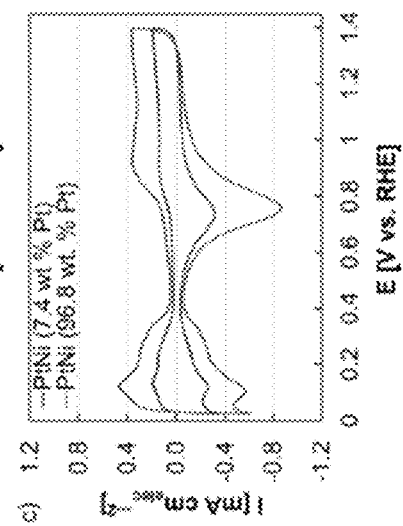
FIGURE 22a
FIGURE 22b
FIGURE 22c

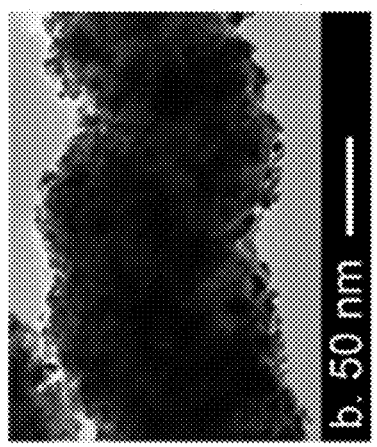
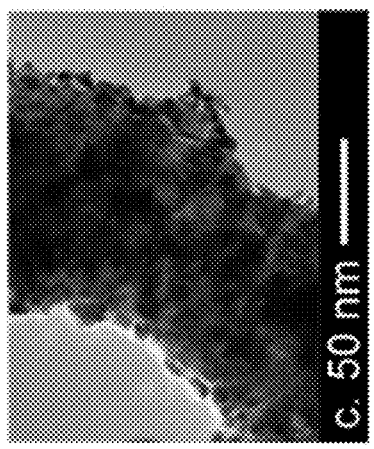
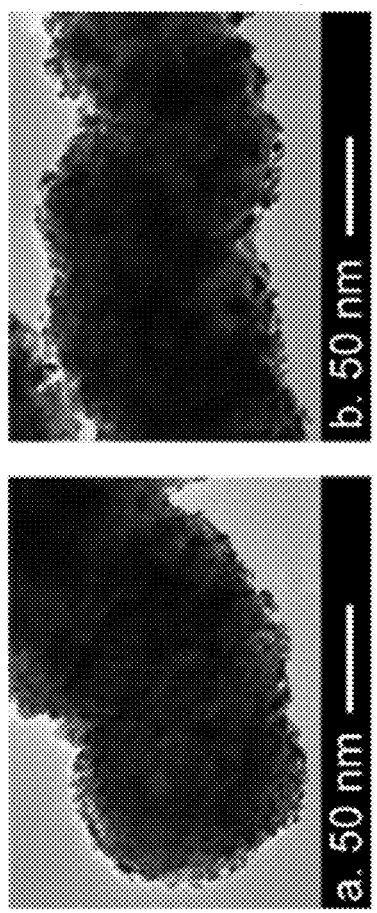

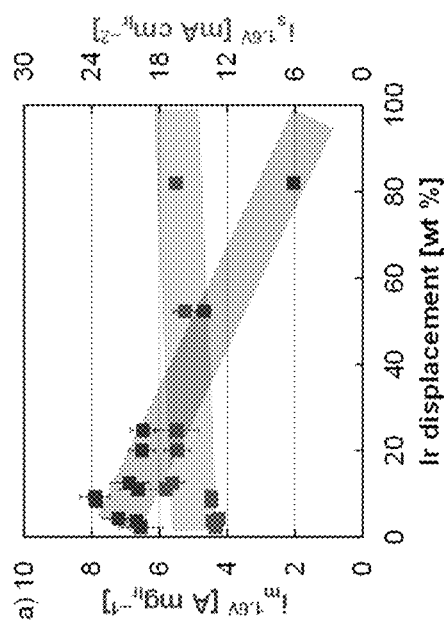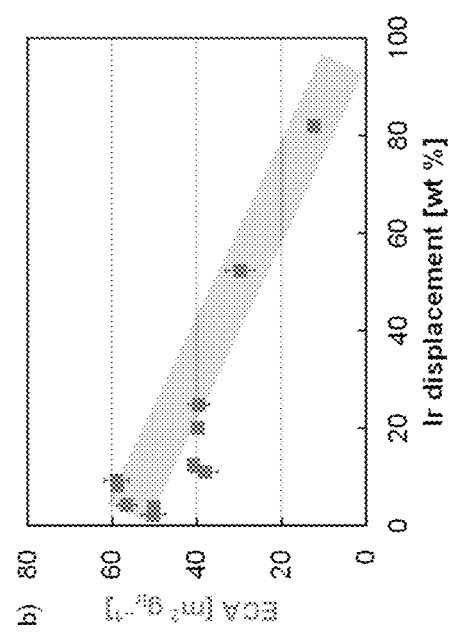
FIGURE 28a
FIGURE 28b

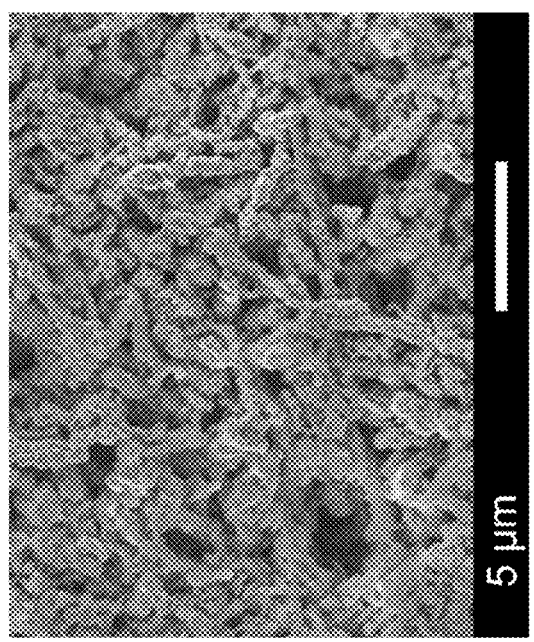

PLATINUM NICKEL NANOWIRES AS OXYGEN REDUCING ELECTROCATALYSTS AND METHODS OF MAKING THE SAME

CROSS-REFERENCE TO RELATED APPLICATIONS

This application claims priority to and the benefit of U.S. Provisional Application No. 62/075,109, filed on Nov. 4, 2014, entitled "Platinum Nickel Nanowires as Oxygen Reducing Electrocatalysts and Methods of Making the Same", which is incorporated herein by reference in its entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

The following text should not be construed as an admission of knowledge in the prior art. Furthermore, citation or identification of any document in this application is not an admission that such document is available as prior art to the present invention, or that any reference forms a part of the common knowledge in the art.

Fuel cells have become increasingly important as alternative sources of power, offering the potential for drastic reduction in emissions in particulate matter (PM), nitrogen oxides ($NO_x$), and $CO_2$. In addition, they offer exceptionally quiet operation, highly efficient use of the fuel energy, and a high energy storage density compared to batteries.

A fuel cell provides, in an electrochemical environment, a way to combine gaseous hydrogen and oxygen to form water (typically as a liquid), as indicated by Equation 1:

$$2H_2\,(g) + O_2\,(g) \rightarrow 2H_2O\,(l) \quad \text{(Eq. 1)}$$

The hydrogen fuel is not literally burned. Rather, the reaction proceeds electrochemically, producing electrical energy and waste heat. The efficiency of the electrochemical process can be significantly higher than traditional combustion. Whereas traditional combustion has a thermal efficiency of about 35%, limited primarily by the temperatures achievable in traditional combustion systems, the thermal efficiency of the electrochemical process can be up to about 50%.

Over the years, there have emerged five general classes of fuel cell systems, which are viable and commercially available: proton exchange membrane fuel cells (PEM fuel cells or PEMFC), alkaline fuel cells, phosphoric acid fuel cells, molten carbonate fuel cells, and solid oxide fuel cells.

FIG. 1 illustrates the relevant reactions in a PEMFC. PEMFCs require only hydrogen and oxygen to operate, and water to humidify the polymer membrane. At the PEMFC anode (site of oxidation) hydrogen gas ionizes (oxidizes), releasing protons and electrons for the external circuit. Simultaneously, at the cathode (site of reduction), oxygen molecules are reduced in an acidic environment by electrons from the circuit, forming water molecules. Protons pass through the proton exchange membrane, from anode to cathode, completing the circuit.

PEM fuel cells deliver high power density and offer lighter weight and smaller volume than other fuel cell systems. Traditional PEM fuel cells use a solid proton conducting polymer membrane called Nafion, a type of polyfluorinated sulfonic acid (PFSA) material, which allows proton transfer between the anode and cathode. Typically, porous carbon electrodes containing a platinum catalyst act as the membrane electrode assemblies (MEA). However, this type of catalyst is sensitive to CO poisoning. In addition, high surface area carbon supported platinum nanoparticles (Pt/HSC) catalysts are prone to surface area aggregation, Ostwald ripening, dissolution, the carbon support is susceptible to corrosion, and the catalyst is costly.

To address these problems various approaches have been taken with varying degrees of success, including alloying Pt with other transition metals such as Pt with Ni to produce nanostructured oxygen reduction reaction (ORR) catalysts (e.g. $O_2(g) + 4H^+ + 4e^- \leftrightarrow 2H_2O$). Spontaneous galvanic displacement has been shown to be a commercially viable alternative for producing nanostructured Pt/Ni ORR catalysts. Galvanic displacement occurs spontaneously when a metal "template" comes into contact with a more noble metal cation. When this occurs, it is thermodynamically favorable for the more noble metal cation to "steal" electrons from the less noble metal, where "nobility" follows the elements' standard redox potential. Spontaneous galvanic displacement (SGD) offers numerous potential advantages including the production of high surface area catalysts, minimization of leaching of the alloyed metal, and reduced contamination issues. However, to date researchers have shown only moderate success in developing methods for manufacturing high surface area, high performing nanostructured Pt/Ni ORR catalysts. Thus, it is clearly evident that there is a long felt need in the field of fuel cell technology for improved methods for producing PEMFC catalysts that perform better and cost less to manufacture and operate.

The foregoing examples of the related art and limitations related therewith are intended to be illustrative and not exclusive. Other limitations of the related art will become apparent to those of skill in the art upon a reading of the specification and a study of the drawings.

SUMMARY

An aspect of the present invention is a method, where the method includes contacting, with a gas, a nanostructure that has a first metal and a second metal, and heating the nanostructure to a first temperature. The nanostructure has an outside layer substantially covering an interior layer that includes the first metal, and the outside layer of the nanostructure has a first concentration of the first metal. The heating and the contacting cause the movement of a first portion of the first metal from the interior layer to the outside layer to create a modified nanostructure, where the outside layer of the modified nanostructure has a second concentration of the first metal that is higher than the first concentration of the first metal.

Is some embodiments of the present invention, the nanostructure may include an inside layer substantially covering the interior layer, where the inside layer may have a third concentration of the first metal, and the inside layer may define a channel positioned within the nanostructure. The heating and the contacting may cause the movement of a second portion of the first metal from the interior layer to the inside layer, such that the inside layer of the modified nanostructure may have a fourth concentration of the first metal that is higher than the third concentration of the first metal.

In some embodiments of the present invention, the nanostructure may be at least one of a fiber, a wire, a filament, a thread, a whisker, a ribbon, or a helix. The first metal may include at least one transition metal. The second metal may include at least one transition metal that is different from the first metal. In some embodiments of the present invention, the gas may be hydrogen. The first temperature may be about 100° to about 300° C.

In some embodiments of the present invention, prior to the contacting and the heating, the method may include mixing a starting nanostructure with a solution comprising a salt and a solvent. The starting nanostructure may have a first shape and include a first metal having a first redox potential. The salt may include a counter-ion and a second metal having a second redox potential that is larger than the first redox potential. The mixing may result in replacing a fraction of the first metal by the second metal to form the nanostructure described above, having a second shape that is substantially the same as the first shape.

A further aspect of the present invention is a method that includes treating, with a solution, a nanostructure that includes a first metal and a second metal. The nanostructure has an outside layer substantially covering an interior layer that includes the first metal, and the outside layer of the nanostructure has a first concentration of the first metal. The treating removes a first portion of the first metal from the outside layer to create a modified nanostructure, where the outside layer of the modified nanostructure has a second concentration of the first metal that is lower than the first concentration of the first metal.

In some embodiments of the present invention, the nanostructure also may include an inside layer substantially covering the interior layer, where the inside layer may have a third concentration of the first metal, and the inside layer may define a channel positioned within the nanostructure. The treating may remove a second portion of the first metal from the inside layer, and the inside layer of the modified nanostructure may have a fourth concentration of the first metal that is lower than the third concentration of the first metal. In some embodiments of the present invention, the first metal may include at least one transition metal. The second metal may include at least one transition metal that is different from the first metal. The solution may be acidic.

A further aspect of the present invention is a method that includes contacting, with a gas, a nanostructure that includes a first metal and a second metal, and heating the nanostructure to a first temperature. The nanostructure has an outside layer substantially covering an interior layer that includes the first metal, and the outside layer of the nanostructure includes a first concentration of the first metal. The heating and the contacting cause the oxidation of a first portion of the first metal in the outside layer to create a modified nanostructure.

In some embodiments of the present invention, the nanostructure may also include an inside layer substantially covering the interior layer, where the inside layer may include a third concentration of the first metal, and the inside layer may define a channel positioned within the nanostructure. The heating and the contacting may cause the oxidation of a first portion of the first metal in the outside layer to create a modified nanostructure. The first metal may include at least one transition metal. The second metal may include at least one transition metal that is different from the first metal. The gas may include oxygen. The first temperature may be about 100° to about 300° C.

A further aspect of the present invention is a method that includes mixing a starting nanostructure with a solution that includes a salt and a solvent. The starting nanostructure has a first shape and includes a first metal having a first redox potential, and the salt includes a counter-ion and a second metal having a second redox potential that is larger than the first redox potential. The mixing results in replacing a fraction of the first metal by the second metal to form a nanostructure having a second shape that is substantially the same as the first shape, and the nanostructure has an outer layer substantially covering an internal mass, where the internal mass has a first concentration of the first metal. The method also includes contacting, with a first gas, the nanostructure, and heating the nanostructure to a first temperature. The heating and the contacting cause the movement of a first portion of the first metal from the interior mass to the outside layer to create a first modified nanostructure, where the outside layer of the first modified nanostructure has a second concentration of the first metal that is higher than the first concentration of the first metal. The method also includes treating, with a solution, the first modified nanostructure, where the treating removes a second portion of the first metal from the outside layer to create a second modified nanostructure, where the outside layer of the second modified nanostructure has a third concentration of the first metal that is lower than the second concentration of the first metal. The method also includes contacting, with a second gas, the second modified nanostructure, and heating the second modified nanostructure to a second temperature. This heating and contacting of the second modified nanostructure cause the oxidation of a fraction of the first metal in the outside layer to create a final modified nanostructure.

BRIEF DESCRIPTION OF DRAWINGS

The accompanying drawings are incorporated into and form a part of the specification to illustrate examples of how the aspects, embodiments, or configurations can be made and used and are not to be construed as limiting the aspects, embodiments, or configurations to only the illustrated and described examples. Further features and advantages will become apparent from the following, more detailed, description of the various aspects, embodiments, or configurations.

FIG. 2b illustrates a nanostructure having multiple layers, as may be produced according to exemplary embodiments of the present invention.

(FIG. 4a), 200° C. (FIG. 4b), 250° C. (FIG. 4c), 300° C. (FIG. 4d), and 400° C. (FIG. 4e).

FIGS. 5a-d show x-ray diffraction (XRD) patterns of platinum nickel nanowires (PtNiNWs) (7.3±0.3 wt % Pt) annealed in hydrogen, per some embodiments of the present invention. Full XRD patters of PtNiNWs at relatively low temperature (FIG. 5a) and high temperature (FIG. 5c). Narrowed XRD patterns (2θ 38-45°) of PtNiNWs at relatively low temperature (FIG. 5b) and high temperature (FIG. 5d). In the narrowed XRD patterns the vertical lines denoted the reflection of Pt (111) (to the left) and Ni (111) (to the right). The pattern of the untreated PtNiNWs was included as "PtNi".

(FIG. 14b), 200° C. (FIG. 14c), 300° C. (FIG. 14d), and 500° C. (FIG. 14e) prior to attempting maximum Pt displacement.

FIGS. 15a-d show experimental data derived by some embodiments of the present invention: MOR and carbon monoxide oxidation data of PtNiNWs, PtRu/C, and Pt/HSC. Quasi-steady state oxidation voltammograms at ~1 mV s$^{-1}$ (FIG. 15a), anodic linear sweep voltammograms at 5 mV s$^{-1}$ (FIG. 15b), carbon monoxide oxidation voltammograms at 20 mV$^{-1}$ (FIG. 15c), and chronoamperometry potential holds (about 30 minutes) at ~0.5 volts vs. RHE (FIG. 15d).

FIGS. 17a-d show experimental data derived by some embodiments of the present invention: Mass and specific ORR activities of PtNiNWs (FIG. 17a). ORR polarization curves of PtNiNWs (untreated and annealed to ~200° C.) and Pt/HSC (FIG. 15b). Mass (FIG. 17c) and specific ORR activities (FIG. 17d) of PtNiNWs following durability. The ORR polarization curves (FIG. 17b) included diffusion limited currents less than typically found at 1600 rpm at sea level. Details regarding the diffusion limited currents and the calculations of ORR activities are available in the Experimental Section. Accelerated durability testing was completed by potential cycling (~30,000 cycles) in the potential range from about 0.6 volts to about 1.0 volts vs. RHE.

FIGS. 18a-c show experimental data derived by some embodiments of the present invention: transmission electron microscopy (TEM) images of PtNiNWs (~9.6 wt % Pt) as synthesized (FIG. 18a), following RDE break-in (FIG. 18b), and following RDE durability testing ~30000 cycles (FIG. 18c), from about 0.6 volts to about 1.0 volts vs RHE).

FIGS. 19a and 19b show experimental data derived by some embodiments of the present invention: Atom probe line-scan (FIG. 19a) and atom probe reconstruction of a PtNiNW (~11.9 wt % Pt) with Pt in light gray and Ni in dark gray (FIG. 19b). The box indicates the region of the line-scan data shown in FIG. 19a.

FIGS. 22a-c show experimental data derived by some embodiments of the present invention: Cyclic voltammograms (FIG. 22a) and ORR polarization curves of PtNiNWs (about 7.4 wt % Pt and about 96 w % Pt, with graphitized carbon nanofibers ~60 wt % added to the inks) and Pt/HSC (FIG. 22b). Cyclic voltammograms of PtNiNWs (about 7.4 wt % Pt and 96.8 wt % Pt, without graphitized carbon nanofibers—FIG. 22c). Catalyst loadings on the RDE tip were the following: PtNiNWs (about 7.4 wt % Pt) ~33.7 µgPtNi cmelec$^{-2}$; PtNiNWs (~96.8 wt % Pt) ~38.9 µgPtNi cmelec$^{-2}$; and Pt/HSC ~17.8 µgPt cmelec$^{-2}$. The diffusion limited current ($i_d$) of the ORR polarization curves are lower than typically found at sea-level due to elevation (5674 ft).

FIGS. 24a-c show experimental data derived by some embodiments of the present invention: TEM images of PtNiNWs (~9.6 wt % Pt) as synthesized (FIG. 24a), following RDE break-in (FIG. 24b), and following RDE durability testing (~30000 cycles, ranging from about 0.6 volts to about 1.0 volts vs RHE—FIG. 24c).

FIGS. 28a and 28b show experimental data derived by some embodiments of the present invention: Mass and specific OER activities (FIG. 28a) and ECAs of Ir—Ni nanowires (FIG. 28b) as a function of displacement level. OER activities were determined during anodic linear polarization scans at 20 mV s$^{-1}$ and 2500 rpm in a 0.1 m perchloric acid electrolyte. ECAs were determined by mercury underpotential deposition during cyclic voltammograms at 20 mV s$^{-1}$ and 1500 rpm in a 0.1 m perchloric acid electrolyte containing 1 mm mercury nitrate. Activities and ECAs are plotted by their as-synthesized composition, although after acid leaching, the Ir contents for all samples are above 90 wt. %. More information is available in the experimental section.

FIG. 31 illustrates an SEM image of Ir—Co nanowires (4.2 wt. % Ir), according to exemplary embodiments of the present invention.

Figure 1:
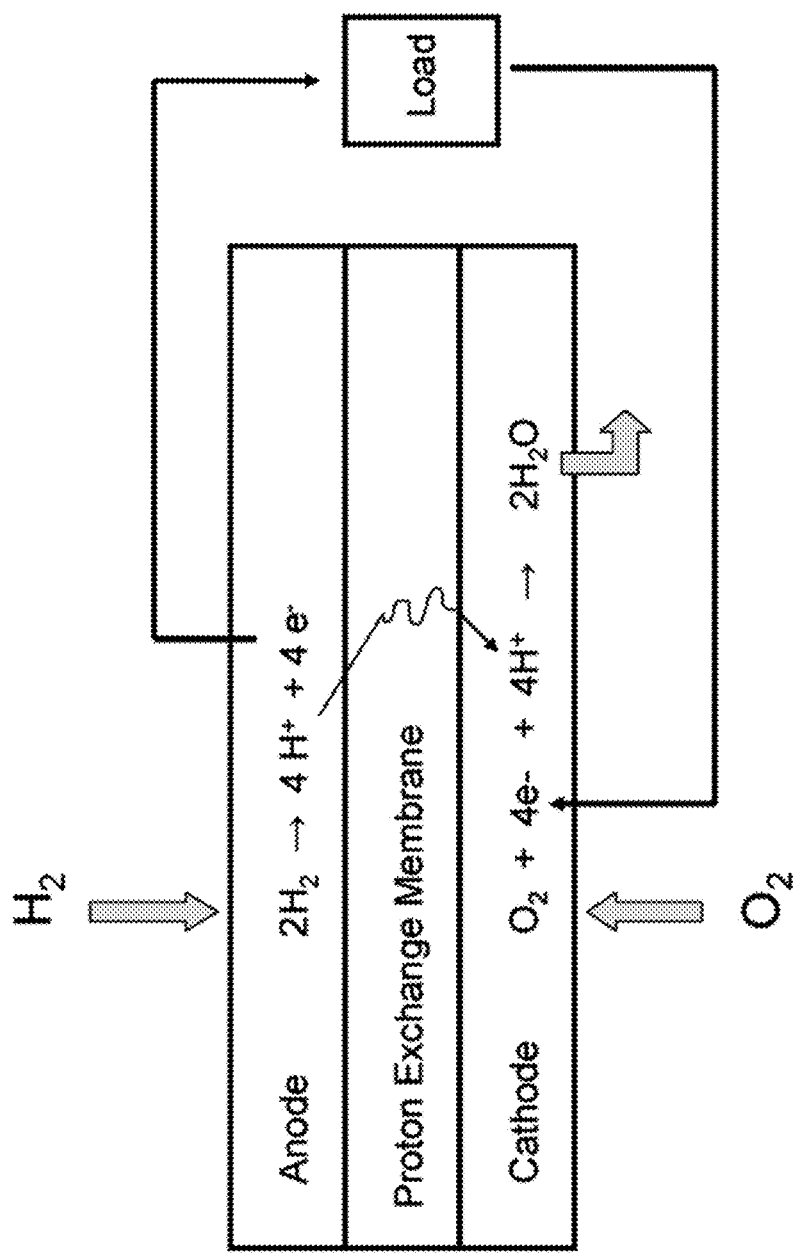
FIG. 1 illustrates the elements of an exemplary proton exchange membrane fuel cell.

| REFERENCE NUMBERS | |
|---|---|
| 200 | first nanostructure |
| 210 | first metal |
| 220 | second metal |
| 230 | channel |
| 240 | first intermediate nanostructure |
| 245 | second intermediate nanostructure |
| 250 | third intermediate nanostructure |
| 260 | outside layer |
| 270 | inside layer |
| 280 | interior layer |
| 290 | wall |
| 300 | method |
| 305 | first nanostructure |
| 310 | first solution |
| 315 | first contacting |
| 320 | first intermediate |
| 325 | first washing |
| 330 | first wash fluid |
| 335 | second intermediate |
| 340 | first separating |
| 345 | third intermediate |
| 350 | first gas |
| 355 | first annealing |
| 360 | fourth intermediate |
| 365 | second contacting |
| 370 | second solution |
| 375 | fifth intermediate |
| 380 | second washing |
| 385 | second wash fluid |
| 390 | sixth intermediate |
| 395 | second separating |
| 400 | seventh intermediate |
| 405 | second annealing |
| 410 | second gas |
| 415 | catalyst nanostructure |

DETAILED DESCRIPTION OF SOME EMBODIMENTS

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Disclosed herein are methods for manufacturing coated and/or multi-layered nanostructured catalysts, where the method includes contacting a nanostructure having a first element, an outside surface area, and an internal mass, with a mixture having a second element and a fluid medium. The contacting results in at least a portion of at least one of the outside surface area, the internal mass, or both being replaced by a portion of the second element to produce a first intermediate. The intermediate may be subsequently converted by one or more steps to subsequent intermediates and/or catalysts, for example a nanostructured ORR catalyst.

Figure 2A:
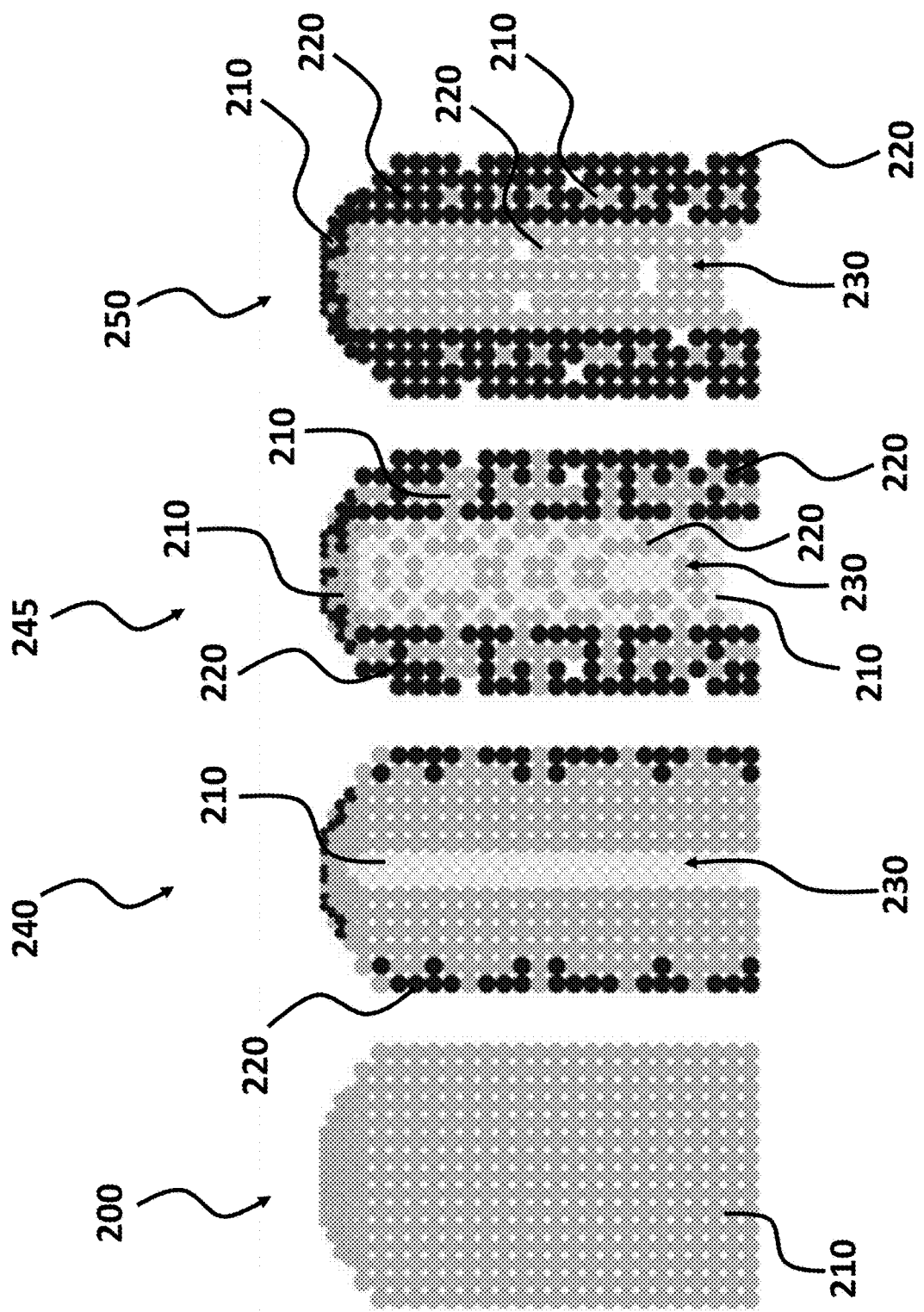
FIG. 2a illustrates a process for replacing a first metal with a second element resulting from spontaneous Galvanic displacement, according to exemplary embodiments of the present invention.

FIG. 2a illustrates an exemplary first nanostructure 200, constructed from a first metal 210 and the transformation that occurs to the first nanostructure 200 during spontaneous Galvanic displacement due to contacting the first nanostructure 200 with a solution containing a second metal 220 (solution not shown). The first nanostructure 200 is illustrated as being constructed entirely of the first metal 210, in a solid, cylindrical structure; e.g. a rod or wire. The first nanostructure 200 acts as template that defines the shape that is substantially maintained as the first nanostructure 200 is transformed to the third intermediate nanostructure 250, through various intermediate stages; e.g. the first intermediate structure 240 and the second intermediate structure 245. These intermediate structures (240 and 245) and the third intermediate nanostructure 250 are shown for illustrative purposes, and show specific intermediate structures that may occur along a continuous path that occurs during the spontaneous Galvanic displacement process. Thus, other intermediate structures will occur at different points in time, between those structures shown in FIG. 2a.

FIG. 2a illustrates that the solid first nanostructure 200 may gradually transform into subsequent nanostructures (240, 245, and/or 250) having an interior channel 230. At earlier stages of the displacement process, e.g. first intermediate nanostructure 240, the channel 230 may be relatively narrow. As more time elapses, the channel 230 may grow in diameter; e.g. as shown for the second intermediate nanostructure 245 and for the third intermediate nanostructure 250. Thus, some nanostructures produced by spontaneous Galvanic displacement may be substantially hollow and have both exterior surfaces and interior surfaces.

Referring to the first intermediate nanostructure 240 of FIG. 2a, as the first metal 210 (e.g. a transition element) is displaced by the second metal 220, portions of the exterior surfaces form an outer layer or coating of the second metal 220, over internal portions of the nanostructure comprising mostly the first metal 210. In addition the nanostructure begins to form a hollow channel 230. As the displacement process continues, due to the additional contacting of the first intermediate nanostructure 240 with the solution containing the second metal 220 (solution not shown), some of the first metal 210 on both the exterior surfaces and the interior surfaces of the channel 230 are displaced by the second metal 220. In addition, more of the interior mass of the nanostructure is replaced by the second metal 220. As a result, a larger percentage of both the internal surfaces and external surfaces of the intermediate nanostructure have layers of second metal 220 covering internal portions of first metal 210. As the Galvanic process continues for longer periods of time, intermediate nanostructures result, that have even more of the first metal 210 replaced by the second metal 220, on all exposed surfaces and in substantially all of the internal structures positioned between the external and internal surfaces (e.g. see the second intermediate structure 245 and the third intermediate structure 250).

FIG. 2b illustrates a closer view of the exemplary second intermediate nanostructure 245 illustrated in FIG. 2a. This illustrates that a nanostructure may be in a cylindrical form with a hollow center or channel 230. The channel 230 may be defined by a wall 290 forming a substantially circular cross-sectional shape. The wall 290 may include two or more layers. In this example, the wall 290 has an outside layer 260, facing the exterior, made of a mixture of the first metal 210 and the second metal 220. In addition, the wall 290 has an inside layer 270, facing the channel 230, made of a mixture of the first metal 210 and the second metal 220. The outside layer 260 and the inside layer 270 have an interior layer 280 positioned between them, where the interior layer 290 is made of a mixture of the first metal 210 and the second metal 220. As illustrated in FIG. 2b, the outside layer 260 of the wall 290 may have a mixture of the two elements that has a higher concentration of the second element 220 than the first element 210. The inside layer 270 of the wall 290 may have a mixture of the two elements that has a higher concentration of the second metal 220 than the first metal 210. The interior layer 280 of the wall 290 may have a mixture of the two elements that has a higher concentration of the first metal 210 than the second metal 220.

Thus, subsequent processing steps (e.g. annealing) of a nanostructure like the second intermediate nanostructure 245 shown in FIG. 2a, may change one or more of these mixtures, for example, by transporting a portion of at least one of the first metal 210 and/or the second metal 220 from the interior layer 280 to at least one of the outside layer 260 and/or the inside layer 270. Other processing steps may remove (e.g. leach) a portion of at least one of the first metal 210 and/or the second metal 220 from at least one of the outside layer 260 and/or the inside layer 270. Still other processing steps may modify at least one of the outside layer 260, the inside layer 270, and/or the interior layer. For example, oxidation steps may modify at least one of the first metal 210 and/or the second metal 220 to create oxidized forms of these metals (e.g. NiO, NiOOH, etc.).

Figure 3:
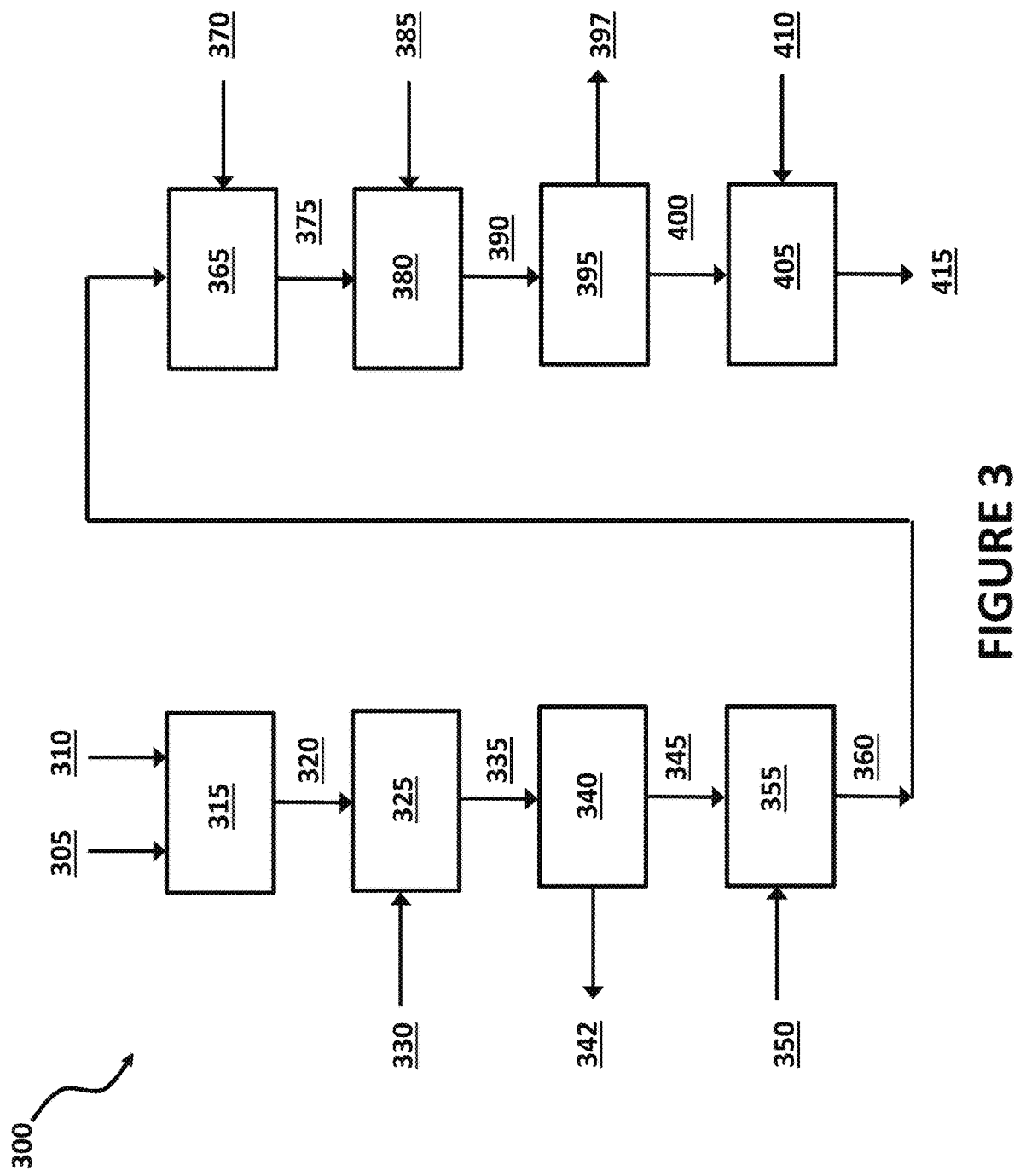
FIG. 3 illustrates a method for converting a first nanostructure to one or more intermediate nanostructures and/or final nanostructures, according to exemplary embodiments of the present invention.
Figure 4A:
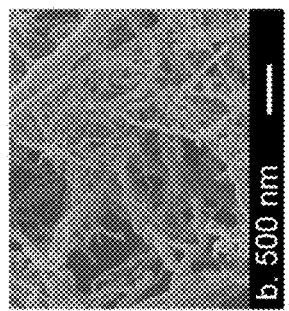
FIG. 4a-e show SEM images of platinum nickel nanowires, obtained using embodiments of the present invention, (7.3±0.3 wt % Pt) annealed in hydrogen to 150° C.
Figure 4B:
Figure 4C:
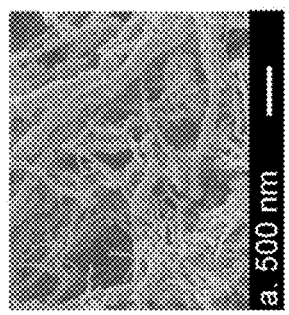
Figure 4D:
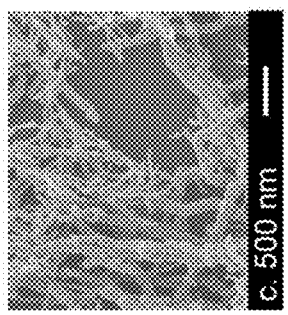
Figure 4E:
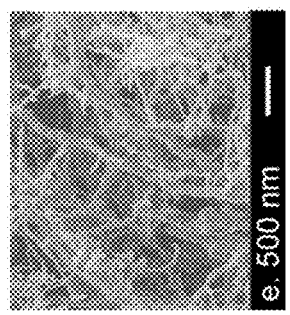

FIG. 3 shows a method 300 for making nanostructures (e.g. catalysts) that includes the spontaneous Galvanic displacement process, as well as multiple additional process steps. The method 300 begins with a first contacting 315 of a first nanostructure 305 with a first solution 310. For example, the first nanostructure 305 may include a plurality of nickel nanowires, and the first solution 310 may include an aqueous solution of a platinum salt. Under the appropriate conditions (details in the Examples section), the nickel may be displaced by the platinum by spontaneous Galvanic displacement, as described in FIG. 3, to create a first intermediate 320. Thus, the first intermediate 320 may be a plurality of hollow nickel nanowires, with outer and inner surfaces layers with high concentrations of platinum, in an aqueous solution. Such a solution may also include unreacted platinum salt, in either a soluble and/or insoluble state. A first washing fluid 330 may be mixed with the first intermediate 320 in a first washing step 325, to create a second intermediate 335. For example, the aqueous solution containing the first intermediate 320 in the form of a plurality of hollow nickel nanowires may be mixed with a first wash fluid 330 of water and an alcohol (e.g. propanol) in a first washing step 325. The first washing 325 may, for example, solubilize any unreacted, solid platinum salts. Thus, the first washing 325 may have minimal, if any, effect on the plurality of hollow nickel nanowires (e.g. the first intermediate 320), but instead may prepare the solution containing the hollow nickel nanowires for a subsequent first separating step 340. Thus, for this example, the first intermediate 320 and the second intermediate 335 may be substantially the same; e.g. a plurality of hollow platinum/nickel nanowires. Alternatively, the solution resulting from the first contacting 315, and containing the exemplary platinum/nickel nanowires (e.g. the first intermediate 320), may skip the first washing 325 and proceed directly to the first separating 340, to remove the first intermediate 320 from the remaining first solution 310 used in the first contacting 315.

The second intermediate 335 (e.g. a plurality of hollow platinum/nickel nanowires) in a liquid solution may be directed to a first separating 340 step. The purpose of such a first separating 340, may be to remove the second intermediate 335 from the liquid reaction mixture resulting from the first washing 325 and/or to remove the first intermediate 320 from the liquid reaction mixture remaining after the first contacting 315. For example, the second intermediate 335, e.g. a plurality of platinum/nickel nanowires, suspended in a liquid solution of water, an alcohol, and solubilized, unreacted platinum salts may be directed to a first separating 340 step, such as a centrifuge and/or filter. The first separating 340 may separate the solid platinum/nickel nanowires from the liquid phase to create a third intermediate 345 of solid platinum/nickel nanowires that is substantially free of free liquid, and a first recycle stream 342, substantially free of solids. In some cases, the first recycle stream 342 may be recirculated back to the first contacting 315, for example to increase the conversion of any remaining, unreacted platinum salts. Such a first separating 340 may improve the thermal and/or reaction efficiencies in a subsequent first annealing 355 step, where the third intermediate 345 of solid platinum/nickel nanowires are contacted with a first gas 350 and heated to elevated temperatures.

For example, a first gas 350 that includes hydrogen gas ($H_2$), either in a substantially pure form or diluted with an inert gas, may be directed to a first annealing 355, where the first gas 350 contacts the third intermediate 345, e.g. nickel oxide containing solid platinum/nickel nanotubes, to form a fourth intermediate 360, modified nickel oxide containing solid platinum/nickel nanotubes. The first annealing 355 alloys the first metal (e.g. nickel) and the second metal (e.g. platinum) of the third intermediate 345 such that at least a portion of the first element (e.g. nickel) contained within the internal mass of nanowires of the third intermediate 345 migrate to the internal and/or external surfaces of the nanowires. This movement of the first metal (e.g. nickel) to the surfaces results in a fourth intermediate 360 of solid platinum/nickel nanowires with higher surface concentrations of the first element (e.g. nickel). In addition the fourth intermediate may have platinum phases and nickel phases that are more evenly dispersed on the internal and/or external surfaces of the nanowires. Finally, the first annealing 355 may also compress the lattice of the second metal (e.g. platinum). In addition, a first annealing 355 of the nanostructures resulting from the spontaneous Galvanic displacement may assist with the removal of oxide phases formed during the first contacting 315. The first annealing 355 may be performed where the third intermediate 345 is heated to an average bulk temperature of about 100° C. to about 1000° C.

Referring again to FIG. 3, the fourth intermediate 360 may then be directed to a second contacting 365, where the fourth intermediate 360 is contacted with a second solution 370, resulting in a fifth intermediate 375. For example, a fourth intermediate 360 of solid platinum/nickel nanowires may be contacted with a second solution 370, where the second solution 370 is an acidic solution; e.g. aqueous solutions of at least one of acetic acid, hydrochloric acid, nitric acid, sulfuric, and/or any other suitable acid. The second contacting 365 of the fourth intermediate 360 with an acidic second solution 370 may leach at least a portion first metal (e.g. nickel) from the fourth intermediate 360 nanowires, resulting in a fifth intermediate 375 with higher second metal (e.g. platinum) surface concentrations. In other cases, the second contacting 365 of the fourth intermediate 360 with an acidic second solution 370 may leach substantially all of first metal (e.g. nickel) from the fourth intermediate 360 nanowires, resulting in a fifth intermediate 375 that is substantially free of the first metal (e.g. nickel) and is constructed of substantially pure second metal (e.g. platinum) nanostructures (e.g. nanowires).

A second washing fluid 385 may be mixed with the fifth intermediate 375 in a second washing step 380, to create a sixth intermediate 390. For example, the acidic solution resulting from the second contacting 365 and containing the fifth intermediate 375 in the form of a plurality of hollow platinum/nickel nanowires may be mixed with a second wash fluid 370 of water and an alcohol (e.g. propanol) in a second washing step 380. The second washing 380 may, for example, solubilize any precipitated solid salts. Thus, the second washing 380 may have minimal, if any, effect on the plurality of hollow platinum/nickel nanowires (e.g. the fifth intermediate 375), but instead may prepare the solution containing the hollow platinum/nickel nanowires for a subsequent second separating step 395. Thus, for this example, the fifth intermediate 375 and the sixth intermediate 390 may be substantially the same; e.g. a plurality of hollow platinum/nickel nanowires. Alternatively, the solution resulting from the second contacting 365, and containing the exemplary platinum/nickel nanowires (e.g. the fifth intermediate 375), may skip the second washing 380 and proceed directly to the second separating 395, to remove the fifth intermediate 375 from the remaining second solution 370 used in the second contacting 365.

The sixth intermediate 390 (e.g. a plurality of hollow platinum/nickel nanowires) in a liquid solution may be directed to a second separating 395 step. The purpose of such second a separating 395, may be to remove the sixth intermediate 390 from the liquid reaction mixture resulting from the second washing 380 and/or to remove the fifth intermediate 375 from the liquid reaction mixture remaining after the second contacting 365. For example, the sixth intermediate 390, e.g. a plurality of platinum/nickel nanowires, suspended in an acidic liquid solution potentially containing solubilized salts may be directed to a second separating 395 step, such as a centrifuge and/or filter. The second separating 395 may separate the solid platinum/nickel nanowires from the liquid phase to create a seventh intermediate 400 of solid platinum/nickel nanowires that is substantially free of free liquid, and a second recycle stream 397, substantially free of solids. In some cases, the second recycle stream 397 may be recirculated back to the second contacting 365, for example to reuse the acid stream. Such a second separating 395 may also improve the thermal and/or reaction efficiencies in a subsequent second annealing 405 step, where the seventh intermediate 400 of solid platinum/nickel nanowires are contacted with a second gas 410 and heated to elevated temperatures.

For example, a second gas 410 that includes oxygen gas ($O_2$), either in a substantially pure form or diluted with an inert gas, may be directed to a second annealing 405, where the second gas 410 contacts the seventh intermediate 400, e.g. solid platinum/nickel nanotubes, to form a final catalyst nanostructure 415. The second annealing 405 may oxidize at least a portion of the first metal (e.g. nickel) contained within the nanowire structures of the seventh intermediate 400, where the portions oxidized are converted to oxides (e.g. NiO and/or NiOOH). The second annealing 405 may also further alloy the first metal (e.g. nickel) and the second metal (e.g. platinum). The second annealing 405 may be performed where the seventh intermediate 400 is heated to an average bulk temperature of about 100° C. to about 1000° C.

In some examples, a nanostructure may include at least one three-dimensional geometric shape and/or non-geometric shape. Examples of three-dimensional geometric shapes include cubes, spheres, cylinders, hollow cylinders, rings, slabs, pellets, tablets, multi-faceted three-dimensional shapes, or combinations thereof. Non-geometric shapes may include irregularly shaped particles. In still further examples a nanostructure may include a fiber, a wire, a filament, a thread, a whisker, a ribbon, and/or a helix. A nanostructure may be utilized as a template, having at least one first element, to construct various nano-intermediates and final nano-catalysts.

A nanostructure may include an extended structure. As used herein, an "extended structure" refers to a structure with a length dimension that is significantly larger than the structure's width dimension and/or thickness dimension. For example, an extended structure may have an aspect ratio of greater than about 10:1, where aspect ratio is defined as the ratio of a length dimension to a width dimension and/or thickness direction. In some cases, an extended structure may have an aspect ratio of greater than about 100:1. In still further examples, an extended structure may have an aspect ratio of greater than about 100:1. In other examples, a nanostructure may be a structure that is not extended. As used herein, a "non-extended structure" refers to a structure with a length dimension that is significantly equal to the structure's width dimension and/or thickness dimension. For example, a non-extended structure may have an aspect ratio of less than or equal to about 10:1. In still further examples, a non-extended structure may comprise an aspect ratio of about 1:1. A nanostructure may have a width dimension that is substantially equal to the thickness dimension of the nanostructure. For example, a nanostructure may have a second aspect ratio of less than about 10:1, where the second aspect ratio is defined as the ratio of a width dimension to a thickness direction. In still further examples, a non-extended structure may comprise a second aspect ratio of about 1:1.

In some examples, a nanostructure may have a width dimension and/or thickness dimension ranging from about 0.1 nm to about 1000 nm. In other examples, a nanostructure may have a width dimension and/or thickness dimension ranging from about 1 nm to about 100 nm. In still further examples, a nanostructure may have a width dimension and/or thickness dimension of about 10 nm, about 100 nm, about 200 nm, about 300 nm, about 400 nm, about 500 nm, about 600 nm, about 700 nm, about 800 nm, about 900 nm, and/or about 1000 nm. In still further examples, a nanostructure may have a width dimension and/or thickness dimension of about 1 nm, about 10 nm, about 20 nm, about 30 nm, about 40 nm, about 50 nm, about 60 nm, about 70 nm, about 80 nm, about 90 nm, and/or about 100 nm. In still further examples, a nanostructure may have a width dimension and/or thickness dimension of about 1 nm, about 2 nm, about 3 nm, about 4 nm, about 5 nm, about 6 nm, about 7 nm, about 8 nm, about 9 nm, and/or about 10 nm. In still further examples, a nanostructure may have a width dimension and/or thickness dimension of about 0.1 nm, about 0.2 nm, about 0.3 nm, about 0.4 nm, about 0.5 nm, about 0.6 nm, about 0.7 nm, about 0.8 nm, about 0.9 nm, and/or about 1.0 nm.

Any of the three-dimensional solid structure described herein may have an outside surface area that defines a fraction of the structure's total mass, where the remainder of the structure's mass defines an internal mass. As used herein, the term "outside surface area" refers to the outermost atomic layer of a three-dimensional shape, comprising a mass fraction of $x_{osa}$. As used herein, the term "internal mass" refers to the remaining mass of the structure equal to the total mass of the structure minus the mass associated with the outermost atomic layer, corresponding to a mass fraction of $1-x_{osa}=x_{im}$.

Thus, in some examples, a nanostructure may have an outside surface area and an internal mass, where a first element may make up substantially all of the outside surface area and the internal mass. In some examples, up to about 100% of the outside surface area made from the first element may be replaced by a second element. In still further examples, about 10%, about 20%, about 30%, about 40%, about 50%, about 60%, about 70%, about 80%, about 90%, or about 100%, of the outside surface area constructed from the first element may be replaced by the second element. In still further examples, up to about 100% of the internal mass constructed from the first element may be replaced by the second element. In some examples, about 10%, about 20%, about 30%, about 40%, about 50%, about 60%, about 70%, about 80%, about 90%, or about 100%, of the internal mass having the first element may be replaced by the second element. In still further examples, about 1%, about 2%, about 3%, about 4%, about 5%, about 6%, about 7%, about 8%, about 9%, or about 10%, of the internal mass having the first element may be replaced by the second element. In other cases, only the outermost atomic layer of a nanostructure having a first element may be replaced by a second element. In still further examples, 1, 2, 3, or 4 outermost atomic layers of a nanostructure constructed of a first element may be replaced by a second element.

The first element may be at least one transition metal. For example, the first element may be at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and/or tin. In other examples, the first element may be at least one of manganese, iron, cobalt, nickel, copper, and/or zinc. Alternatively, the first element may include at least one of silver, gold, platinum, palladium, ruthenium, copper, nickel, and/or cobalt. In still further examples, the first element may be nickel. In still further examples, the first element may be in the form of an alloy, an oxide, or mixtures thereof.

The second element may be at least one transition metal. For example, the second element may be at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and/or tin. In other examples, the second element may be at least one of silver, gold, platinum, palladium, ruthenium, copper, nickel, and/or cobalt. Alternatively, the second element may be at least one of platinum, palladium, gold, and/or silver. In still further examples, the second element may be platinum.

Replacing a portion of at least one of the outside surface area, the internal mass, or both, of a nanostructure may include replacing at least a portion of the first element with a portion of the second element, where the first element includes at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and/or tin, and the second comprises at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and/or tin. Alternatively, replacing a portion of at least one of the outside surface area, the internal mass, or both, of a nanostructure may include replacing at least a portion of the first element with a portion of the second element, where the first element includes at least one of manganese, iron, cobalt, nickel, copper, and/or zinc, and the second element includes at least one of rhodium, palladium, silver, platinum, and/or gold. In further examples, replacing a portion of at least one of the outside surface area, the internal mass, or both, of a nanostructure may include replacing at least a portion of the first element with a portion of the second element, where the first element includes at least one of silver, gold, platinum, palladium, ruthenium, copper, nickel, and/or cobalt, and the second element includes at least one of silver, gold, platinum, palladium, ruthenium, copper, nickel, and/or cobalt. In still further examples, replacing a portion of at least one of the outside surface area, the internal mass, or both, of a nanostructure may include replacing at least a portion of the first element with a portion of the second element, where the first element is nickel and the second element is platinum. In still further examples, a first element may include at least one first element, and a second element may include at least one second element, where spontaneous galvanic displacement replaces one or more first elements with one or more second elements.

A mixture that includes the second element may include a fluid medium, such as a gas, a liquid, or combination thereof. In some examples, the fluid medium may be a liquid medium having a chemical compound that includes the second element. A liquid medium may include at least one of water, an alcohol, an organic solvent, and/or an ionic liquid. In still further examples, the liquid medium may include water, ethylene glycol, ethanol, methanol, acetone, nitric acid, sulfuric acid, and/or hydrochloric acid. In still further examples, the liquid medium may include water, ethanol, and/or methanol.

A chemical compound that includes the second element may be at least one of a chloroplatinate salt, rhodium trichloride, sodium chlororhodite, rhodium carbonyl acetylacetonate, silver oxide, silver acetate, silver bromide, silver chloride, silver cyanide, silver nitrate, gold chloride, and/or (phosphane)gold(I) complexes. In some cases, the chemical compound that includes the second element may be at least one of potassium tetrachloroplatinate and/or dipotassium platinum hexachloride. In some examples, the chemical compound that includes the second element may be completely soluble in the liquid medium. Alternatively, the chemical compound having the second element may be partially soluble in the liquid medium. In still further examples, the chemical compound having the second element may be only somewhat soluble in the liquid medium. In still further examples, mixing the chemical compound having the second element in the liquid medium may result in the formation of cationic species of the second metal.

In another exemplary case, the contacting of a nanostructure with a solution may result in the replacement of a portion of a first element of a nanostructure by a second element contained within the solution, to produce a first intermediate, where the replacement may be accomplished by electrodeposition. As used herein, electrodeposition includes at least one of electroplating, electrophoretic deposition, underpotential deposition, galvanic displacement, and/or spontaneous galvanic displacement. As used herein, "electroplating" refers to the process of using an electrical current to reduce dissolved metal cations so that they form a coherent metal coating on an electrode, e.g. a metal electrode. As used herein, the term "electrophoretic deposition" refers to the process of depositing colloidal particles suspended in a liquid medium onto an electrode under the influence of an electric field. As used herein, the term "underpotential deposition" refers to the reduction/deposition of a metal cation onto a metal substrate at a potential less negative than the equilibrium potential for the reduction of the metal cation. As used herein, the term "spontaneous galvanic displacement" refers to contacting a metal nanostructure acting as a template and having a first element, with another metal (e.g. the second element) in solution, which spontaneously results in the simultaneous corrosion (e.g. removal) of the first element from the template nanostructure, and the electrodeposition of the second element onto the template nanostructure, in the absence of an electric current or electric field.

For example, the first intermediate resulting from replacing a portion of the first element of the nanostructure with the second element may result in a first intermediate with a composition of up to about 100 mole % of the second element. In other examples, the first intermediate may be a coated nanostructured catalyst with a composition of about 10 mole % (a %), about 20 m %, about 30 m %, about 40 m %, about 50 m %, about 60 m %, about 70 m %, about 80 m %, about 90 m %, or about 100 m % of the second element. In still other examples, the first intermediate may be a coated nanostructured catalyst may with about 1 m %, about 2 m %, about 3 m %, about 4 m %, about 5 m %, about 6 m %, about 7 m %, about 8 m %, about 9 m %, or about 10 m % of the second element.

In some cases, the first intermediate resulting from replacing a portion of the first element of the nanostructure with a second element may be as low as about one atomic % of the first element. In other cases, the first intermediate may be a coated nanostructured catalyst with about 1 m %, about 10 m %, about 20 m %, about 30 m %, about 40 m %, about 50 m %, about 60 m %, about 70 m %, about 80 m %, about 90 m %, or about 99 m % of the first element. In still other examples, the first intermediate may be a coated nanostructured catalyst with about 90 m %, about 91 m %, about 92 m %, about 93 m %, about 94 m %, about 95 m %, about 96 m %, about 97 m %, about 98 m %, or about 99 m % of the second element.

The first intermediate produced may have a porous surface. A porous solid structure of the first intermediate may be characterized by any of a variety of physical property metrics, including but not limited to, surface area and density. Some of the nanostructures described herein may have surface areas ranging from about 0.1 $m^2/g$ to about 1000 $m^2/g$. Other examples of the nanostructures described herein may have surface areas ranging from about 1.0 $m^2/g$ to about 100 $m^2/g$. Still other nanostructures described herein may have surface areas of about 1.0 $m^2/g$, about 10 $m^2/g$, about 20 $m^2/g$, about 30 $m^2/g$, about 40 $m^2/g$, about 50 $m^2/g$, about 60 $m^2/g$, about 70 $m^2/g$, about 80 $m^2/g$, about 90 $m^2/g$, or about 100 $m^2/g$.

The first intermediate may have an outside layer of or including the second element with a wall thickness of about 1 pm to about 1000 nm. In other examples, the first intermediate may have an outside layer of or including the second element with a wall thickness of about 10 pm to about 100 nm. In still further examples, the first intermediate may have an outside layer of or including the second element with a wall thickness of about 100 pm to about 100 nm. In still further examples, the first intermediate may have an outside layer of or including the second element that with a wall thickness of about 1 nm to about 100 nm. In other cases, the first intermediate may have an outside layer of the second element with a wall thickness of about 1 nm, about 10 nm, about 20 nm, about 30 nm, about 40 nm, about 50 nm, about 60 nm, about 70 nm, about 80 nm, about 90 nm, or about 100 nm.

Contacting a nanostructure starting material/template having the first element with a mixture and/or solution having the second element may include adding the nanostructure to a liquid medium and dispersing the nanostructure within the liquid medium by agitation to create a slurry or suspension of the nanostructure in the liquid medium. In some cases, the second element may or may not be in the liquid medium initially when first adding the nanostructure to the liquid medium. Agitation may be achieved by mechanical agitation, for example, by the use of a rotating impeller, by the use of static mixers, by ultrasound, or by two-phase mixing, for example, by feeding either a pressurized gas into the liquid medium, and/or by pumping the liquid medium through a liquid jet or nozzle and through a recirculation loop. Contacting the nanostructure template with the mixture containing the second element, where the mixture contains the liquid medium, may be carried out in a stirred tank reactor or a tubular reactor. The contacting of the nanostructured template material having the first element, with the second element may take place in a batch fashion or a continuous fashion. In still further embodiments, the contacting step may be carried out in two or more stirred tank reactors in series. In some cases, a minimum agitation is provided to avoid settling of the nanostructure by gravity.

Contacting a first nanostructure template material having a first element with a mixture having a second element in a liquid medium may include the simultaneous or step-wise addition of the second element to the liquid medium. In some cases, the second element may be added to the liquid medium before addition of the nanostructure having the first element. In other examples, addition of the second element to the liquid medium may be by at least one bolus addition, and/or by the continual addition of the liquid medium having the second element. In still further examples, the continual addition of a continuous stream of the liquid medium having the second element may be at a linear ramped feed rate, or some other time-dependent function; e.g. step function, parabolic, logarithmic, etc.

The contacting step may be performed at a temperature of about 21° C. to about 800° C. In other examples, the contacting step may be performed at a temperature ranging from about 21° C. to about 500° C. In still other examples, the contacting step may be performed at a temperature ranging from about 21° C. to about 300° C. In still further examples, the contacting step may be performed at a temperature of about 21° C., about 30° C., about 40° C., about 50° C., about 60° C., about 70° C., about 80° C., about 90° C., about 100° C., about 110° C., or about 120° C. In still further examples, the contacting step may be performed at a temperature of about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., or about 110° C.

The contacting step may be performed at a pressure of about 10 psia to about 100 psia. In some examples, the contacting step may be performed at a pressure of about 14 psia to about 30 psia. In still further examples, the contacting step may be performed at a pressure of about 14 psia, about 14.7 psia, about 15 psia, about 16 psia, about 17 psia, about 18 psia, about 19 psia, about 20 psia, about 21 psia, about 22 psia, about 23 psia, about 24 psia, about 25 psia, about 26 psia, about 27 psia, about 28 psia, about 29 psia, or about 30 psia. The contacting step may be performed for a period of time of about 1 minute to about 12 hours. In some embodiments, the contacting step may be performed for a period of time of about 1 hour to about 6 hours. In still further embodiments, the contacting step may be performed for a period of time of about 1 hour, about 2 hours, about 3 hours, about 4 ours, about 5 hours, or about 6 hours.

In some cases, an additional chemical compound may be added to the mixture and contacted with the nanostructure and the second element, where the additional chemical compound may include at least one salt, acid, and/or base. For example, a halide salt may be added to a mixture containing a solvent, the first element, and the second element. In other examples, a salt have at least one of an acetate and/or a chloride may be added to a mixture of the nanostructured template material of the first element and a liquid medium having the second element. In still other examples, an additional chemical compound may include at least one acid. An additional chemical compound added to the liquid medium may be by at least one bolus addition, or by the continual addition of a feed stream, or both. A continual addition of the additional chemical compound may be a linear ramped feed rate, or some other time-dependent function; e.g. step function, parabolic, logarithmic, etc.

In some embodiments of the present invention, a contacting step for replacing the first element of a nanostructure with a second element to produce a first intermediate may be followed by at least one of a cooling step, a washing step, and/or any other suitable post-treatment step. For example, a post-treatment after the contacting may include cooling the mixture to about 21° C. In other examples, a post-treatment may include washing the first intermediate and separating the first intermediate from the liquid medium. This may then be followed by a subsequent second contacting of the first intermediate with a washing medium, followed by a second separating of the first intermediate from the washing medium. In still further embodiments of the present invention, a washing medium may include at least one of water, an alcohol, and/or an organic solvent. In other cases, a washing medium may include at least one of water, methanol, ethanol, propanol, butanol, acetone, and/or toluene. One or more separating steps may be accomplished by at least one of centrifugation, filtration, and/or evaporation. In some examples, the first intermediate may be separated from the liquid medium by centrifugation, followed by a washing step with 1-propanol, followed by a second centrifugation step to produce a washed first intermediate with all free washing medium removed. As used herein, the terms "free water" or "free liquid" or "free washing medium" refers to the liquid portion of a liquid/solid mixture that separates from the solid when under the influence of one g of force. Alternatively, the liquid that is not "free liquid" refers to the portion of the liquid that remains trapped in the pore volume and intersticial spaces of the solid and requires some other method to remove; e.g. filtration, evaporation. In other examples, a first intermediate may have a final liquid content, either liquid medium and/or washing medium, of about 65 weight % (wt %) liquid, about 60 wt % liquid, about 50 wt % liquid, about 40 wt % liquid, or about 30 wt % liquid. In some cases, the first intermediate may be used as a catalyst itself, and may not undergo the additional processing step described below.

A post-treatment step may include at least one of an acid treatment, a base treatment, an oxidation step, and/or a reduction step, of the first intermediate to form a second intermediate. In some cases, the post-treatment step may include contacting the first intermediate with at least one of nitric acid, hydrochloric acid, and/or sulfuric acid. Such post-treatment may be performed under agitation. In addition, post-treatment may be performed at a temperature of about 21° C. to about 300° C. and at a time period of about 10 minutes to about 12 hours.

In some cases, after contacting, the first intermediate may be annealed in an environment comprising a first temperature and a first gas to produce a second intermediate. For example, annealing the first intermediate may be performed at a first temperature of about 100° C. to about 1500° C. In other examples, annealing the first intermediate may be performed at a first temperature of about 100° C. to about 1000° C. In still further examples, annealing the first intermediate may be performed at a first temperature of about 100° C. to about 600° C. In still further examples, annealing the first intermediate may be performed at a first temperature of about 100° C., about 200° C., about 300° C., about 400° C., about 500° C., about 600° C., about 700° C., about 800° C., about 900° C., or about 1000° C.

Annealing the first intermediate may be performed at a pressure of about 10 psia to about 100 psia. In some examples, annealing the first intermediate may be performed at a pressure of about 14 psia to about 30 psia. In other examples, annealing the first intermediate may be performed at a pressure of about 14 psia, about 14.7 psia, about 15 psia, about 16 psia, about 17 psia, about 18 psia, about 19 psia, about 20 psia, about 21 psia, about 22 psia, about 23 psia, about 24 psia, about 25 psia, about 26 psia, about 27 psia, about 28 psia, about 29 psia, or about 30 psia. Annealing the first intermediate may be performed for a period of time of about 1 minute to about 12 hours. In some case, annealing the first intermediate may be performed for a period of time of about 1 hour to about 6 hours. In other cases, annealing the first intermediate may be performed for a period of time of about 1 hour, about 2 hours, about 3 hours, about 4 ours, about 5 hours, or about 6 hours.

Annealing the first intermediate may be in the presence of a first gas having at least one of argon, nitrogen, oxygen ($O_2$), and/or hydrogen ($H_2$). In some examples, the first gas may include at least one of argon and/or nitrogen, and $H_2$. In other examples, the first gas may include at least one of argon and/or nitrogen, and $H_2$, where the $H_2$ may be present at a volumetric concentration of about 1 volume % (v %) to about 100 v %. In still other examples, the first gas may include at least one of argon and/or nitrogen, and $H_2$, where the $H_2$ may be present at a volumetric concentration of about 5 v % to about 50 v %. In still other examples, the first gas may include least one of argon and/or nitrogen, and $H_2$, where the $H_2$ may be present at a volumetric concentration of about 5 v %, about 10 v %, about 15 v %, about 20 v %, about 25 v %, about 30 v %, about 35 v %, about 40 v %, about 45 v %, or about 50 v %. In some cases, the second intermediate resulting from annealing the first intermediate may be used itself as a catalyst, and may not require the subsequent processing steps described below.

In some cases, the second intermediate may be treated with acid to produce a third intermediate. For example, an acid treatment may include contacting the second intermediate with an acid such as nitric acid, hydrochloric acid, and/or sulfuric acid. An acid may be concentrated or diluted. Acid treating of the second intermediate may be performed at a temperature of about 21° C. to about 500° C. In other cases, acid treating may be performed at a temperature of about 21° C. to about 300° C. In still other cases, acid treating may be performed at a temperature of about 21° C., about 30° C., about 40° C., about 50° C., about 60° C., about 70° C., about 80° C., about 90° C., about 100° C., about 110° C., or about 120° C. In still further examples, acid treating may be performed at a temperature of about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., or about 110° C.

Acid treating of the second intermediate may be performed at a pressure ranging from about 10 psia to about 100 psia. For example, acid treating may be performed at a pressure ranging from about 14 psia to about 30 psia. In other examples, acid treating of the second intermediate may be performed at a pressure of about 14 psia, about 14.7 psia, about 15 psia, about 16 psia, about 17 psia, about 18 psia, about 19 psia, about 20 psia, about 21 psia, about 22 psia, about 23 psia, about 24 psia, about 25 psia, about 26 psia, about 27 psia, about 28 psia, about 29 psia, or about 30 psia. Acid treating of the second intermediate may be performed for a period of time of about 1 minute to about 12 hours. In other examples, acid treating may be performed for a period of time of about 1 hour to about 6 hours. In still further embodiments of the present invention, acid treating of the second intermediate may be performed for a period of time of about 1 hour, about 2 hours, about 3 hours, about 4 ours, about 5 hours, or about 6 hours. In embodiment, the third intermediate resulting from acid treating the second intermediate may be used itself as a catalyst, and may not require the subsequent processing steps described below.

In some embodiments of the present invention, the third intermediate resulting from the acid treatment may be annealed in an environment having a second temperature and a second gas to produce as coated nanostructured catalyst. For example, the third intermediate may be annealed a second temperature of about 100° C. to about 1500° C. In other examples, annealing the third intermediate may be performed at a second temperature of about 100° C. to about 1000° C. In yet other examples, annealing the third intermediate may be performed at a second temperature of about 100° C. to about 600° C. Alternatively, annealing the third intermediate may be performed at a second temperature of about 100° C., about 200° C., about 300° C., about 400° C., about 500° C., about 600° C., about 700° C., about 800° C., about 900° C., or about 1000° C.

Annealing the third intermediate may be performed at a pressure of about 10 psia to about 100 psia. In some examples, annealing the third intermediate may be performed at a pressure of about 14 psia to about 30 psia. In still further examples, annealing the third intermediate may be performed at a pressure of about 14 psia, about 14.7 psia, about 15 psia, about 16 psia, about 17 psia, about 18 psia, about 19 psia, about 20 psia, about 21 psia, about 22 psia, about 23 psia, about 24 psia, about 25 psia, about 26 psia, about 27 psia, about 28 psia, about 29 psia, or about 30 psia. Annealing the third intermediate may be performed for a period of time of about 1 minute to about 12 hours. In some examples, annealing the third intermediate may be performed for a period of time of about 1 hour to about 6 hours. In still further embodiments, annealing the third intermediate may be performed for a period of time of about 1 hour, about 2 hours, about 3 hours, about 4 ours, about 5 hours, or about 6 hours.

Annealing the third intermediate may be in the presence of a second gas comprising at least one of argon, nitrogen, oxygen ($O_2$), and/or hydrogen ($H_2$). For example, the second gas may include at least one of argon and/or nitrogen, and $O_2$. In other examples, the second gas may include at least one of argon and/or nitrogen, and $O_2$, where the $O_2$ may be present at a volumetric concentration of about 1 volume % (v %) to about 100 v %. In still further examples, the second gas may include at least one of argon and/or nitrogen, and $O_2$, where the $O_2$ may be present at a volumetric concentration of about 5 v % to about 50 v %. In still further embodiments, the second gas may include at least one of argon and/or nitrogen, and $O_2$, where the $O_2$ may be present at a volumetric concentration of about 5 v %, about 10 v %, about 15 v %, about 20 v %, about 25 v %, about 30 v %, about 35 v %, about 40 v %, about 45 v %, or about 50 v %. In some examples, the nanostructures produced by some of the methods described herein, and/or nanostructured catalysts may be substantially hollow structures.

The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any sub-combination.

Further aspects of the present invention include a variety of reactions or applications that utilize the catalysts described herein. These applications include but are not limited to those in acidic, basic, neutral, or buffer media. The intended reactions include but are not limited to hydrogen oxidation, hydrogen evolution, oxygen reduction, and oxygen evolution. The intended reactions further include the electrochemical oxidation of any fuel, including but not limited to alcohol (e.g. methanol, ethanol, and ethylene glycol), hydrogen peroxide, formic acid, and hydrazine.

The invention now being generally described will be more readily understood by reference to the following examples, which are included merely for the purposes of illustration of certain aspects of the embodiments of the present invention. The examples are not intended to limit the invention, as one of skill in the art would recognize from the above teachings and the following examples that other techniques and methods can satisfy the claims and can be employed without departing from the scope of the claimed invention.

Example 1

An example of an actual reduction to practice of the present invention is described below.

Platinum nickel nanowires (PtNiNWs) synthesized by the spontaneous galvanic displacement of nickel nanowires (NiNWs) with platinum. NiNWs were dispersed by sonication in 70 ml of water in a 250 ml round bottom flask. The flask contents were heated by oil bath to 90° C. and stirred at approximately 500 rpm by a Teflon paddle (glass shaft). After about a 15 minutes wait period, a platinum precursor (potassium tetrachloroplatinate in 15 ml water) was added dropwise by syringe pump over a period of about 15 minutes. In the synthesis of PtNiNWs (7.3±0.3 wt. % Pt), 7.1 mg of potassium tetrachloroplatinate was added; in the synthesis of PtNiNWs (16.4 wt. % Pt), 1.0 g of potassium tetrachloroplatinate was added. Following the addition of the platinum precursor, the reaction continued for about 2 hours at about 90° C., at which point it was cooled to room temperature. PtNiNWs were washed in water and 2-propanol and collected by centrifugation. Annealing of the PtNiNWs was completed in hydrogen (10%) or oxygen (100%) with low gas flow, with about 500 torr of back pressure, and a 10° C. $min^{-1}$ ramp rate.

Material compositions were determined by inductively coupled plasma-mass spectrometry (ICP-MS), taken on a Thermo Scientific iCAP Q. Samples were digested in aqua regia and diluted to three concentrations and filtered (which were matrix matched to 1.5% hydrochloric acid, 0.5% nitric acid). The instrument was calibrated to a blank and three Pt Ni standards and measurements (of each dilution) were taken three times at a dwell time of about 0.15 seconds. Following the analysis of every five dilutions, the ICP-MS was checked to internal standards. ICP-MS was also completed on electrolytes (0.1 M perchloric acid) following electrochemical break-in and durability testing. Electrolytes were filtered but not diluted for analysis since the Pt Ni concentrations were on a ppb level, above the detection limit but well below a concentration to flood the detector.

Field emission scanning electron microscopy (FESEM) images were taken on a JEOL JSM-7000F microscope. XRD patterns were taken on a Bruker D8 Discover at 40 kV and 35 mA over a period of about 1 hour. Samples were prepared dry on double-sided carbon tape and attached to a glass slide. An XRD pattern of the blank (carbon tape and glass slide) was subtracted from the presented XRD data.

Electrochemical testing was completed in RDE half-cells in a 0.1 M perchloric acid electrolyte. The RDE half-cell contained a glassy carbon working electrode, a platinum mesh counter electrode, and a RHE reference electrode (glass bubbler containing hydrogen-saturated 0.1 M perchloric acid, connected to the main cell by Luggin capillary). Electrochemical measurements were taken with an Autolab potentiostat (Eco Chemie, Metrohm Autolab B.V.) and rotation of the working electrode was controlled by a modulated speed controller (Pine Instrument Company).

Catalyst inks were prepared at a concentration of about 0.2 mg $ml^{-1}$ (water to 2-propanol ratio of 3.8 ml to 1.2 ml) with Nafion added (4 µl per ml of ink) to improve dispersion. Inks were sonicated (horn for about 30 seconds, bath for about 20 minutes, horn for about 30 seconds), then dispensed (10 µl) onto the working electrodes (dried for about 20 minutes at about 40° C.) and weighed (three aliquots of 100 µl) after drying (about 20 minutes at about 60° C.) on a microbalance to determine the exact ink concentration (weight of Nafion substracted). Sonication (about 20 minutes bath, about 30 seconds horn) of the inks continued and the inks were dispensed onto the working electrodes (after about every 20.5 minutes cycle) in order to build the electrode loading and achieve full diffusion limited currents in ORR. The process was repeated with graphitized carbon nanofibers added (about 60 wt %) to improve ink dispersion. Pt/HSC (46 wt % Pt, Tanaka Kikinzoku Kogyo) was used as a benchmark catalyst in this study. Pt/HSC inks contained about 7.6 mg of catalyst, about 7.6 ml of water, about 2.4 ml of 2-propanol, and about 40 µl of Nafion. After sonication (about 20 minutes), about 10 µl of ink was dispensed onto working electrodes and dried (about 20 minutes at about 40° C.).

Electrochemical surface areas (ECAs) were determined by carbon monoxide oxidation voltammograms. Working electrodes were held at about 0.1 volts versus RHE reference electrodes for about 20 minutes in a 0.1 M perchloric acid electrolyte. For about the first 10 minutes, carbon monoxide was bubbled into the electrolyte to adsorb a layer onto the catalyst. For about the second 10 minutes, nitrogen was bubbled into the electrolyte to remove excess carbon monoxide. Due to the location of the bubbler, rotation (~2500 rpm) of the working electrode was required during this process. Electrode rotation and gas bubbling were turned off 30 seconds prior to the end of the 20 minute hold. A linear sweep was immediately run at 20 mV $s^{-1}$ anodically to about 1.2 volts versus the RHE reference electrode, then cathodically to about 0.025 volts versus the RHE reference electrode. Cyclic voltammograms (about 0.025 volts to about 1.2 volts vs. RHE) were run thereafter to ensure excess carbon monoxide had been removed from the RDE half-cell prior to the end of the potential hold. ECAs were calculated from carbon monoxide oxidation voltammograms assuming a Coulombic charge of 420 µC $cmPt^{-2}$.

ECAs were also verified by the charge associated with hydrogen adsorption, assuming a Coulombic charge of about 210 µC $cmPt^{-2}$. For carbon supported Pt nanoparticles (Pt/HSC), the ECA calculated from carbon monoxide was higher (~1.4%) than that calculated from hydrogen adsorption. This was expected and likely due to Pt oxide reduction partially obscuring the double charging layer. For PtNiNWs, the ECAs from carbon monoxide were slightly smaller (about 95% to about 98%) than those calculated from hydrogen adsorption. This was not expected since it was anticipated that Ni would obscure the double charging layer. Cyclic voltammograms (for hydrogen adsorption) were completed with a high upper potential (about 1.4 V vs. RHE) and fast scan rate (about 100 mV $s^{-1}$) to ensure a clean Pt surface. It was possible that the potential hold (~0.1 V vs. RHE for carbon monoxide oxidation) allowed small amounts of Ni to plate onto Pt, lowering the ECA.

ORR polarization curves were taken anodically at ~20 mV $s^{-1}$ in the potential range of about −0.01 volts to about 1.0 volt vs. RHE at about 1600 rpm in an oxygen-saturated 0.1 M perchloric acid electrolyte. The diffusion limited currents for ORR (about 4.5 to about 4.9 mA cmelec$^{-2}$) were lower than typically found at sea level, due to the elevation where the experiments were completed (83.2 kPa at 5674 ft of elevation). These diffusion limited currents, however, were typical for the elevation and predicted by the Levich equation, where the diffusion limited current is linearly proportional to the partial pressure of oxygen. The diffusion limited currents were not corrected in the linear polarization curves. ORR activities, however, were corrected for mass transport (by the Koutecky-Levich equation), the internal resistance of the electrolyte (~18-25Ω, depending on electrode), and the partial pressure of oxygen (reaction order of about 0.75 at about 0.9 volts vs. RHE). [16]

Accelerated durability testing was completed by potential cycling (30,000 cycles) in the range 0.6-1.0 V vs. RHE in a nitrogen-saturated 0.1 M perchloric acid electrolyte. Full cyclic voltammograms were taken (every 1000 cycles until 5000, every 5000 thereafter) to monitor catalyst ECA (by hydrogen underpotential deposition). ORR polarization curves and carbon monoxide oxidation voltammograms were taken following durability testing.

PtNiNWs were synthesized by the partial spontaneous galvanic displacement of NiNWs and largely maintained the morphology of the template material. NiNWs (as-received) were approximately 200-300 nm in diameter and 200 µm in length, but contained a subset of smaller nanowires (~50-100 nm in diameter, ~100 µm in length). The annealing of PtNiNWs in hydrogen did not appear to appreciably change morphology or nanowire dimension (see FIGS. 4a through 4e). The subset of smaller nanowires (~50-100 nm in diameter) persisted at high annealing temperature (about 400° C.); therefore, it did not appear that ripening of the wires occurred at elevated temperature. The samples at lower temperature (about 150, about 200° C.) contained several thicker wires (~300-400 nm). It was possible that annealing in hydrogen to higher temperatures reduced the oxide coating on the PtNiNWs, slightly reducing the nanowire diameter (although subsequent exposure to air would have formed at thin oxide coating at the nanowire surface).

Although the morphology of the PtNiNWs largely remained the same, the Pt lattice shifted significantly with annealing in hydrogen (see FIGS. 5a through 5d). Examination of the Pt (111) reflection revealed a gradual shift from a "pure" Pt lattice (3.92 Å) to a "pure" Ni lattice (3.52 Å). The perceived shift in the Pt (111) reflection at low to moderate temperature could have partially been due to Ni lattice expansion as it incorporated into the Pt lattice. The disappearance of the Pt (111) peak in spite of the constant Pt content (7.3±0.3 wt. % Pt), however, clearly indicated Pt lattice compression. Although a slight shoulder persisted at 500° C., the Pt (111) reflection had almost entirely merged with the Ni (111) reflection.

Figures 6A, 6B:
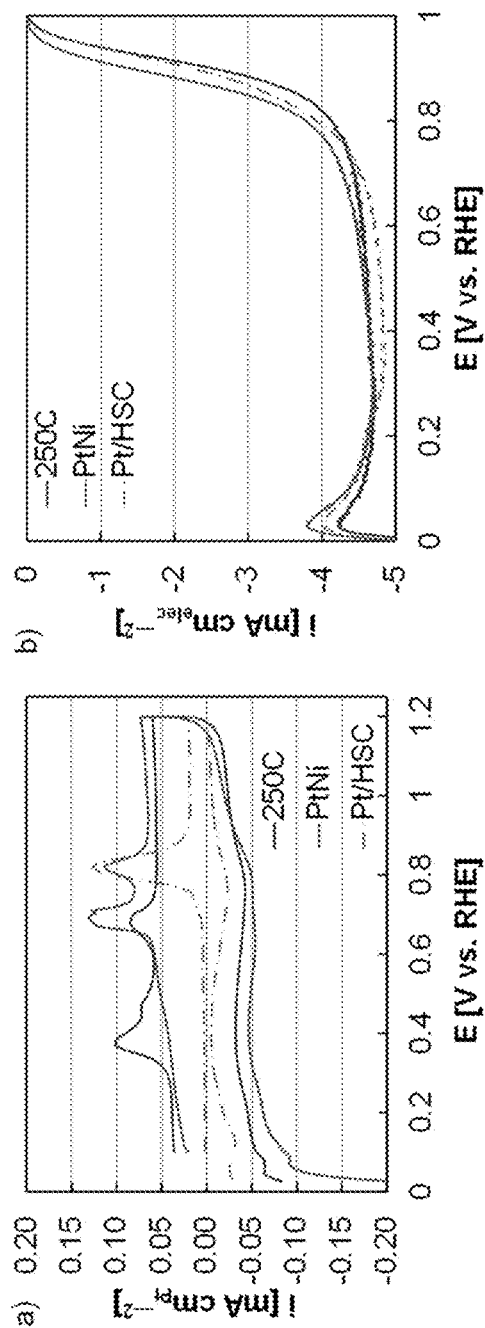
FIGS. 6a and 6b illustrate experimental data derived from some embodiments of the present invention. Carbon monoxide oxidation voltammograms (FIG. 6a) and ORR polarization curves (FIG. 6b) of PtNiNWs (untreated and annealed in hydrogen to ~250° C.) and Pt/HSC. Carbon monoxide oxidation voltammograms were plotted normalized to the Pt area. The double charging layer was larger for the PtNiNWs due to the higher carbon loading relative to the Pt loading (PtNiNW electrodes contained ~45.0 µg cmelec$^{-2}$ of graphitized carbon nanofibers, Pt/HSC electrodes contained ~20.9 µg cmelec$^{-2}$ of high surface area carbon). Although the raw ORR current of PtNiNWs (annealed in hydrogen to ~250° C.) was fractionally larger than Pt/HSC, the ORR activity was much higher since the Pt loading was much lower (PtNiNW electrodes contained ~2.2 µgPt cmelec$^{-2}$, Pt/HSC electrodes contained ~17.8 µgPt cmelec$^{-2}$). The Pt loading of PtNiNWs was kept low to prevent the raw ORR current from reaching the diffusion limited current at ~0.9 V vs. a reversible hydrogen electrode (RHE). The ORR diffusion limited currents observed were lower than typically found at sea level.
Figure 7:
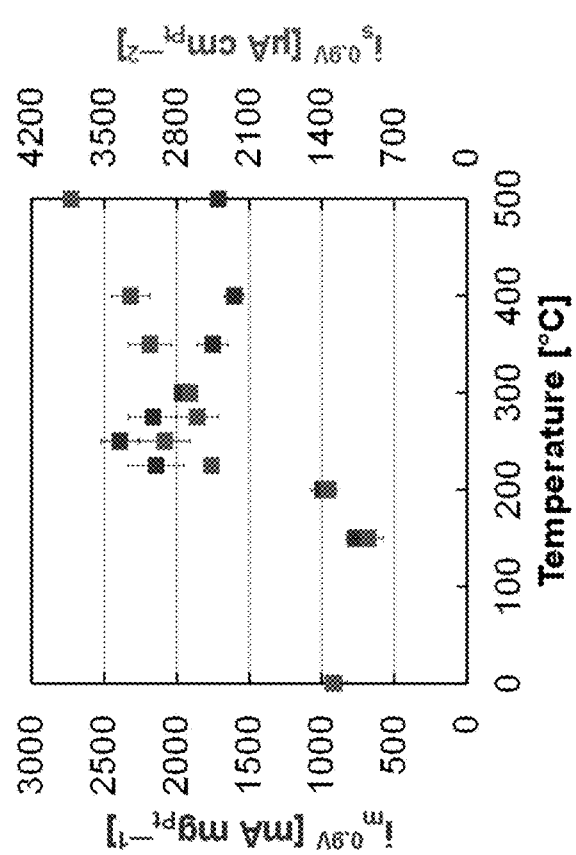
FIG. 7 illustrates experimental data derived by some embodiments of the present invention, ORR activity of PtNiNWs (7.3±0.3 wt % Pt) annealed in hydrogen (temperature specified on x-axis). The activity of the untreated PtNiNWs was included at 0° C.
Figures 8A, 8B:
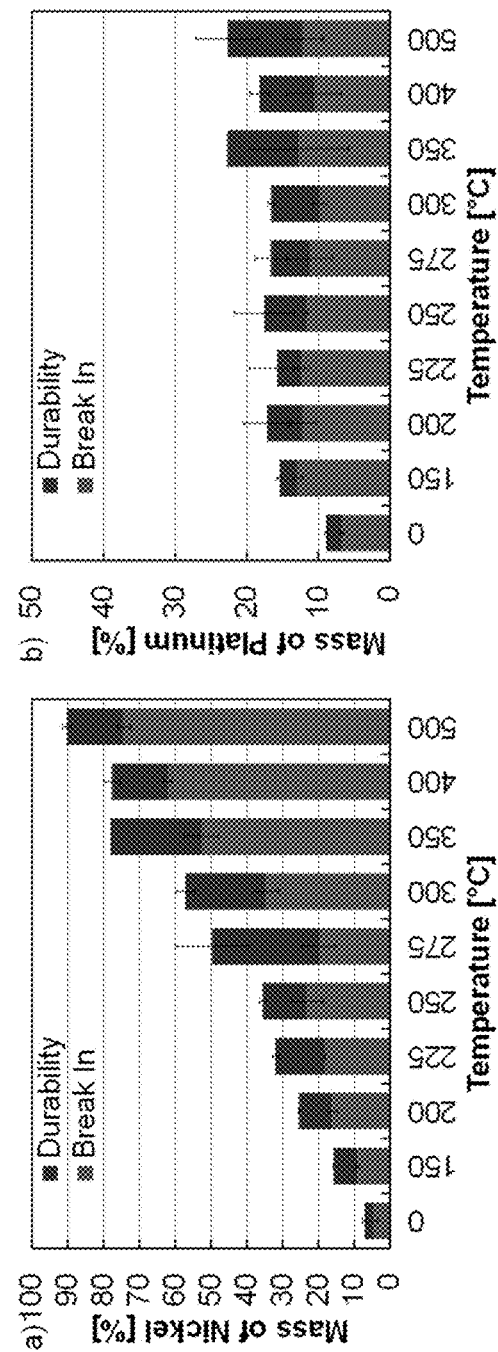
FIGS. 8a and 8b summarize experimental data derived by some embodiments of the present invention: inductively coupled plasma mass spectroscopy (ICP-MS) of rotating disk electrode (RDE) electrolytes (following break-in and durability) from PtNiNWs (7.3±0.3 wt % Pt) annealed in hydrogen (temperature specified on x-axis). Data presented on percentage, based on the amount of Ni and Pt coated on the working electrode (approximately 0.43 µgPt, 5.45 µgNi depending on exact ink concentration).

ORR specific activities steadily increased with increasing annealing temperature in hydrogen (FIGS. 6a, 6b, and 7). At ~500° C., PtNiNWs produced a specific activity of 3821 µA cmPt$^{-2}$, a maximum in the examined temperature range and about 12.7 times greater than Pt/HSC (about 300 µA cmPt$^{-2}$). Starting from about 225° C., catalyst electrochemical surface area (ECA) decreased with increasing temperature, potentially due to either an increased prevalence of Ni on the nanowire surface or increased dissolution during electrochemical break-in (FIGS. 8a and 8b). ORR mass activities reached a peak of ~2395 mA mgPt$^{-1}$ at approximately 250° C., about 7.8 times greater than Pt/HSC (306 mA mgPt$^{-1}$).

Figures 9A, 9B:
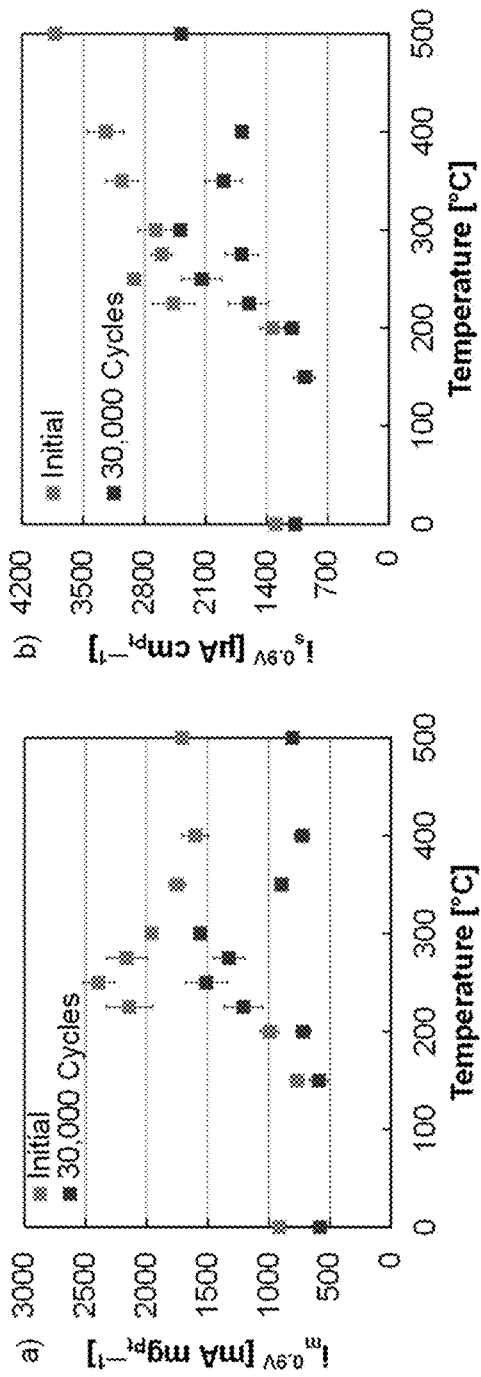
FIGS. 9a and 9b illustrate experimental data derived by some embodiments of the present invention: mass (FIG. 9a) and specific ORR activities (FIG. 9b) of PtNiNWs (7.3±0.3 wt % Pt) annealed in hydrogen (temperature specified on x-axis) prior to and following durability testing. Durability testing consisted of cycles (30,000) in the potential range from about 0.6 volts to about 1.0 volts vs. RHE in a 0.1 M perchloric acid electrolyte.

The ORR durability losses (in RDE half-cells) of PtNiNWs (annealed in hydrogen) were generally higher than the untreated material in terms of raw value (see FIGS. 9a and 9b). These losses, however, were relatively constant (in terms of mass ORR activity) on a percentage basis. With the untreated PtNiNWs, loss of ORR mass activity (~36% loss) was due to a slightly larger loss in ECA (~23% loss) than specific activity (~17% loss). Following hydrogen annealing, losses were increasingly due of specific activity, potentially due to dealloying driven by potential cycling. For PtNiNWs annealed to about 250° C., mass activity decreased to about 1512 mA mgPt$^{-1}$ (~37% loss) and was due to a slightly larger decline in specific activity (~26% loss) than ECA (~14% loss). The ORR mass activity of PtNiNWs (~250° C.) was also approximately 6.7 times greater than Pt/HSC (~225 mA mgPt$^{-1}$).

The high-performing catalyst (PtNiNWs, 7.3±0.3 wt. % Pt, annealed at about 250° C. in hydrogen) was then annealed in oxygen. Previous annealing of PtNiNWs in oxygen was found to increase the thickness of the oxide layer (on the nanowire surface) and reduce losses in durability testing. Annealing of the PtNiNWs in oxygen did not appear to appreciably change the nanowire morphology, reduce the subset of smaller nanowires (from about 50 nm to about 100 nm in diameter), or change the Pt lattice. A nickel oxide peak (NiO (111), NiO (200)) was partially obscured) appeared at about 250° C. due to the formation of bulk NiO. Although the nanowires contained an oxide layer (thin coating due to exposure to air), the oxide content was not enough to appear in X-ray diffraction (XRD) patterns prior to annealing in oxygen (at about 250° C.). Annealing in oxygen generally eliminated ORR activity at temperatures greater than about 150° C. This decay was more severe than previously observed on PtNiNWs not treated in hydrogen. The larger drop in activity was likely due to an increased presence of Ni on the nanowire surface (due to alloying, annealing in hydrogen). Subsequent annealing in oxygen likely increased the thickness of the oxide layer, which reduced Ni dissolution during electrochemical break-in and access to Pt sites. Improvements in ORR activity (and ECA) were observed following durability testing (~30,000 cycles), but these improvements did not reach the initial activity of the PtNiNWs not annealed in oxygen. Repeated durability testing continued Ni dissolution and improved activity (up to ~60,000 cycles), but eventually mirrored the losses observed in the PtNiNWs (not annealed in oxygen).

PtNiNWs (7.3±0.3 wt. % Pt), annealed in hydrogen to about 250° C., were treated with acid in an effort to remove Ni prior to annealing in oxygen. The materials were exposed to acetic, nitric, and sulfuric acid over a range of time (from about 2 hours to about 16 hours) and temperature (room temperature or reflux) to produce PtNiNWs with a wide range of compositions. In general, acetic, nitric, and sulfuric acid removed slight, moderate, and heavy amounts of Ni (in that order). The nanowire dimensions remained relatively unchanged until moderate amounts of Ni removal (greater than about 30 wt % Pt), where the wire length shortened to a range from about 1 µm to about 100 µm. XRD patterns also showed that the Pt (111) reflection gradually shifted to a characteristically Pt location with increasing Ni removal. PtNiNWs (7.3±0.3 wt. % Pt) annealed in hydrogen (at about 250° C.), produced two carbon monoxide oxidation peaks: one at a typically Pt potential; and the other at a lower potential, indicative of surface Ni providing oxophilic species to nearby Pt sites. Acid treatment (moderate levels) appeared to dealloy the surface, shifting carbon monoxide oxidation to a single peak, at a typically Pt potential. These experiments however were completed after electrochemical break-in and did not necessarily reflect the catalyst surface composition upon entering the electrolyte. Cyclic voltammograms in base (potassium hydroxide) also showed more prominent Pt features with increasing Pt content.

Figure 10:
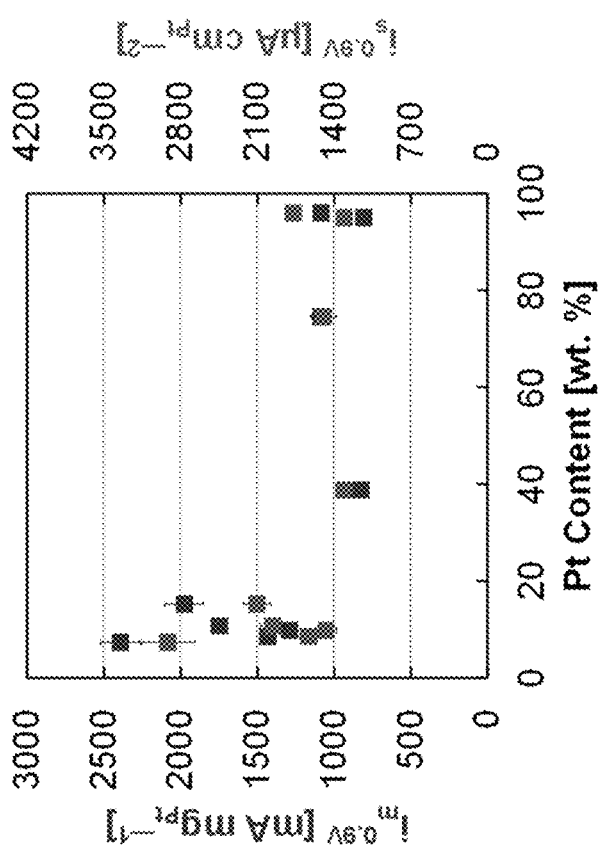
FIG. 10 illustrates experimental data derived by some embodiments of the present invention: ORR activity of PtNiNWs (7.3±0.3 wt % Pt) annealed in hydrogen to about 250° C. and acid leached (to remove Ni by acetic, nitric, or sulfuric acid). The activity of the PtNiNWs (annealed in hydrogen to about 250° C., not acid leached) was included. Activities were plotted versus the composition (wt % Pt) following acid leaching.

The ORR activities of these materials dropped even at slight amounts of Ni removal (see FIG. 10). The mass activities, however, were approximately 1000 mA mgPt$^{-1}$ over a wide range of compositions (greater than about 30 wt % Pt) and were significantly larger than PtNiNWs where acid was added during the displacement process. These materials are of particular interest in MEAs. Although PtNiNWs (7.3±0.3 wt. % Pt) produced high RDE activity, the high Ni content and surface composition can potentially complicate MEA incorporation. Although the RDE activities of the acid treated materials were lower, these catalysts contain significantly less Ni (potentially easier in MEA electrode fabrication) and less Ni on the nanowire surface (potentially less of a Ni contamination issue). Additionally, the durability of these catalysts improved. As an example, PtNiNWs (~74.5 wt % Pt) produced an ORR mass activity of about 1054 mA mgPt$^{-1}$ following durability testing, about 3% less than the initial activity and about 4.7 times greater than Pt/HSC. Acid treatment prior to electrochemical testing also reduced loss of Ni and Pt on a percentage basis.

Figure 11:
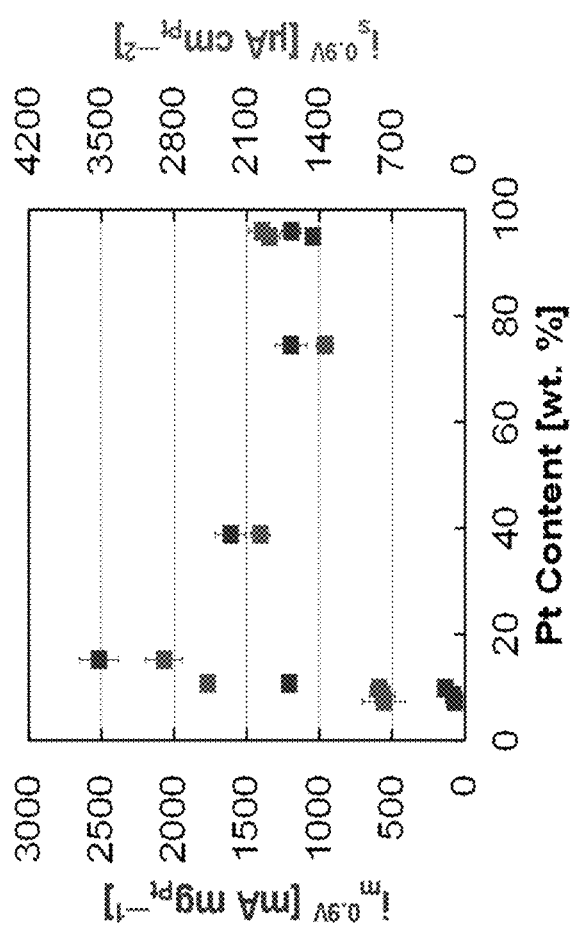
FIG. 11 shows experimental data derived by some embodiments of the present invention: ORR activity of PtNiNWs (7.3±0.3 wt % Pt) annealed in hydrogen to about 250° C., acid leached (to remove Ni by acetic, nitric, or sulfuric acid), and annealed in oxygen to 175° C. The activity of the PtNiNWs (annealed in hydrogen to 250° C., not acid leached, and annealed in oxygen to 175° C.) was included. Activities were plotted versus the composition (wt % Pt) following acid leaching.

These materials were annealed in oxygen to about 175° C. in an effort minimize durability loss, particularly for the higher-performing catalysts (at low Pt content). At very slight Ni removal (less than about 10 wt % Pt), a high proportion of Ni was left on the nanowire surface; the subsequent oxidation reduced Ni dissolution, ECA, and ORR activity (see FIG. 11). At heavy Ni leaching (greater than about 70 wt % Pt), oxidation of the PtNiNWs did not appreciably change initial activity, but did marginally improve durability (although heavy losses were not observed with samples not annealed in oxygen). At moderate Ni leaching (from about 10 wt % to about 40 wt % Pt), however, annealing in oxygen allowed for high initial activity and dramatically improved the durability characteristics of PtNiNWs (compared to those annealed in hydrogen). For PtNiNWs (~15.2 wt % Pt), the initial ORR mass activity was about 2517 mA mgPt$^{-1}$, comparable to the activity of PtNiNWs following hydrogen annealing (~2394 mA mgPt$^{-1}$) and about 1.3 times higher than the activity after the acid leaching (~1977 mA mgPt$^{-1}$).

Annealing the catalysts in hydrogen appeared to increase the potential-driven dissolution of Ni and Pt. It was possible that the increased dissolution (of Pt) lowered the catalyst ECA (~82.2 m2 gPt$^{-1}$) compared to that of the material annealed in oxygen (~88.5 m2 gPt$^{-1}$). It was also possible, however, that the small difference in ECA (and ORR activity) was due to statistical variations between samples. Acid leaching further reduced the specific activity of PtNiNWs annealed in hydrogen, potentially by reducing the Ni alloying effect (particularly at moderate to heavy Ni leaching). For the PtNiNWs (~15.2 wt % Pt), however, XRD patterns showed only a slight shift compared to the untreated catalyst (hydrogen annealed, not acid leached). It was possible that Ni leaching of the catalyst, prior to electrochemical break-in, increased the likelihood of electrochemical dealloying. ICP-MS data (of electrolytes following break-in and durability testing) were presented on a percentage basis, relative to the initial loading on the RDE working electrode tip. Although the acid leached catalyst (~15.2 wt % Pt) lost less Ni (~14.9%, compared to the hydrogen annealed, not acid leached ~23.1%), it did remove more Ni in total compared to the unleached material (~62.2%, exposure to acid removed about 56.0% of the initial Ni, electrochemical break-in removed about 6.1% of the initial or about 14.9% of the remainder). The ORR activities of oxidized PtNiNWs (~15.2 wt % Pt) appeared to suggest that a loss in specific activity occurred not during the acid leaching step, but during the subsequent electrochemical break-in. For the PtNiNWs (annealed in hydrogen, not acid leached), break-in removed Ni that would have already been removed during acid treatment. It was possible that the extra Ni removed of the acid leached sample (the additional ~14.9% during break-in) was the dominant step in dealloying and potentially caused by the preemptive chemical removal of available surface Ni.

PtNiNWs (~7.3±0.3 wt % Pt) were also acid treated prior to annealing in hydrogen, to reduce the amount of Ni overall prior to alloying. Acid treatment prior to hydrogen annealing generally was less effective at Ni removal (particularly with nitric acid, moderate removal). It was likely that by not annealing in hydrogen, less surface Ni was available. The lack of alloying also potentially reduced the number of pathways for the acid to leach portions of the Ni core. At slight to moderate levels of Ni removal, subsequent annealing in hydrogen (250° C.) shifted the Pt (111) reflection toward Ni, signifying Pt lattice compression. With heavy Ni removal (~95.8 wt % Pt), however, a shift (due to annealing in hydrogen) was not observed, likely due to a lack of Ni available to compress the Pt-rich phase.

Figure 12:
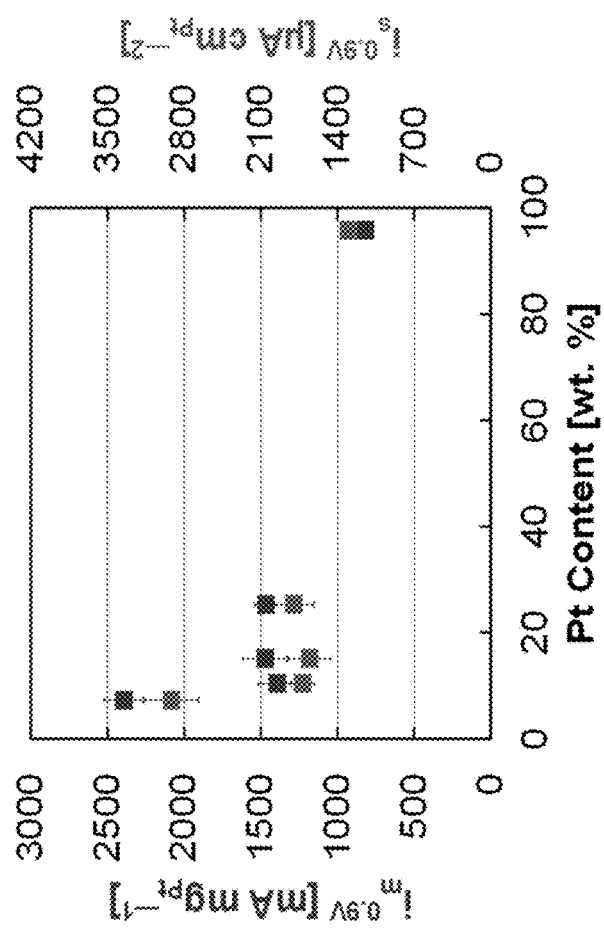
FIG. 12 shows experimental data derived by some embodiments of the present invention: ORR activity of PtNiNWs (7.3±0.3 wt % Pt) acid leached (to remove Ni by acetic, nitric, or sulfuric acid) and annealed in hydrogen to about 250° C. The activity of the PtNiNWs (acid leached, not annealed in hydrogen) was included. Activities were plotted versus the composition (wt % Pt) following acid leaching.

Acid treatment of the PtNiNWs (~7.3±0.3 wt % Pt, prior to hydrogen annealing), did not significantly impact ORR activity or ECA. These material, however, did show improved durability characteristics compared to the untreated catalyst. Subsequent annealing in hydrogen improved activity, but the activities were generally lower than when hydrogen annealing was performed first (see FIG. 12). The durability, however, was slightly improved. Completing the acid treatment prior to the hydrogen anneal produced materials with lower specific activities. This appeared to suggest that surface Ni (or Ni near the nanowire surface) played a significant role in the alloying process and in allowing for high specific activity.

Portions of this process were repeated with PtNiNWs (~16.4 wt % Pt) where complete spontaneous galvanic displacement was attempted. In the XRD patterns, similar trends were observed: annealing in hydrogen compressed the Pt lattice; subsequent (after hydrogen anneal) annealing in oxygen did not appreciably change the XRD pattern; and subsequent (after hydrogen anneal) acid leaching expanded the Pt lattice. The ORR activities following similar trends as well: annealing in hydrogen improved ORR activity, primarily by increasing specific activity (not ECA); and subsequent acid leaching reduced ORR activity (loss of specific activity), likely due to dealloying from the acid treatment process. The removal of Ni prior to electrochemical testing also improved durability, with higher retention of ECA and ORR activity.

Example 2

An example of platinum nickel nanowires used as an acidic methanol oxidation catalyst is included below.

Pt displacement was completed by exposing NiNWs to excess Pt precursor (about 1.14 g of potassium tetrachloroplatinate to about 40 mg NiNW). Displacement of the as-received NiNWs yielded a maximum Pt content of ~16.4 wt. %, as determined by ICP-MS. This level of Pt displacement was previously found to be the maximum possible without the addition of acid. Annealing of the NiNWs in oxygen was completed to examine how increasing the oxide layer thickness would affect the extent of Pt displacement.

Figures 13A, 13B, 13C:
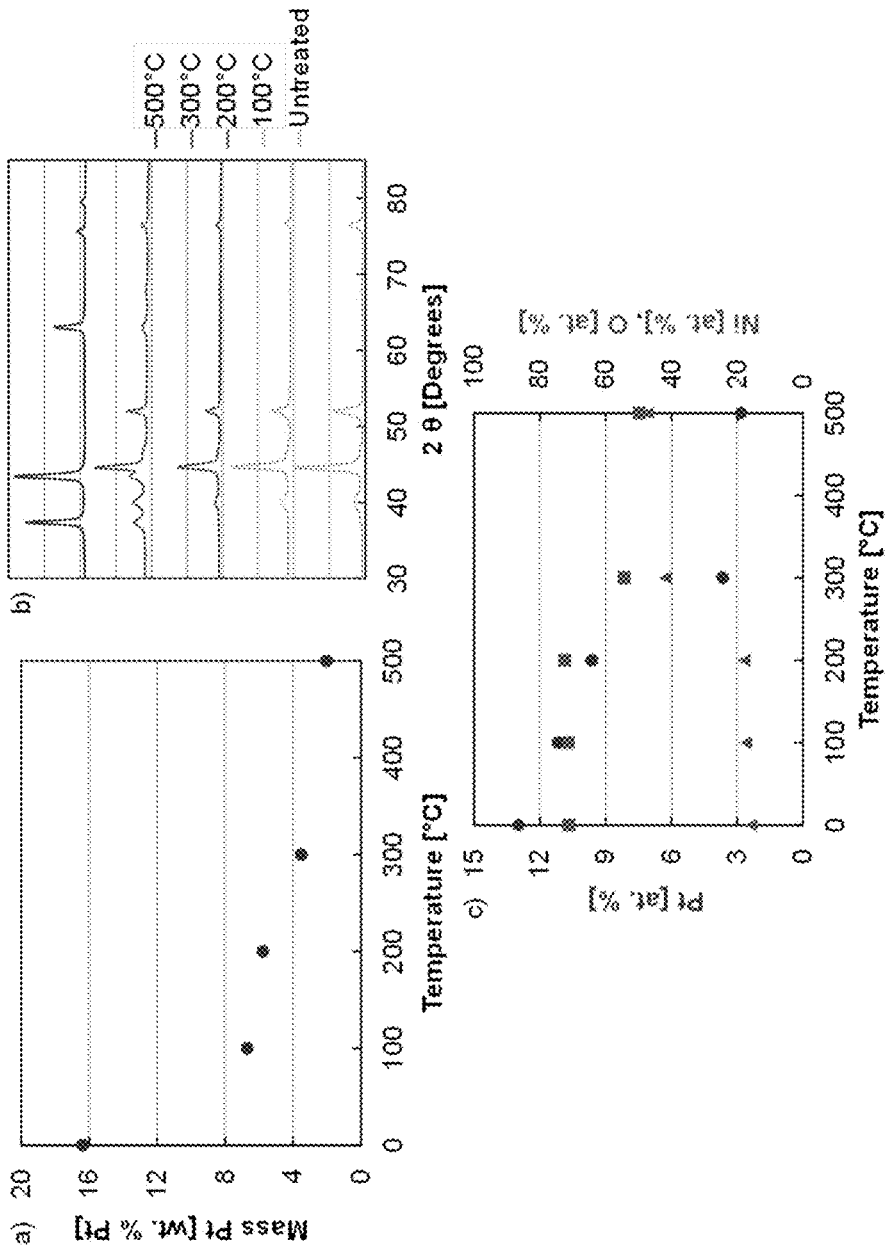
FIGS. 13a-c show experimental data derived by some embodiments of the present invention: ICP-MS (FIG. 13a), XRD (FIG. 13b), and energy dispersive x-ray spectroscopy (EDS) (FIG. 13c) data of PtNiNWs. Data from the PtNiNWs synthesized from the untreated NiNWs was included at 0° C. The EDS data was collected at 5 kV during SEM experiments.
Figure 14A:
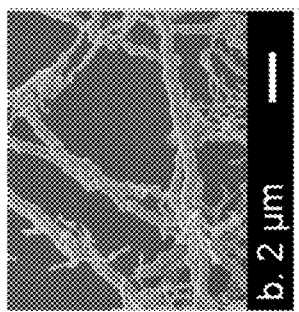
FIGS. 14a-e show experimental data derived by some embodiments of the present invention: SEM images of PtNiNWs. NiNWs were untreated and annealed in oxygen (FIG. 14a) to 100° C.
Figure 14B:
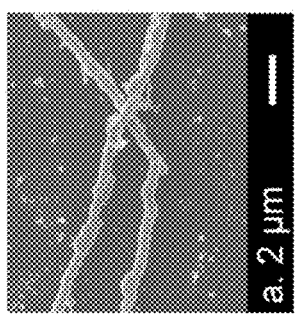
Figure 14C:
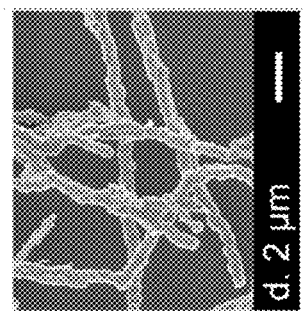
Figure 14D:
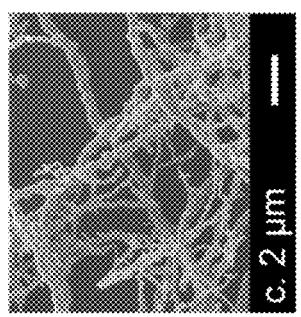
Figure 14E:

Heating of the NiNWs in oxygen limited displacement, and the Pt content decreased with increasing annealing temperature (FIG. 13a). Pt content was determined in these materials by ICP-MS and the calculations were made assuming the samples contained only Ni and Pt. Since the PtNiNWs annealed to ~300° C. and ~500° C. also contained Ni oxide (NiO), the calculations overestimated the Pt content at these temperatures.

Although the heat treatment of NiNWs limited Pt displacement, it did not appreciably change the Pt lattice. Each of the examined PtNiNWs with a Pt response contained a "pure" Pt lattice (lattice constant 3.92 Å), as determined from the Pt (111) reflection in XRD experiments (FIG. 13b). PtNiNWs, annealed at ~500° C., did not contain Pt peaks due to the low Pt content. A NiO response was observed at ~300° C. in conjunction with the response for Ni metal; at ~500° C., only a NiO pattern was observed. Although the as-received NiNWs (and the NiNWs heated to low temperatures) contained an oxide coating, the Ni oxides were not prevalent enough to observed reflections in the XRD patterns. EDS measurements were also taken during SEM experiments at low operating potential (~5 kV) to quantify Pt, Ni and oxygen content closer to the nanowire surface (FIG. 13c, as opposed to bulk XRD measure-ments). Although the measurements were not limited to the nanowire surface (EDS included subsurface atoms even at low operating potential), they provided qualitative trends between the PtNiNWs. As the NiNW annealing temperature was increased, the following was observed: Pt content decreased (as seen in ICP-MS); and the oxygen (or oxide) content increased, particularly at about 300° C. (when NiO appeared in XRD patterns). As-received NiNWs were in the range from about 200 nm to about 300 nm in diameter and ~200 μm in length. Although the NiNWs generally fell in this range, there was a subset of smaller nanowires in the range from about 50 nm to about 100 nm in diameter and ~100 μm in length. Displacement of the NiNWs with Pt did not appear to alter these dimensions, nor did heat treatment of the NiNWs at relatively low temperature (see FIGS. 14a-e). For the samples at ~300° C. and ~500° C., the dimensions were slightly larger, in the range from about 400 nm to about 600 nm in diameter and ~200 μm in length. Although the wires were expected to grow due to the increasing presence of NiO, the growth was slightly large compared to the change in molar volume (~70% volume increase expected, based on Ni metal molar volume 6.59 $cm^3$ $mol^{-1}$ and NiO molar volume 11.20 $cm^3$ $mol^{-1}$). The increase in wire diameter (and disappearance of the smaller nanowire subset, from about 50 nm to about 100 nm in diameter) was potentially due in part to nanowire aggregation or growth. While the composition and morphology of these materials were determined, the mechanism of nanowire growth during heat treatment and the mechanism for Pt displacement of Ni have remained uncertain.

PtNiNWs were examined for electrochemical activity in MOR and ORR using RDE half-cells. Catalyst ECAs were determined from the charge associated with carbon monoxide oxidation and verified by the charge associated with hydrogen adsorption. In the case of PtRu/C, it was necessary to use carbon monoxide oxidation since the cyclic voltammogram was clouded at the double charging layer and in the hydrogen adsorption region. It also can be beneficial to determine Pt Ni ECAs by carbon monoxide oxidation since the presence of Ni can mask the "true" double charging layer as well. The ECAs of PtNiNWs were as follows: 41.5 (untreated); 36.6 (100° C.); 28.6 (200° C.); and 59.2 (300° C.) m2 $gPGM^{-1}$. The PtNiNWs annealed to 500° C. could not be measured for a Pt ECA since current responses for carbon monoxide oxidation and hydrogen adsorption were not observed. The ECAs of the benchmark catalysts (PtRu/C and Pt/HSC) were as follows: 62.2 (93.3 $m^2$ $g_{Pt}^{-1}$) and 102.1 $m^2$ $g_{PGM}^{-1}$.

For Pt/HSC, the ECA by carbon monoxide was slightly larger than that by hydrogen adsorption (100.7 $m^2$ $g_{PGM}^{-1}$). This was anticipated since the cathodic peak for Pt oxide reduction can obscure the "true" double charging layer. In the case of PtNiNWs, the ECA by carbon monoxide was slightly smaller (from about 95% to about 98%) than by hydrogen adsorption. Cyclic voltammograms (for hydrogen adsorption) were completed at a high scan rate (100 mV $s^{-1}$) and to a high upper potential (1.4 V vs. RHE) to avoid dissolved Ni replating onto Pt. It was possible that the carbon monoxide adsorption period (potential hold at about 0.1 volts vs. RHE) allowed for Ni to block Pt sites, lowering the ECA. ECAs of PtNiNWs, with the exception of 300° C., decreased with increasing annealing temperature. It was likely that increasing annealing temperature thickened the nanowire oxide layer, limited Ni dissolution, and prevented electrochemical accessibility to all Pt sites. It was also possible that a thicker oxide layer limited electronic conductivity to surface Pt. The higher ECA of PtNiNWs (300° C.) was attributed to the extremely low Pt loading which potentially thinned the Pt layer, improving Pt utilization.

MOR activity was evaluated in RDE half-cells, in a 0.1 M perchloric acid electrolyte containing 1.0 M methanol. A scan rate of 1 mV $s^{-1}$ was used to measure activity near the onset in an effort to eliminate charges due to the double charging layer and Ni oxidation, thereby approximating steady state (FIG. 15a). PtNiNWs annealed at about 200° C. and about 300° C. each required onset potentials for MOR of about 0.327 volts and 0.330 volts respectively vs. RHE, comparable to PtRu/C (~0.332 volts vs. RHE, onset defined as 0.0001 A $mg_{PGM}^{-1}$). PtNiNWs (~200° C.) further maintained a higher MOR mass activity than PtRu/C throughout the onset region (to about 0.6 volts vs. RHE). PtNiNWs (untreated at about 200° C.) also produced peak MOR activities greater than PtRu/C and Pt/HSC in spite of lower ECAs; the benefit in specific activity was comparable to those previously observed on Pt catalysts templated from silver and copper nanowires (FIG. 15b). The potential of peak MOR activity fell into two groups, at approximately 0.75 and 0.95 V vs. RHE. PtNiNWs, 200 and 300° C., produced peak MOR activity at the lower potential, and similarly oxidized carbon monoxide a lower potential (slightly higher than but comparable to PtRu/C). PtNiNWs, untreated and 100° C., conversely produced peak MOR activity and oxidized carbon monoxide at a higher potential, closer to that of Pt/HSC. Cyclic voltammograms (in a nitrogen-saturated electrolyte) were subtracted from the carbon monoxide oxidation voltammograms; these plots were then presented normalized to ECA (same areas under the curve), simplifying the figure (FIG. 15c). The carbon monoxide oxidation voltammograms of PtNiNWs (untreated and 100° C.) each have two peaks: one at approximately 0.81 V vs. RHE, at the same position as Pt/HSC; and the other at approximately 0.69 volts vs. RHE. The lower carbon monoxide oxidation peak was likely due the presence of Ni at the nanowire surface in close proximity to Pt sites. Although electrochemical break-in appeared to remove significant portions of Ni from the nanowire surface, it was likely that small amounts of Ni persisted. The presence of multiple peaks suggested that the nanowire surface contained partially segregated zones (Pt rich, Ni rich). The carbon monoxide oxidation voltammograms of PtNiNWs (200° C. and 300° C.) contained a single peak at a lower potential, approximately 0.49 volts vs. RHE. The low potential was likely due to the increased electrochemical durability of Ni at the nanowire surface, which provided a higher number of oxophilic sites in close proximity to Pt. The width of the carbon monoxide response (on PtNiNWs, 200° C. and 300° C.) was larger than PtRu/C and extended to higher potentials, possibly due to a lack of uniformity in surface sites and inadequate integration between Pt and Ni zones. Chronoamperometry experiments were completed at 0.5 volts vs. RHE for ~30 min FIG. 15d). PtNiNWs (200° C. and 300° C.) maintained comparable activity to PtRu/C for the duration of the potential hold; all other catalysts (PtNiNWs, untreated and 100° C., and Pt/HSC) suffered heavier losses, potentially due to the higher carbon monoxide oxidation potential (unable to oxidize intermediates blocking Pt sites).

The presence of surface Ni, the extended surface, Ni alloying, and the preferential exposure of Pt facets were analyzed as potential contributors to MOR activity. The annealing of NiNWs potentially improved the electrochemical stability of surface Ni on the PtNiNWs. The increased prevalence of surface Ni provided oxophilic species in close proximity to Pt sites (similar role as Ru in PtRu/C), potentially allowing for methanol oxidation at lower potential. The extended surface of PtNiNWs (hundreds of nm in diameter, hundreds of μm in length) also potentially benefited MOR activity by avoiding a previously observed Pt MOR particle size effect. The specific MOR activity of PtNiNWs offered similar benefits as other extended Pt catalysts using silver and copper nanowire templates. A benefit due to the extended surface, however, was potentially reduced by the surface features of the PtNiNWs, which were previously found to be in the range from about 2 nm to about 4 nm in diameter. Although Pt lattice compression (by Ni alloying) could potentially improve MOR activity (by weakening Pt—OH and Pt—CO binding), no lattice compression was observed during XRD experiments. Previous studies have also found different MOR activities for single crystal Pt facets. NiNWs, however, were previously found to be polycrystalline with contain randomly oriented features. The preferential exposure of Pt facets was possible, but not due to any active control during synthesis.

Figure 16A:
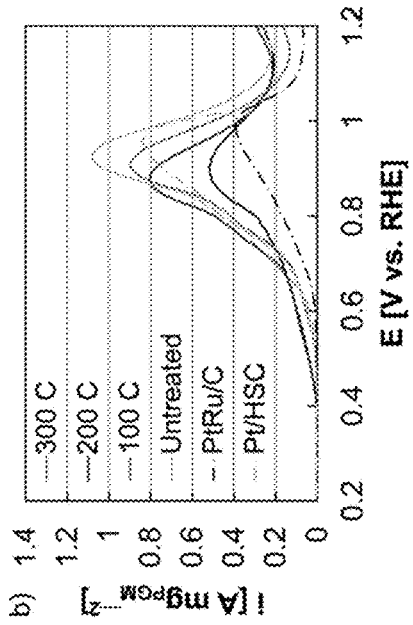
FIGS. 16a-d show experimental data derived by some embodiments of the present invention: MOR and carbon monoxide oxidation data of PtNiNWs, PtRu/C, and Pt/HSC following durability testing. Quasi-steady state oxidation voltammograms at 1 mV s$^{-1}$ (FIG. 16a), anodic linear sweep voltammograms at 5 mV s$^{-1}$ (FIG. 16b), carbon monoxide oxidation voltammograms at 20 mV$^{-1}$ (FIG. 16c), and chronoamperometry potential holds (about 30 minutes) at ~0.5 volts vs. RHE (FIG. 16d). Accelerated durability testing was completed by potential cycling (~30,000 cycles) in the range from about 0.1 volts to about 0.5 volts vs. RHE.
Figure 16B:
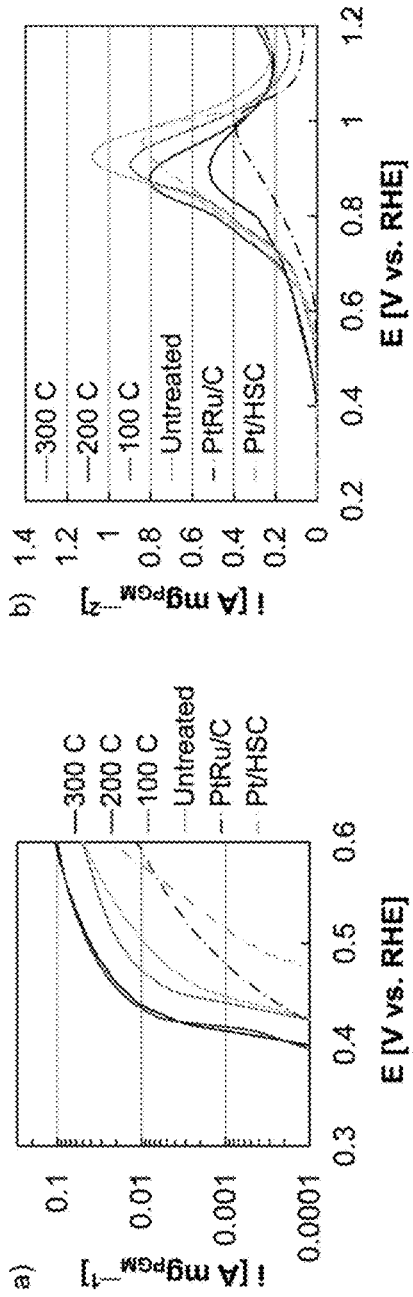
Figure 16C:
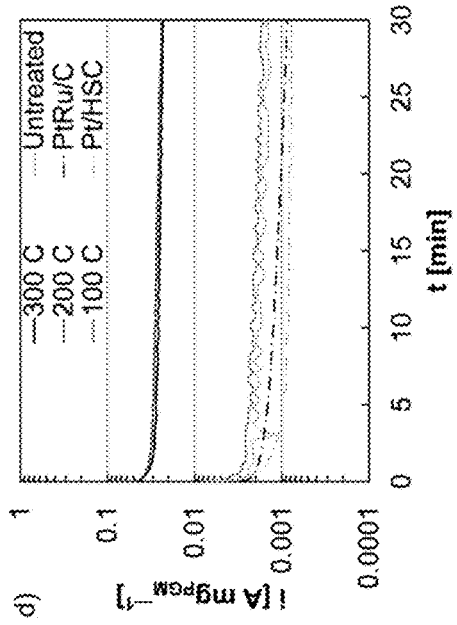
Figure 16D:
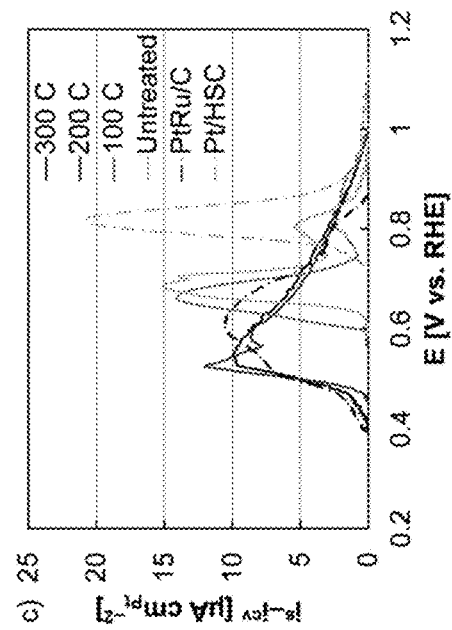

Durability testing was completed by potential cycling (~30,000 cycles) in the range from about 0.1 volts to about 0.5 volts vs. RHE. No clear consensus was available for an MOR durability protocol. The potential range was chosen since it centered the onset potential for MOR, and was an applicable range for typical DMFC anode operation. The cycle number was chosen since it matched typical durability protocols for ORR catalysts (~30,000 cycles, from about 0.6 volts to about 1.0 volts vs. RHE) and allowed for the completion of durability experiments in a relatively short time (~13.5 hours). Following potential cycling, significant changes were observed in PtRu/C: the MOR onset shifted to ~0.424 volts (FIG. 16a); the MOR peak potential shifted to approximately 1.0 volts vs. RHE (comparable to Pt/HSC, FIG. 16b); and carbon monoxide oxidation shifted to a higher potential (peak at approximately 0.6 volts vs. RHE, FIG. 16c). The erosion of MOR activity in PtRu/C was likely due to the dissolution of Ru (Ru→$Ru^{2+}$, 0.45 volts vs. RHE). Although changes were observed in the activity of PtNiNWs (200° C. and 300° C.), they were less severe in terms of the onset (200° C. ~0.396 volts and 300° C. ~0.399 volts vs. RHE), and the peak oxidation potential (approximately 0.85 volts vs. RHE); the carbon monoxide oxidation responses also showed a minimal shift. Chronoamperometry experiments demonstrated significantly higher activity in the PtNiNWs (200° C. and 300° C.) compared to PtRu/C, likely due to the differences in MOR activity (at ~0.5 volts vs. RHE, FIG. 6a) and carbon monoxide oxidation after durability testing (FIG. 16d).

PtNiNWs were also examined for ORR activity in RDE half-cells in a 0.1 M perchloric acid electrolyte. Although annealing of the NiNWs in oxygen was beneficial for the MOR activity of PtNiNWs, it appeared to be detrimental in ORR. The activity (mass and specific) of PtNiNWs declined with increasing annealing temperature and all annealed materials produced lower activity than the untreated catalyst (FIG. 17a). The ORR mass activity of PtNiNWs (100° C.), however, was greater than the DOE target and Pt/HSC (306 mA mgPt-1) and the specific activities of PtNiNWs (100° C. and 200° C.) were greater than Pt/HSC (300 μA cmPt-2). ORR linear polarization curves were provided of PtNiNWs (untreated and 200° C.) and Pt/HSC at 1600 rpm in an oxygen-saturated 0.1 M perchloric acid electrolyte (FIG. 17b). ORR activities were corrected for internal resistance, mass transport, and the partial pressure of oxygen. ORR experiments were performed at an elevation of 5674 ft (pressure of 624 mm Hg) and therefore, the diffusion limited currents were less than typically observed at sea level. Although the ORR activities were corrected for the partial pressure of oxygen, the diffusion limited currents in the ORR polarization curves were not. Although the PtNiNWs (untreated) produced a similar current to Pt/HSC at ~0.9 volts vs. RHE, the calculated mass activity was higher since the Pt loading was significantly lower. The electrode loadings of these materials were: 200° C. (5.78 wt. % Pt) 1.7 $\mu g_{Pt}$ $cm_{elec}^{-2}$; untreated (16.4 wt. % Pt) 4.9 $\mu g_{Pt}$ $cm_{elec}^{-2}$; and Pt/HSC 17.8 $\mu g_{Pt}$ $cm_{elec}^{-2}$. Durability testing was completed by potential cycling (~30,000 cycles) these catalysts in the range from about 0.6 volts to about 1.0 volts vs. RHE in a 0.1 M perchloric acid electrolyte. PtNiNWs (200° C. and 300° C.) showed an improvement in mass (FIG. 17c) and specific (FIG. 17d) activity following durability testing. The mass activities of PtNiNWs (100° C. and 200° C.) were greater than Pt/HSC (~225 mA $mg_{Pt}^{-1}$) and the DOE target (100° C.), and the specific activity of PtNiNWs (100° C., 200° C., and 300° C.) were greater than Pt/HSC (181 μA $cm_{Pt}^{-2}$); the activities, however, were less than the untreated catalyst.

Example 3

Pt-coated NiNWs (PtNiNWs) were synthesized by the spontaneous galvanic displacement of NiNWs. At a low Pt content (from about 3.8 wt % Pt to about 16.4 wt % Pt), displacement occurred solely by exposure to potassium tetrachloroplatinate. NiNWs (~35 mg) were dispersed in 70 mL of water heated to ~90° C. under magnetic stirring. Potassium tetrachloroplatinate in 10 mL of water was added dropwise to the NiNW dispersion by syringe pump over a period of about 15 minutes. PtNiNW synthesis proceeded at about 90° C. for about 2 hours. Varying amounts of potassium tetrachloroplatinate (from about 3.1 mg to about 1.0 g) yielded a variety of Pt displacements (from about 3.8 wt % Pt to about 16.4 wt % Pt, as measured by inductively coupled plasma-mass spectrometry, ICP-MS). Although an excess of the Pt precursor was provided, potassium tetrachloroplatinate was not able to completely displace the NiNWs. Higher levels of Pt displacement were only achieved by adding hydrochloric acid, presumably due to the presence of a Ni oxide layer and the ability of the added acid to etch this layer, thereby exposing unoxidized Ni. NiNWs ~(35 mg) were dispersed in 70 mL of water heated to about 90° C. under magnetic stirring. Potassium tetrachloroplatinate (~41.4 mg) in 10 mL of water containing hydrochloric acid was added dropwise to the NiNW dispersion by syringe pump over a period of about 15 minutes. Varying amounts of hydrochloric acid (from about 3.5 µL to about 1.3 mL) yielded a variety of Pt displacements (from about 17.5 wt % Pt to about 96.8 wt % Pt, as measured by ICP-MS). PtNiNW synthesis proceeded at ~90° C. for about 2 hours. All PtNiNW samples were subsequently washed in water and isopropanol.

ICP-MS measurements were taken on a Thermo Scientific iCAP Q. PtNiNWs were digested in aqua regia and diluted to three concentrations that were calibrated to a blank and three standards. Each measurement was taken three times with a dwell time of about 0.15 seconds; standard deviations between these iterations were less than 2%. Catalyst compositions were determined by the Pt-to-Ni ratio, assuming the catalysts contained only Pt and Ni.

A JEOL JSM-7000F field-emission scanning electron microscope (FESEM) equipped with EDAX Genesis energy-dispersive X-ray spectroscopy (EDS) was used to determine the dimensions, morphology, and composition of the NiNWs and PtNiNWs. Micrographs shown in FIGS. 18a-c were obtained with a Philips CM200 transmission electron microscope (TEM). For the TEM analysis of PtNiNWs following rotating disk electrode (RDE) break-in and/or RDE durability testing, PtNiNWs were removed from the RDE tip by sonicating the RDE tip in 1 mL of isopropanol to remove and collect samples. X-ray photoelectron spectroscopy (XPS) analysis was performed on a Kratos Nova X-ray photoelectron spectrometer equipped with a monochromatic Al Kα source operated at about 300 W. Samples were mounted on a nonconductive tape adhesive. Survey and high-resolution C 1s, O 1s, Ni 2p, and Pt 4f spectra were acquired at about 160 eV and about 20 eV, while providing charge compensation using low-energy electrons. Data analysis was performed using CasaXPS software using the default relative sensitivity factor values provided by the XPS manufacturer. A linear background was applied to C 1s, O 1s, and N 1s spectra, and Shirley background was used for Ni 2p and Pt 4f. Quantification is based on analysis of at least three areas per sample. X-ray diffraction (XRD) measurements were taken on a Bruker D8 Discover using 40 kV and 35 mA in the 2θ range from about 15° to about 87° over about 6 minutes. Samples were pipetted and dried onto a glass (silica) slide and encapsulated (capped) by polyvinyl pyrrolidone (dispersed in methanol, dried).

Figure 19A:
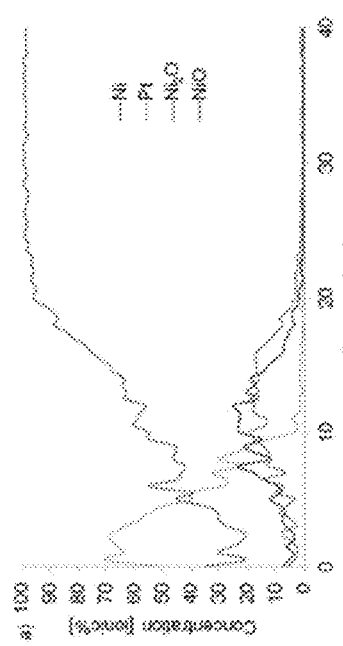
Figure 19B:
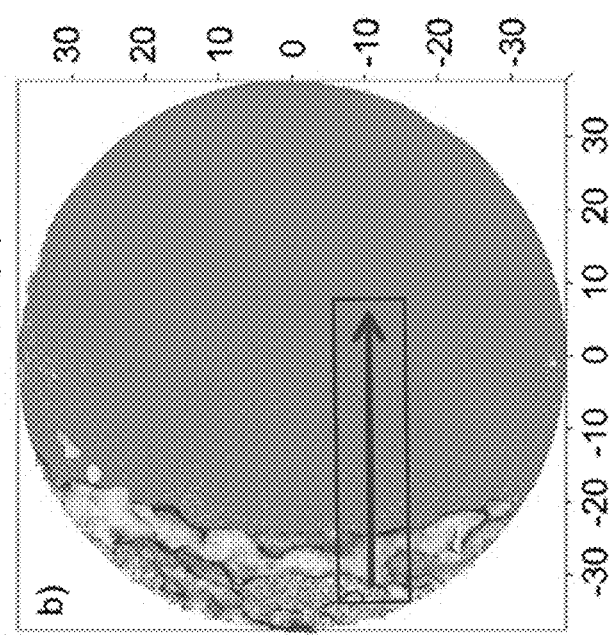

TEM samples were also prepared by embedding PtNiNWs in epoxy resin, then cutting ~50 nm slices using diamond-knife ultramicrotomy (FIGS. 19a and 19b). Because the wires were placed randomly within the epoxy, wires of many different orientations, including cross sections, were available for study. High-resolution scanning transmission electron microscopy (STEM) images and EDS images were recorded in a JEOL JEM 2200FS equipped with a Bruker XFlash SDD detector.

Specimens were prepared for atom probe tomography (APT) analysis using a previously described nanowire liftout method. APT measurements were made using a Cameca LEAP 4000X Si. The instrument was operated in laser pulsed mode with a laser energy of ~80 pJ, a pulse rate of about 500 kHz, a base temperature of about 50 K, and a detection rate of about 5 ions per 1000 pulses.

Electrochemical experiments were conducted in a RDE half-cell, with a glassy carbon working electrode, a Pt mesh counter electrode, and a RHE (Pt wire in a hydrogen-saturated electrolyte) reference electrode. Rotation of the working electrode was controlled with a modulated speed rotator, and electrochemical measurements were taken on a single-channel Autolab potentiostat.

PtNiNW inks were prepared at a concentration ranging from about 0.15 mgPtNi$^{-1}$ to about 0.20 mgPtNi mL$^{-1}$ for 5 mL (~3.8 mL water, ~1.2 mL isopropanol). Inks were iced for about 5 minutes prior to adding the Nafion ionomer (~4 µL mL$^{-1}$). PtNiNW inks were sonicated in ice for ~30 seconds (horn), ~30 minutes (bath), ~30 seconds (horn), ~10 minutes (bath), and ~30 seconds (horn) prior to dispensing 10 µL on the glassy carbon working electrode. The electrodes were then dried for about 20 minutes at about 40° C. Ink concentrations were confirmed by weighing dried 100 µL aliquots on a microbalance (three samples, two iterations). Electrode loadings were increased by adding additional ink (in 10 µL increments) with the inks continuously sonicated (~20 minutes bath, ~30 seconds horn) during this process. Inks were then added to graphitized carbon nanofibers (~60 wt %), and the electrode preparation process was repeated. Although PtNiNW electrodes were characterized for a wide loading range, electrodes in the range from about 30 µgPtNi cmelec$^{-2}$ to about 40 µgPtNi cmelec$^{-2}$ loading were used in the comparison studies. Pt/HSC (~46 wt % Pt) inks were made by dispersing ~7.6 mg of catalyst in 10 mL (7.6 mL water, 2.4 mL isopropanol, 40 µL Nafion ionomer). The Pt/HSC ink was sonicated in ice (~20 minutes bath) prior to dispensing (10 µL) on the glassy carbon working electrode.

Catalyst electrochemically active surface areas (ECAs) were determined during cycling voltammograms in an argon-saturated 0.1 M perchloric acid (HClO$_4$) electrolyte from the charge associated with hydrogen adsorption on Pt, assuming a Coulombic charge of 210 µC cm$^{-2}$. Cyclic voltammograms were performed on PtNiNWs in the range from about 0.025 volts to about 1.4 volts versus RHE at 100 mV s$^{-1}$; cyclic voltammograms were performed on Pt/HSC in the range from about 0.025 volts to about 1.0 volts versus RHE at 20 mV s$^{-1}$. ORR polarization curves were taken during anodic scans (from about 0.01 volts to about 1.00 volts vs RHE) in an oxygen-saturated 0.1 M HClO$^4$ electrolyte. ORR activities were corrected for internal resistance (typically from about 18Ω to about 25Ω depending on measurement), mass transport (by the Koutecky-Levich equation), and the partial pressure of oxygen ~(624 mmHg at 5674 ft). At this elevation (5674 ft), the diffusion-limited currents (id) of the ORR polarization curves (from about 4.4 mA to about 4.8 mA cmelec$^{-2}$ at 1600 rpm) were within the range of theoretically anticipated values. Durability experiments were conducted by potential cycling (~30,000 cycles, from about 0.6 volts to about 1.0 volts vs RHE) at 500 mV s$^{-1}$. Slower cyclic voltammograms (100 mV s$^{-1}$ for PtNiNWs, 20 mV s$^{-1}$ for Pt/HSC) were periodically taken at a wider range (from about 0.025 volts to about 1.4 volts vs RHE for PtNiNWs, from about 0.025 volts to about 1.0 volts vs RHE for Pt/HSC) to monitor catalyst ECAs. ORR polarization curves were also taken following durability testing.

Figure 20:
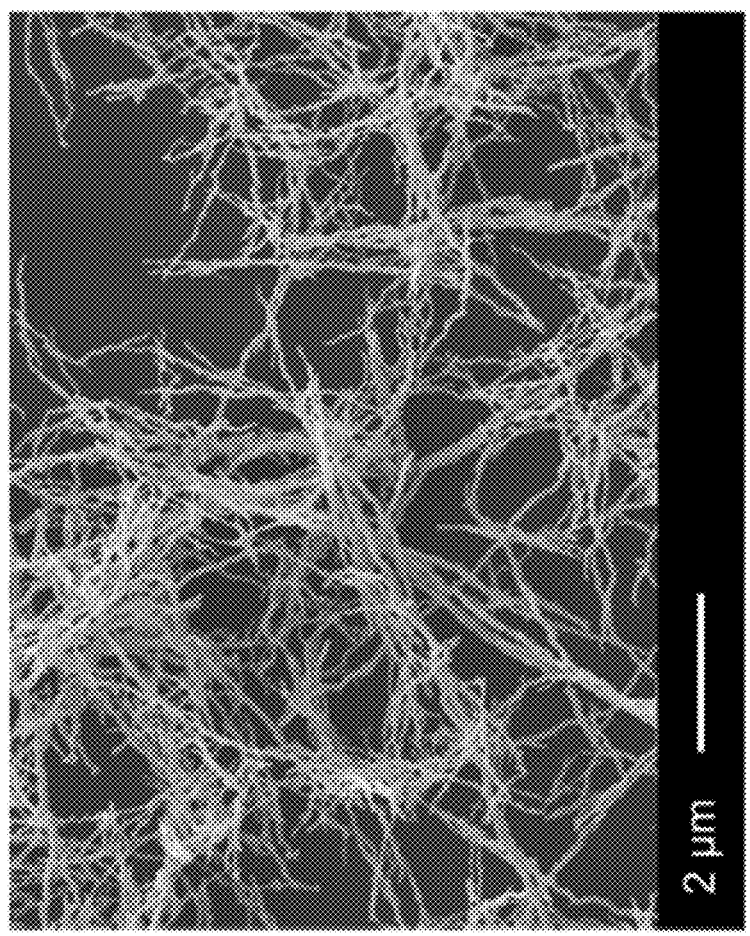
FIG. 20 shows experimental data derived by some embodiments of the present invention: field emission scanning electron microscopy (FESEM) image of PtNiNWs (7.4 wt % Pt).

The methods described above results in the following. PtNiNWs were synthesized by the spontaneous galvanic displacement of NiNWs. PtNiNWs were formed with diameters of 150-250 nm and lengths of 100-200 µm, maintaining the morphology of the as-purchased NiNW template (FIG. 20).

Nanowires were studied as a function of the level of Pt displacement. Although NiNWs had smooth surfaces, Pt displacement resulted in small surface features with sizes in the range from about 2 nm to about 4 nm. At a low displacement level (~9.6 wt % Pt and ~12.3 wt % Pt), Pt was constrained to the nanowire surface. EDS line scans on cross-sectioned PtNiNWs with 9.6 wt % Pt found a Pt surface-layer thickness typically between about 10 and about 15 nm (see FIGS. 21a and 21b). Line scans on PtNiNWs (11.9 wt % Pt) from atom probe experiments similarly found a Pt response within the first 10 nm of the nanowire (FIGS. 19a and 19b). Both XPS and STEM found a thin Ni oxide layer, nanometers in scale, on the surface of the NiNWs. The oxide content near the surface persisted in partial Pt galvanic displacements where acid was not added (FIGS. 19a-b and 21a-b). At a low Pt content (from about 3.8 wt % Pt to about 16.4 wt % Pt), displacement occurred solely by exposure of the NiNWs to the Pt precursor. Although excess Pt precursor was supplied, greater displacements were not achieved; the thin oxide layer on the NiNWs likely prevented further displacement. Greater levels of Pt displacement (from about 17.5 wt % to about 96.8 wt % Pt) were achieved by adding hydrochloric acid during synthesis. At a high degree of displacement (about 96.8 wt % Pt), PtNiNWs were found to be hollow with a porous wall thickness ranging from about 20 nm to about 60 nm.

Figure 21A:
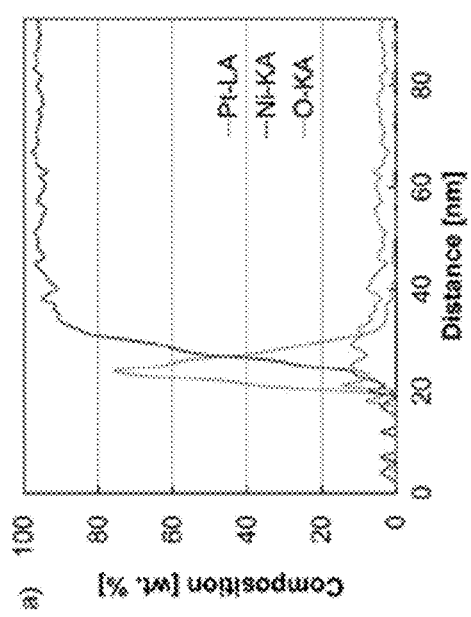
FIGS. 21a and 21b show experimental data derived by some embodiments of the present invention: EDS line scan of cross-sectioned PtNiNWs (~9.6 wt % Pt) in scanning transmission electron microscopy (STEM) (FIG. 21a). EDS map of cross-sectioned PtNiNWs (~9.6 wt % Pt) in STEM (FIG. 21b).
Figure 21B:
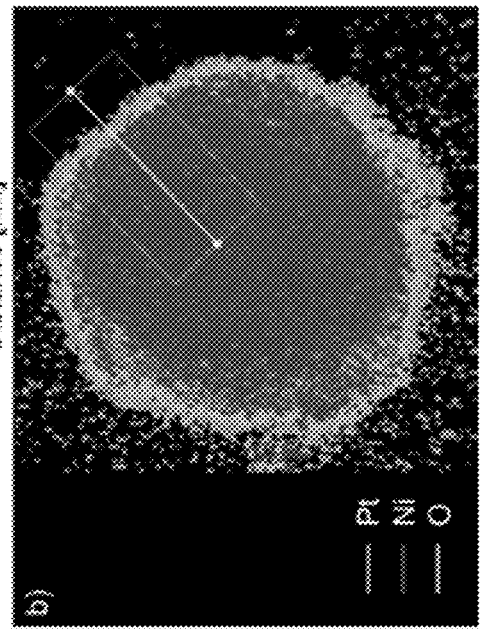

Cross-sectioned STEM provided information on elemental composition as a function of distance into the PtNiNW. These experiments, however, represent two-dimensional renderings of three-dimensional materials. Cross-sectioned STEM images were taken on microtomed slices of PtNiNWs (and NiNWs) with thicknesses of ~50 nm (FIG. 21a-b). The PtNiNWs (and NiNWs) were not uniform in shape or diameter over this range; although the EDS map of cross-sectioned PtNiNWs (~9.6 wt % Pt) appeared clean, ghosting in these images was possible. For three-dimensional information, atom probe tomography was employed. An atom probe reconstruction shows the outer edge of a PtNiNW and the Ni core (FIG. 19b). A 4 nm (z-axis) by 10 nm (y-axis) by 40 nm (x-axis) analysis box from this atom probe reconstruction shows the 1D ionic concentration profile (FIG. 19a).

XRD experiments were performed on PtNiNWs. At low Pt displacements, where Ni peaks were clearly visible (at about 9.6 wt % and about 12.3 wt % Pt), the Ni lattice was found to be ~3.52 Å, matching that of the undisplaced NiNWs. The Pt lattice constants were found to be 3.91 Å±0.02 Å (~9.6 wt % Pt), ~3.90 Å (~12.3 wt % Pt), and 3.90 Å±0.01 Å (~96.8 wt % Pt), slightly compressed compared to the Pt lattice constant (3.92 Å). Further compression of the Pt lattice was not achieved because displacement appeared to yield relatively segregated zones of Pt and Ni. It was further anticipated that Pt was not preferentially oriented because the NiNWs appeared to be polycrystalline.

Electrochemical measurements were taken in RDE half-cells. PtNiNWs were dilutely dispersed (from about 0.15 mgPtNi mL$^{-1}$ to about 0.2 mgPtNi mL$^{-1}$) prior to deposition onto a glassy carbon electrode to prevent catalyst aggregation during drying. Multiple aliquots of the catalyst inks were deposited onto the RDE tip to increase the ORR $i_d$ to a level comparable to conventional catalysts. PtNiNWs were added to the RDE tip with a PtNi loading of about 30 µgPtNi cmelec$^{-2}$ to about 40 µgPtNi cmelec$^{-2}$ and were further deposited with and without Nafion ionomer and graphitized carbon nanofibers added to the ink. The addition of the Nafion ionomer (~4 µL mL$^{-1}$) and carbon (~60 wt %) was optimized for ORR mass activity. Nafion and carbon were found to improve both specific ORR activity and ECA, increasing the mass activity 10% to 20% and 20% to 40%, respectively.

PtNiNWs were cleaned prior to electrochemical characterization by potential cycling (from about 10 cycles to about 50 cycles, ~0.025 volts to about 1.4 volts vs RHE). This process was needed to provide a relatively stable, Ni-free surface following Pt displacement. Electrochemical testing in a potassium hydroxide (KOH) electrolyte confirmed the presence of Ni on the PtNiNW surface. Catalyst ECAs were determined during cyclic voltammograms in HClO$_4$ by the charge associated with hydrogen adsorption on t, assuming a Coulombic charge of ~210 µC cm-2 (see FIGS. 22a-c). The validity of the ECA calculation was confirmed using Poly Pt, which after thorough polishing, was found to have a surface area calculated by charge 1.2 times larger than its geometric surface area (roughness factor of 1.2). The ECA of PtNiNWs dramatically increased with a reduction in the Pt displacement percentage. Reducing the Pt displacement percentage apparently allowed more of the Pt to remain electrochemically accessible, thereby increasing catalyst ECA on a per Pt basis. A peak ECA of ~91.3 m$^2$ gPt$^{-1}$ was achieved with PtNiNWs about 5.6 wt % Pt.

Figure 23:
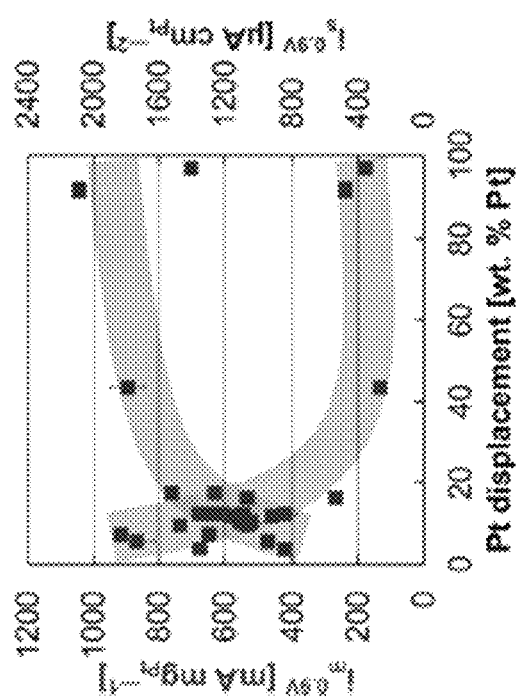
FIG. 23 shows experimental data derived by some embodiments of the present invention: Mass and specific ORR activities of PtNiNWs as a function of percent Pt displacement. The inks used to prepare the RDE tips contained graphitized carbon nanofibers (~60 wt %) and a Nafion ionomer (~4 µL mL$^{-1}$). ORR activities were corrected for internal resistance and the partial pressure of oxygen at ~0.9 volts vs RHE (~1600 rpm, ~20 mV s$^{-1}$) in an oxygen-saturated 0.1 M HClO$_4$ electrolyte.

ORR mass and specific activities were determined at about 0.9 volts vs RHE and corrected for internal resistance, mass transport, and the partial pressure of oxygen (FIG. 23). PtNiNWs (~7.4 wt % Pt) produced an ORR mass activity of ~917 mA mgPt$^{-1}$, abiyt 3.0 times greater than Pt/HSC (~306 mA mgPt$^{-1}$) and about 2.1 times greater than the DOE activity target in PEMFCs. PtNiNWs produced a wide range of specific ORR activities, from ~850 µA cmPt$^{-2}$ (about 3.8 wt % Pt) to ~2087 µA cmPt$^{-2}$ (about 91.7 wt % Pt). The specific activity of PtNiNWs was generally comparable to previous studies of extended surface catalysts for ORR. The peak specific activity of PtNiNWs (~2087 µA cmPt$^{-2}$) also came within about 93% of Poly Pt (~2245 µA cmPt$^{-2}$) and was about 6.9 times greater than Pt/HSC (~304 µA cmPt$^{-2}$).

The nature of the extended surface (decreased numbers of low-coordinated sites), the electronic tuning of Pt sites through Ni alloying or nanoparticle-based strain effects, and the preferential exposure of surface facets have each been cited as factors for the increased activity of materials similar to those presented here compared to nanoparticles. During the galvanic displacement of PtNiNWs, Pt is deposited as a thinfilm "shell" with porous, nanoparticle-like features. The long-range continuity of this Pt "shell" is not well-characterized at this time (particularly at low Pt displacement levels) but nonetheless exhibits relatively high specific activity compared to nanoparticles. The extension of the Pt surface potentially reduces the prevalence of less-active crystal faces or low-coordinated edge sites, and it also avoids carbon to Pt substrate interactions, thereby allowing high specific activity even at high ECA. The presence of Ni within the Pt lattice also potentially electronically tunes Pt by compressing the Pt lattice and impacting the band structure of the surface-exposed Pt, weakening the Pt—O binding strength. Pt, however, was found to deposit into relatively segregated zones, reducing the likelihood and/or potential impact of alloying effects. Although the lattice constant was slightly compressed (ranging from 3.90 Å to 3.91 Å compared to 3.92 Å for pure Pt), electronic tuning is not anticipated to be the primary cause for the high specific activity of PtNiNWs. The NiNWs further appeared to be polycrystalline, and high-resolution STEM images of PtNiNWs (~9.6 wt % Pt) showed a randomly oriented Pt lattice. Because the NiNWs were polycrystalline in nature, it did not appear that displacing Pt aligned into particular growth directions. Also, no particular care was taken in the synthesis of PtNiNWs to expose specific Pt facets; it therefore seemed unlikely that preferentially exposed Pt facets contributed to the high specific activity of PtNiNWs. Although there was a degree of scatter in the specific activities of PtNiNWs, the specific activity generally decreased with decreasing Pt displacement (FIG. 23). In the higher displaced PtNiNWs (~96.8 wt % Pt), Pt deposited into particles with larger feature sizes (ranging from about 5 nm to about 10 nm) and decreased ECAs. It is possible that the reduction in Pt displacement induced a particle-size effect, although it is relatively modest compared to studies on nanoparticles supported on carbon. The Ni content near the PtNiNW surface also increased in the lower displaced samples, introducing the potential for increased alloying effects (~9.6 wt % Pt and ~12.2 wt % Pt compared to ~96.8 wt % Pt). It was also possible that small amounts of Ni remained on the surface of PtNiNWs at low displacements, inhibiting ORR activity and reducing the specific activity.

Accelerated durability testing was conducted on PtNiNWs and Pt/HSC by potential cycling (~30000 cycles, from about 0.6 volts to about 1.0 volts vs RHE). Catalyst ECAs were periodically monitored by the charge associated with hydrogen adsorption on Pt. PtNiNWs with low levels of Pt displacement retained similar ECAs by percentage compared to Pt/HSC. Although extended surface Pt catalysts were previously shown to retain significantly higher ECAs than Pt/HSC under potential cycling, Ni is susceptible to dissolution, potentially reducing durability benefits. EDS measurements of PtNiNWs (~9.6 wt % Pt by ICPMS) as synthesized, following break-in, and following durability testing, however, confirmed a consistent Ni content throughout (see FIGS. 24a-c, ~83 wt % Ni by EDS). Fully displaced PtNiNWs (~91.7 wt % Pt, 96.8 wt % Pt) retained less ECA (by percentage) compared to the partially displaced PtNiNWs and Pt/HSC.

Figure 25A:
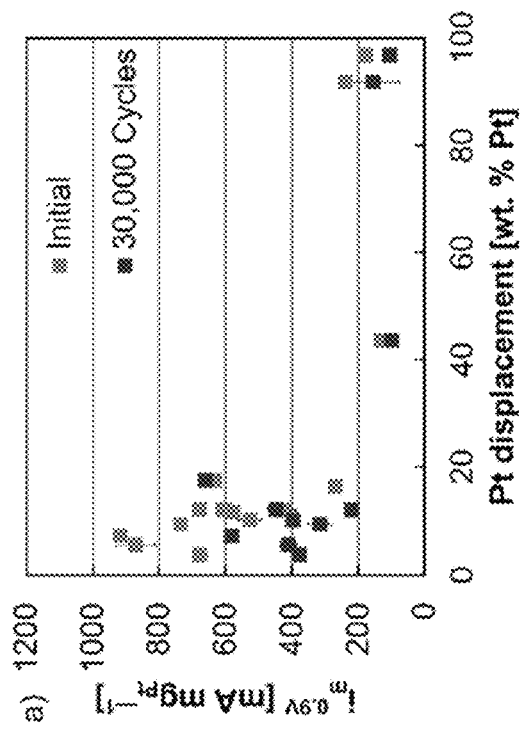
FIGS. 25a and 25b show experimental data derived by some embodiments of the present invention: Mass (FIG. 25a) and specific ORR activities (FIG. 25b) of PtNiNWs as a function of percent Pt displacement prior to and following durability testing. The inks used to prepare the RDE tips contained graphitized carbon nanofibers (~60 w %) and a Nafion ionomer (~4 µL mL$^{-1}$). Durability testing was completed by potential cycling (from about 0.6 volts to about 1.0 volts vs RHE) ~30000 times in a nitrogen-saturated 0.1 M HClO$_4$ electrolyte. ORR activities were taken at ~0.9 volts vs RHE (~1600 rpm, 20 mV s$^{-1}$) in an oxygen-saturated 0.1 M HClO$_4$ electrolyte.
Figure 25B:
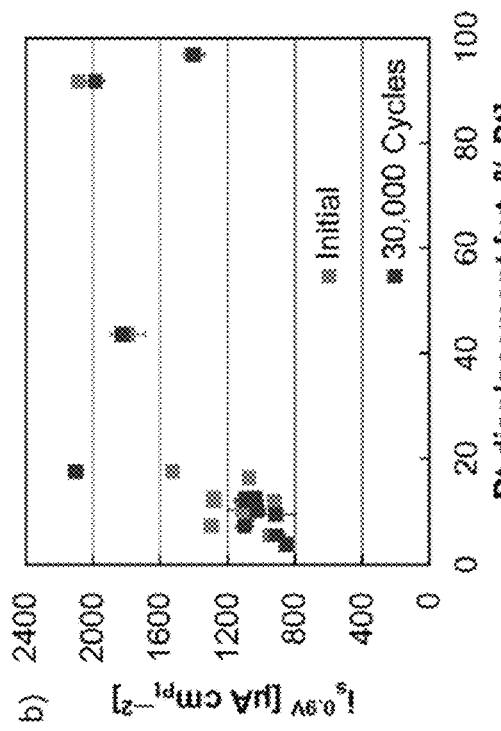

PtNiNWs produced similar ORR specific activities prior to and following potential cycling (see FIGS. 25a and 25b). Although ECA losses were observed, multiple PtNiNW catalysts exceeded the DOE target for PEMFC mass activity following durability testing (~7.4 wt % Pt, ~12.4 wt % Pt, and 17.5 wt % Pt). The highest PtNiNW mass activity following potential cycling was 661 mA mgPt$^{-1}$ (~17.5 wt % Pt). In comparison, Pt/HSC produced a mass activity of ~225 mA mgPt$^{-1}$ following 30000 cycles.

Example 4

Figures 26A, 26B:
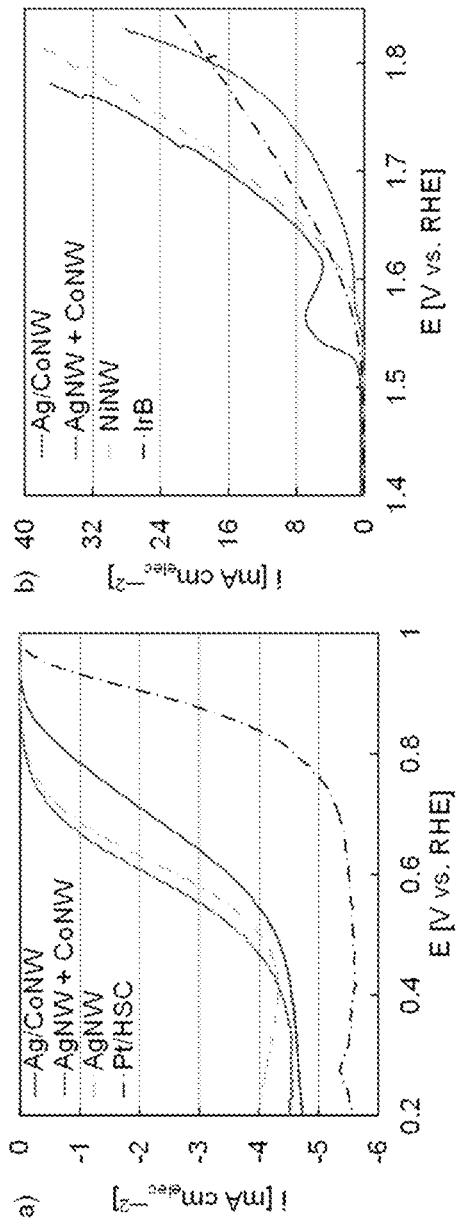
FIGS. 26a and 26b show experimental data derived by some embodiments of the present invention: ORR (FIG. 26a) and oxygen evolution reaction (OER) activity (FIG. 26b) of AgCo nanowires (Galvanic displacement), their physical mixtures, and baseline catalysts. Characterization was completed electrochemically in rotating disk electrode (RDE) half-cells, at ~2500 rpm and 20 mV$^{s-1}$ in a 0.1 M potassium hydroxide electrolyte, with identical electrode loadings (metal mass basis).

Taking advantage of our advanced electrocatalyst synthesis techniques, preliminary materials were synthesized by partially galvanically displacing Co/Ni nanowire templates with Ag ions, forming a Co/Ni core with a AgCo/AgNi shell. Initial findings have indicated that AgCo nanowires produce the highest activity for OER and ORR of the non-precious metal catalysts examined, including physical mixtures of Ag and Co, and Ir nanoparticles in OER (baseline catalyst for acidic electrolyzers, see FIGS. 26a and 26b).

Example 5

An example of iridium cobalt nanowires as a catalyst is described below.

Ir—Ni nanowires were synthesized by the galvanic displacement of Ni nanowires with Ir. Ni nanowires, 40 mg in 80 ml of water, were horn sonicated for 5 minutes to disperse. The Ni nanowire dispersion was heated to 90° C. for 15 minutes in a round bottom flask stirred at 500 rpm by a Teflon paddle. Varying amounts of Ir (IV) chloride hydrate in 50 ml of water were then added to the round bottom flask drop-wise over a period of 15 minutes (Figure S.1). The flask continued at 90° C. for 2 hours at which point the Ir—Ni nanowires were washed in water and 2-propanol by centrifugation. This method is similar to the synthesis of Ir—Co nanowires, but differs in the template material used.

Acid leaching was completed by dispersing 30 mg of the Ir—Ni nanowires in room temperature 3 M sulfuric acid (50 ml). After 16 h, the leached Ir—Ni nanowires were washed in water and 2-propanol by centrifugation. Scanning electron microscopy (SEM) images were taken on a JEOL JSM-7000F field emission microscope, of materials coated onto silica slides.

Materials were digested for inductively coupled plasma-mass spectrometry (ICP-MS) by dry ashing with sodium peroxide. Ir—Ni nanowires were weighed on a microbalance and added to sodium peroxide in a zirconium crucible at a mass ratio of 1 mg Ir—Ni:4 mg sodium peroxide. Samples were heated with a Meker-Fisher burner running methane for approximately 1 minute. After cooling, the ashed samples were dissolved in water, hydrochloric acid, and nitric acid (volumetric ratio 1:1:1), then diluted to 200, 20, and 2 ppb and matrix matched to 1.5 vol. % hydrochloric acid and 0.5 vol. % nitric acid. All samples, of digested materials or electrolytes, were filter at 0.4 µm. ICP-MS data was taken with a Thermo Scientific iCAP Q and calibrated to a blank and three Ir—Ni standards; calibration checks were completed after every five unknowns. Each sample was measured three times with a standard deviation of less than 2%.

Electrochemical measurements were taken in a RDE half-cell containing 0.1 M perchloric acid with a single-channel Autolab potentiostat (Eco Chemie, Metrohm Autolab B.V.). Catalysts for OER were coated onto a polycrystalline gold working electrodes, controlled by a Modulated Speed Rotator (Pine Instrument Company). Gold mesh and a reversible hydrogen electrode (RHE) connected to the main cell by a Luggin capillary were used as the counter and reference electrodes. Gold was used as the working electrode in place of carbon since the high potentials for OER characterization would have corroded carbon electrodes. Gold was also beneficial as a working and counter electrode material since the metal has low OER activity.

Ir—Ni nanowire inks contained 2 mg of material, 7.6 ml of water, 2.4 ml of 2-propanol, and 40 µl of Nafion (5 wt. %, Sigma Aldrich). Inks in ice were horn sonicated for 30 seconds, bath sonicated for 20 minutes, and horn sonicated for 30 seconds. The inks (10 µl) were then pipetted onto the working electrodes; as the electrodes dried (40° C., 20 minutes), the sonication process was repeated and the electrodes recoated to increase the loading. All electrochemical data presented for the Ir—Ni nanowires was at a loading of 30.6 µgIrNi cmelec$^{-2}$. This loading was used since: it was not so high to reduce the Ir electrochemical surface areas (ECAs); and it was high enough to minimize the contribution of the gold electrode in mercury underpotential deposition, typically one sixth to one seventh the Ir charge response at this loading. The concentration of Ir—Ni nanowire inks, where acid treatment had been used to preferentially leach Ni, were lowered to maintain the Ir loading. For example, the concentration of Ir—Ni nanowire inks 9.3 wt. Ir was 0.2 mgIrNi ml$^{-1}$ or 0.019 mgIr ml$^{-1}$. The concentration of the same material, treated in acid and 94.6 wt. % Ir, was 0.020 mgIrNi ml$^{-1}$ or 0.019 mgIr ml$^{-1}$. Other than the ink concentration, the electrode coating process was identical to the process for materials not acid leached. Ir nanoparticle inks contained 3.5 mg of material, 7.6 ml of water, 2.4 ml of 2-propanol, and 40 µl of Nafion. Inks in ice were bath sonicated for 20 minutes, then pipetted (10 µl) onto working electrodes and dried (40° C., 20 minutes).

Catalysts underwent electrochemical break-in for 20 cycles at 100 mV s$^{-1}$, 1.2 to 1.8 V vs. RHE. OER polarization curves were then run anodically at 20 mV s$^{-1}$ and 2500 rpm from 1.2 to 2.0 V vs. RHE. Successive chronoamperometry experiments were completed every 25 mV for 10 s in the potential range 1.4 to 1.6 V vs. RHE at 2500 rpm. Electrochemical measurements were corrected for internal resistance, 25-28Ω depending on the catalyst examined. Internal resistance corrections were inputted into the program file, not corrected for after data collection. This insured that data was not over-corrected and was particularly necessary in durability testing, to ensure that all catalysts were exposed to identical potential cycling conditions. A potential of 1.6 V vs. RHE was used to evaluate OER activities since the potential produced moderate activity and was similar to overpotential applied in typical acidic ORR protocols.

Electrochemical surface areas (ECAs) were determined by mercury underpotential deposition in RDE half-cells containing 0.1 M perchloric acid and 1 mM mercury nitrate.1 Cyclic voltammograms were taken at 20 mV s$^{-1}$ and 1500 rpm in the potential range −0.2 to 0.6 V vs RHE. ECA calculations were completed assuming a Coulombic charge of 138.6 µC cmIr$^{-2}$ for the desorption of a monolayer of mercury; this charge was validated by a polycrystalline Ir electrode, which produced a roughness factor of 1.43. As mentioned previously, the polycrystalline gold electrode also contributed in mercury underpotential deposition. The background cyclic voltammogram of the gold electrode in perchloric acid and mercury nitrate was subtracted from the collected data. Catalyst loadings were also kept elevated to ensure that the gold voltammogram and its subtraction did not significantly impact the ECA calculation. These experiments were completed using gold and carbon electrodes and a significant difference between the two sets of experiments was not observed.

It was previously reported that the exposure of small Ir nanoparticles to high potential irreversibly oxidized the Ir, lowering the ECA in carbon monoxide oxidation experiments.2 ECA measurements were taken prior to and following electrochemical break-in. For the Ir nanoparticles, the ECAs taken before and after high potential were similar, likely since the particle size was larger and Ir oxide may form a porous structure with subsurface Ir able to participate in mercury underpotential deposition. The ECAs of Ir—Ni nanowires increased following break-in, likely since cycling at high potential removed Ni, exposing a greater number of Ir sites at the surface. Durability testing was completed by potential holds at 1.5 and 1.6 V vs. RHE for 13.5 hour with the working electrode rotated at 2500 rpm to prevent oxygen bubbles from encapsulating the electrode tip. OER activities and ECAs were also taken following durability testing, as well as electrolyte samples following break-in and durability for ICP-MS.

The spontaneous galvanic displacement of Ni nanowires with Ir produced Ir—Ni nanowires 200-400 nm in diameter and 5-20 µm in length. The degree of galvanic displacement was controlled by the amount of Ir chloride added during synthesis, but displacement was limited to Ir contents less than 25 wt. %. Higher levels of displacement were achieved by adding Ir chloride hydrochloride hydrate; the slightly more acidic environment may have aided the removal of a Ni oxide coating and allowed for Ni in the nanowire core to be displaced. Pt—Ni nanowires were synthesized previously, where a similar limited displacement phenomenon was observed.

Figure 27A:
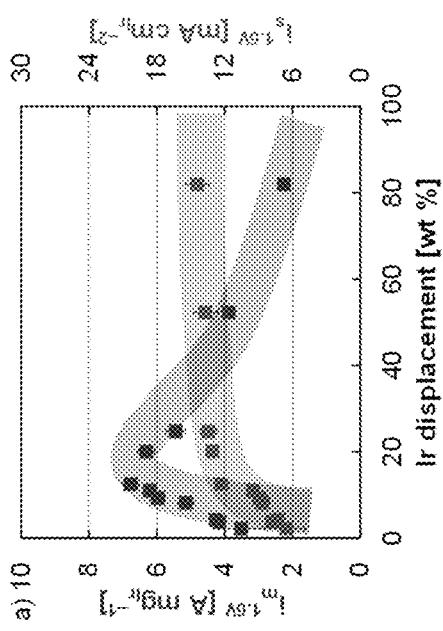
FIGS. 27a and 27b show experimental data derived by some embodiments of the present invention: Mass and specific OER activities (FIG. 27a) and ECAs of Ir—Ni nanowires (FIG. 27b) as a function of displacement level. OER activities were determined during anodic linear polarization scans at 20 mV s$^{-1}$ and 2500 rpm in a 0.1 m perchloric acid electrolyte. ECAs were determined by mercury underpotential deposition during cyclic voltammograms at 20 mV s$^{-1}$ and 1500 rpm in a 0.1 m perchloric acid electrolyte containing 1 mm mercury nitrate. More information is available in the experimental section.
Figure 27B:
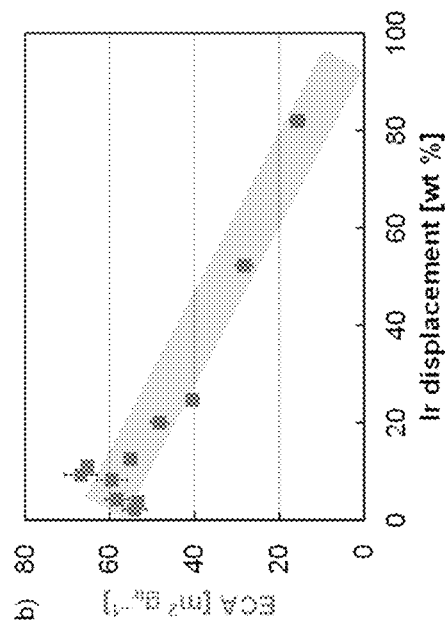

Reducing the level of displacement increased the Ir ECA, potentially by having a higher proportion of Ir atoms electrochemically available on the nanowire surface (see FIGS. 27a and 27b). Increasing the ECA improved OER mass activity, with a peak activity at 12.5 wt. % Ir. Ir—Ni nanowires generally produced a specific activity comparable to polycrystalline Ir; a declining specific activity at low displacement may have been due to a higher prevalence of Ni reducing the purity of the Ir surface.

Durability testing of the as-synthesized Ir—Ni nanowires produced expected trends: activity losses were larger at lower levels of displacement; and activity losses were slightly higher at 1.6 than 1.5 V. Ir and Ni dissolution, however, were less than 1% regardless of the displacement level. It is possible that Ir formed a stable coating at or near the nanowire surface, continuous enough to prevent excessive Ni dissolution at elevated potential. Potential holds may increase the prevalence of Ni oxides near the surface that either: grow around Ir, blocking active sites; or electronically isolate Ir near the nanowire surface, accounting for activity losses following durability testing. The resistance of the Ni nanowires to dissolution matches previous examinations of Pt—Ni nanowires; there may also be parallels between their resistance to electrochemical dilution and the resistance of the Ni nanowires to complete Ir displacement.3

The as-synthesized Ir—Ni nanowires were acid leached in an effort to reduce the Ni content and improve OER activity following durability testing. Compared to the as-synthesized materials, acid leaching generally: produced catalysts with comparable but slightly lower ECAs; and improved the specific OER activity at low levels of displacement, potentially since removing Ni improved the continuity and cleanliness of the extended Ir surface (see FIGS. 28a and 28b). Acid leaching thereby improved the mass activity of the Ir—Ni nanowires at low displacement, producing several catalysts with mass activities greater than the previous high performer.

Figure 29A:
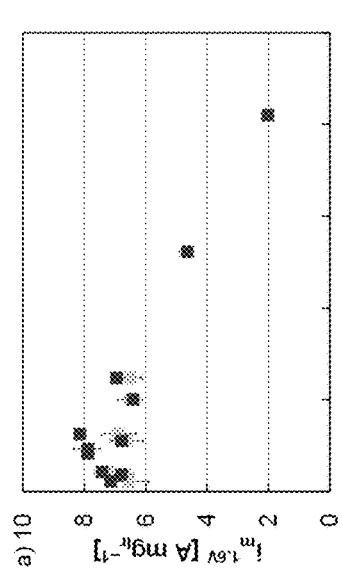
FIGS. 29a-c show experimental data derived by some embodiments of the present invention: OER mass activities (FIG. 29a), OER specific activities (FIG. 29b), and ECAs (FIG. 29c) of acid leached Ir—Ni nanowires prior to (grey) and following (red, blue, and green) durability testing, 13.5 h at 1.5 V vs RHE. Activities and ECAs are plotted by their as-synthesized composition, although after acid leaching, the Ir contents for all samples are above 90 wt. %.
Figure 29B:
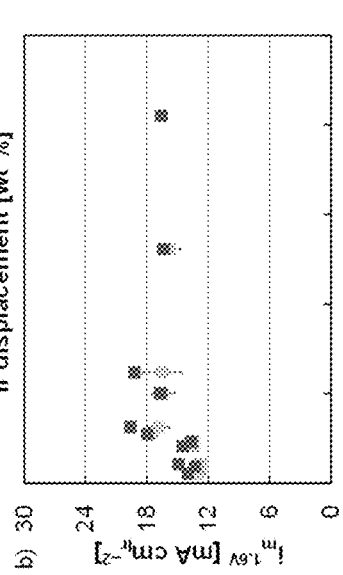
Figure 29C:
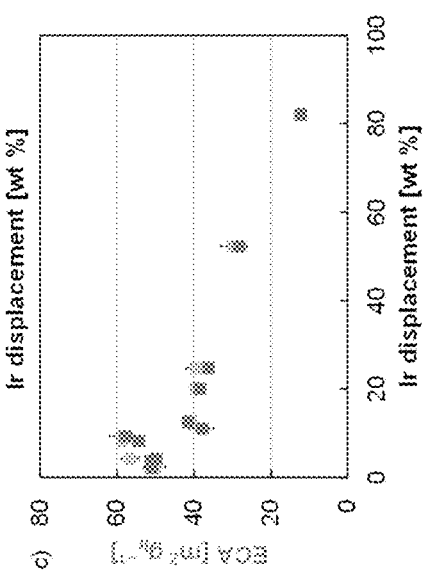
Figure 30:
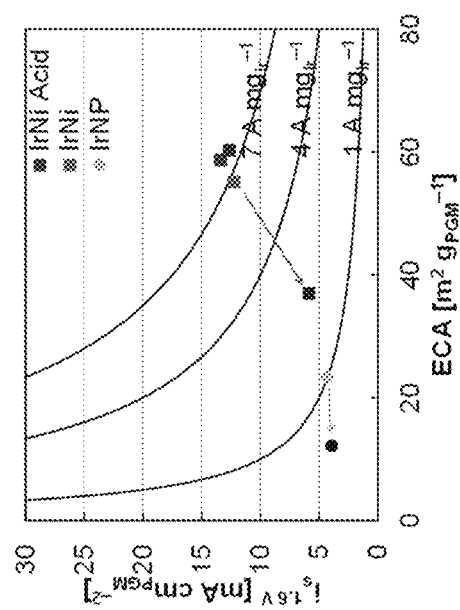
FIG. 30 shows experimental data derived by some embodiments of the present invention: ECAs and specific OER activities of Ir—Ni nanowires, as-synthesized and acid leached, and Ir nanoparticles prior to (red, blue, and grey) and following (dark red, dark blue, and black) durability by potential hold at 1.5 V vs RHE. OER activities were determined at 1.6 V vs RHE during anodic linear polarization scans at 20 mV s$^{-1}$ and 2500 rpm in a 0.1 m perchloric acid electrolyte. Solid lines were included denoting constant mass activities of 1, 4, and 7 A mg$_{Ir}^{-1}$.

Acid leaching of the Ir—Ni nanowires significantly improved their durability (See FIGS. 29a-c). At low levels of displacement, the as-synthesized materials lost more than half their activity in durability; for the same materials preleached with acid, the activity losses were minimal (see Table 1 and FIG. 30). High potential holds may have grown the thickness of the Ni oxide layer near the nanowire surface of the as-synthesized Ir—Ni nanowires, isolating surface Ir. Acid leaching removed the majority of Ni, potentially preventing the isolation of surface Ir in durability testing.

TABLE 1

Electrochemical properties of Ir—Ni nanowires, as-synthesized and acid leached, and Ir nanoparticles following acid exposure (AE, break-in) and durability by potential hold at 1.5 V vs RHE. OER activities were determined at 1.6 V vs RHE during anodic linear polarization scans at 20 mV s$^{-1}$ and 2500 rpm in a 0.1M perchloric acid electrolyte.

|  | Ir Content [wt. % Ir] | ECA$_{AE}$ [m$^2$ g$_{Ir}^{-1}$] | i$_{m,AE}$ [A mg$_{Ir}^{-1}$] | i$_{s,AE}$ [mA cm$_{Ir}^{-2}$] | ECA$_{1.5\,V}$ [m$^2$ g$_{Ir}^{-1}$] | i$_{m,1.5\,V}$ [A mg$_{Ir}^{-1}$] | i$_{s,1.5\,V}$ [mA cm$_{Ir}^{-2}$] |
|---|---|---|---|---|---|---|---|
| Ir—Ni | 12.5 | 55.2 | 6.8 | 12.3 | 42.6 | 2.8 | 6.5 |
| Ir—Ni, acid | 95.6 | 59.0 | 7.9 | 13.4 | 57.7 | 7.9 | 13.7 |
| IrNP | 100.0 | 23.4 | 1.0 | 4.3 | 11.6 | 0.5 | 4.5 |

Example 6

This example summarizes experiments that produced Ir—Co nanowires for OER activity in RDE half-cells.

Ir—Co nanowires were synthesized by the spontaneous galvanic displacement of Co nanowires. Co nanowires (40 mg) were dispersed by horn sonication in 80 ml of water, heated to 90° C., and stirred by a Teflon paddle at approximately 500 rpm in a 250 ml round bottom flask. A variable amount of Ir (IV) chloride hydrate was dissolved in 50 ml of water and added drop-wise to the flask over a period of 15 minutes. The flask contents proceeded at 90° C. for about 2 hours prior to being cooled in an ice bath. The formed Ir—Co nanowires were washed by centrifugation three times in water and once in 2-propanol prior to being dried in a vacuum oven at 40° C.

In the acid treatment of Ir—Co nanowires, approximately 40 mg was dispersed in 50 ml of 3 M sulfuric acid at room temperature for about 16 hours. The product was then washed by centrifugation three times in water and once in 2-propanol prior to being dried in a vacuum oven at about 40° C. Scanning electron microscopy (SEM) was taken with a JEOL JSM-7000F field emission microscope equipped with EDAX Genesis energy dispersive X-Ray spectrometer. SEM samples were prepared by pipetting sonicated catalyst dispersions onto silica substrates.

Inductively coupled plasma-mass spectrometry (ICP-MS) experiments were completed with a Thermoscientific iCAP Q, calibrated to a blank, four Ir—Co standards (2, 10, 20, 200 ppb), and an internal standard. Experiments were checked against the internal standard and an Ir—Co standard (20 ppb) every 5 unknowns. Ir—Co nanowires (approximately 1 mg of each sample, weighed on a microbalance) were prepared for ICP-MS by ashing in sodium peroxide, at a sodium peroxide to sample ratio in excess of 4:1. Samples were ashed by exposure to open flame in a zirconium crucible, rated to 200 exposures; full ICP-MS spectra were periodically monitored to ensure zirconium did not appear. Following ashing, samples were dissolved in a mixture of water, nitric acid, and hydrochloric acid (1 ml of each, mixed prior to addition). Although ashing of Ir typically does not use hydrochloric acid, it was included to ensure the dissolution of Co. Samples were diluted to three concentrations aimed for 2, 20, and 200 ppb, and all ICP-MS samples (Ir—Co nanowires and electrolytes) were filtered at 0.4 μm. ICP-MS measurements were taken in standard and kinetic energy discrimination (KED) mode to remove Co interferences. The differences in Co concentration during standard and KED modes were less than 5%, although the values obtained in KED mode were typically less. Each sample was measured three times, with a standard deviation of less than 2% between measurements.

Electrochemical characterization was completed in a three-electrode RDE half-cell containing 0.1 M perchloric acid and equipped with a 5 mm diameter gold working electrode coated with catalyst, a gold mesh counter electrode, and a reversible hydrogen electrode (RHE) reference. The reference electrode contained hydrogen-saturated 0.1 M perchloric acid and was connected to the main cell by a Luggin capillary. A gold working electrode was used since carbon electrodes corrode at elevated potential, required in electrochemical characterization for OER. Gold in particular was used due to the low activity for OER, relative to Ir. A gold mesh counter electrode was also used to avoid Pt and since gold was already used for the working electrode. Rotation of the working electrode was controlled with a modulated speed rotator (Pine Instrument Company) and measurements were taken with an Autolab potentiostat (Eco Chemie, Metrohm Autolab B. V.).

Ir—Co nanowire inks were made to a concentration of 0.2 mg$_{IrCo}$ ml$^{-1}$, with a water to 2-propanol ratio of 7.6:2.4; Nafion (5 wt. %, Sigma Aldrich) was added at a concentration of 4 μl$_{Nafion}$ ml$_{Ink}^{-1}$. Inks were chilled in ice, horn sonicated for about 30 seconds, bath sonicated for about 20 minutes, and horn sonicated for about 30 seconds prior to 10 μl being dispensed onto a gold electrode. Inks of Ir nanoparticles contained 3.5 mg Ir, 7.6 ml water, 2.4 ml 2-propanol, and 40 μl Nafion. Chilled Ir nanoparticle inks were bath sonicated for 20 minutes; 10 μl of ink was then dispensed onto a gold electrode. Following coating, electrodes were dried for about 20 minutes at 40° C.

Ink concentrations of Ir—Co nanowires treated in sulfuric acid were lowered to maintain a consistent Ir electrode loading. For example, the ink for Ir—Co nanowires 4.2 wt. % Ir was at a concentration of 0.2 mg$_{IrCo}$ ml$^{-1}$; the ink for the same material following acid treatment (96.8 wt. % Ir) was at a concentration of 8.4 μg$_{IrCo}$ ml$^{-1}$. In both cases, dispensing 10 μl of ink produced gold working electrodes with Ir loadings of 0.43 μg$_{Ir}$ cm$^{-2}$. All other aspects of electrode preparation, including the Nafion content and sonication regime, were identical to the inks of Ir—Co nanowires not treated in sulfuric acid.

Electrochemical break-in consisted of 20 cycles at 2500 rpm and 100 mV s$^{-1}$ in the potential range 1.2-1.8 V vs. RHE. Linear polarization scans corrected for internal resistance (23-28Ω, depending on sample) and completed at 2500 rpm and 20 mV s$^{-1}$ in the potential range 1.2-2.0 V vs. RHE. Chronoamperometry experiments were completed in an effort to remove any potential surface reactions not related to OER. Experiments consisted of 10 second potential holds at 25 mV intervals and 2500 rpm in the potential range 1.4-1.6 V vs. RHE. Differences between the chronoamperometry experiments and linear polarization curves were minimal at lower potential, but increased in the 1.55-1.6 V range. The lower activities obtained in chronoamperometry likely occurred from increased oxygen bubble formation blocking active Ir sites.

Internal resistance corrections were inputted into linear polarization, chronoamperometry, and durability files. The input of high internal resistance values produced scattered data, preventing overcorrection. Data scattering, not related to internal resistance, occurred at potentials greater than 1.65 V vs. RHE due to large bubbles forming on the working electrode surface. A rotation speed of 2500 rpm was used since it was the highest speed rating for the working electrodes. Modifying the orientation of the working electrode (vertical to approximately 45°) did not appear to improve bubble diffusion from the working electrode. Activities for OER were evaluated at 1.6 V vs. RHE, since the potential was: greater than the OER onset and produced significant activity; lower than the onset of data scattering from excess bubble formation; and comparable in overpotential to typical evaluations for acidic oxygen reduction (0.37 V in OER overpotential, 0.33 V in oxygen reduction overpotential).

Electrochemical surface areas (ECAs) were determined by mercury underpotential deposition in a 0.1 M perchloric acid electrolyte containing 1 mM mercury nitrate. Working electrodes were rotated at 1500 rpm and cyclic voltammograms were completed at 20 mV s$^{-1}$ in the potential range −0.2-0.6 V vs RHE. The ECA calculation was completed assuming a Coulombic charge of 138.6 µC cm$_{Ir}^{-2}$; this experiment on a polycrystalline Ir electrode produced a roughness factor of 1.43.

Durability testing was completed by 13.5 h potential holds at 1.5 and 1.6 V vs. RHE, at a rotation speed of 2500 rpm in a 0.1 M perchloric acid electrolyte. Durability program files included corrections for internal resistance, necessary to maintain an accurate potential. Electrochemical testing for OER activity and catalyst ECAs were completed following durability testing. Samples were taken of electrolytes following electrochemical break-in and durability for ICP-MS.

Ir—Co nanowires were synthesized by the spontaneous galvanic displacement of Co nanowires and found to be 200-400 nm in diameter and 5-20 µm in length (see FIG. 31). Ir displacement was not appreciably limited by a Co oxide layer and did not require additional acid to achieve high levels of displacement. The degree of Ir displacement was varied solely by the amount of Ir precursor provided and produced Ir—Co nanowires 4.2-99.8 wt. % Ir.

Figure 32A:
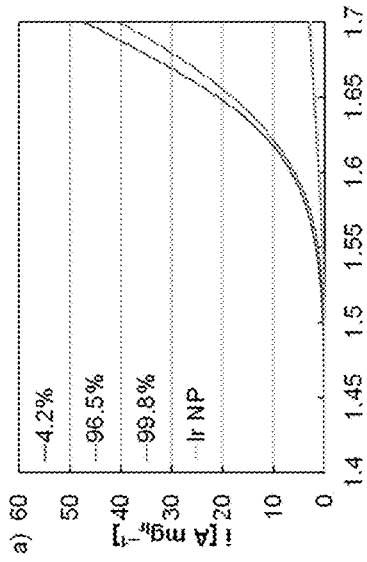
FIGS. 32a-c show experimental data derived by some embodiments of the present invention: Linear sweep voltammograms of Ir—Co nanowires (4.2 wt. % as-synthesized, 96.5 wt. % acid treated, and 99.8 wt. % as-synthesized) and Ir nanoparticles for OER activity (FIG. 32a). OER activity by linear sweep voltammogram and successive chronoamperometry experiments (FIG. 32b). Cyclic voltammograms of Ir—Co nanowires and Ir nanoparticles in mercury underpotential deposition (FIG. 32c).
Figure 32B:
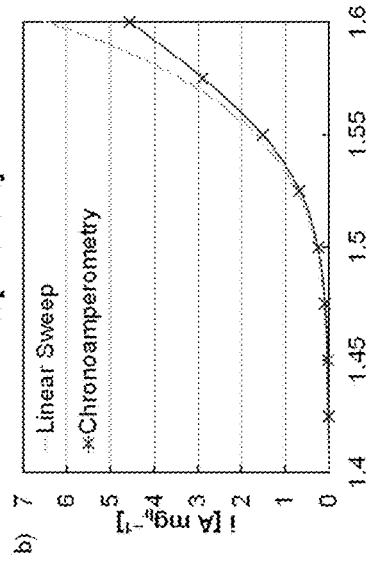
Figure 32C:
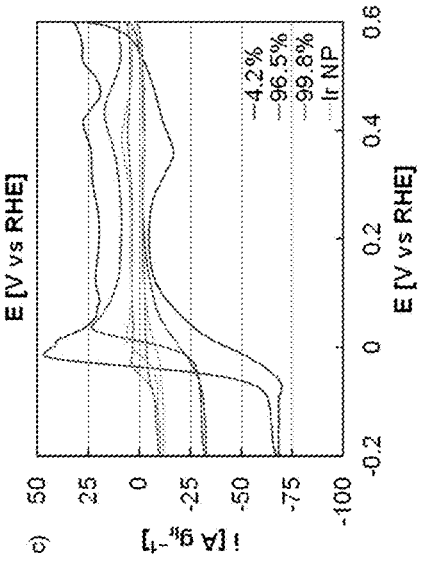

OER activities were determined during anodic linear polarization curves (see FIG. 32). The data presented has been limited to 1.8 V vs. RHE since current at higher potentials scattered due to the high rate of oxygen formation on the electrode surface. Chronoamperometry experiments also produced lower current following the OER onset since the current was taken following a 10 second potential hold and active sites were likely blocked by evolved oxygen. ECAs were determined by mercury underpotential deposition. The cyclic voltammograms shown were from catalysts on a polycrystalline gold electrode. The current from a polished gold electrode was subtracted from the observed cyclic voltammogram prior to calculating ECAs. Gold is also active for mercury adsorption/desorption and was subtracted to not inflate the Ir ECAs. Co was not stable in perchloric acid in the examined potential range (−0.2-0.6 V vs. RHE) and was not anticipated to contribute to the ECA value. Subtraction of the polycrystalline gold current could have artificially reduced the calculated ECA since the catalyst covered a portion of the electrode, reducing the actual contribution of gold. The background subtracted ECAs on gold electrodes, however, were comparable to those on carbon electrodes following irreversible Ir surface oxidation (potential cycling up to 1.4 V vs. RHE). Gold electrodes were used for the ECA calculation since the carbon electrodes could not be used for durability testing.

In the case of the Ir nanoparticle benchmark, the charges for hydrogen and mercury adsorption/desorption decreased 10-20% following OER break-in. In the case of Ir—Co nanowires, however, the charges significantly increased, likely by removing surface Co. Cyclic voltammograms in potassium hydroxide confirmed that the catalyst surface contained significant amounts of Co prior to testing in acid; the Co contributions significantly decreased following OER characterization. Although taking the ECA of Ir nanoparticles after OER break-in resulted in a lower ECA and higher OER specific activity, it was needed to clean the Ir—Co nanowire surface and durability testing could not be completed without irreversible surface oxidation. It was possible that the Ir—Co nanowires and Ir nanoparticles examined here contained large enough surface features that subsurface Ir layers participated in mercury adsorption/desorption. Using mercury underpotential deposition to determine Ir ECAs may not be suitable for Ir nanoparticles with extremely small diameters.

Figure 33A:
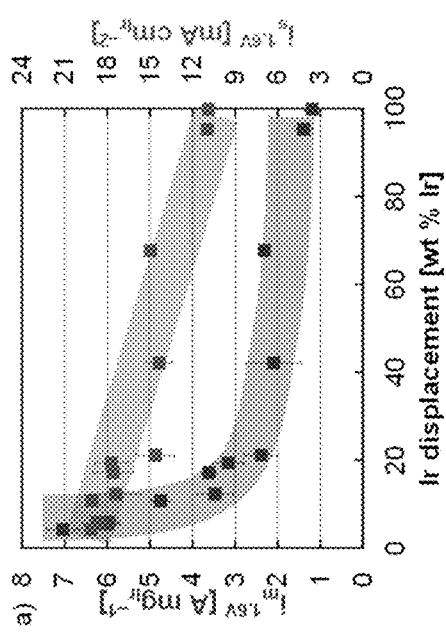
FIGS. 33a and 33b show experimental data derived by some embodiments of the present invention: Mass and specific OER activities (FIG. 33a) and ECAs of Ir—Co nanowires as a function of Ir displacement (FIG. 33b). Activities were corrected for internal resistance at 1.6 V vs. RHE and taken with a rotation speed of 2500 rpm and at a scan rate of 20 mV s$^{-1}$ in a 0.1 m perchloric acid electrolyte.
Figure 33B:
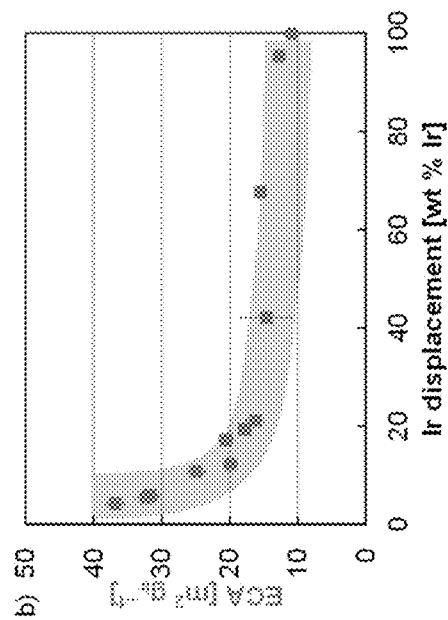

The OER activities of Ir—Co nanowires and Ir nanoparticles were compared at 1.6 V vs. RHE (see FIGS. 33a and 33b). Specific activity generally increased at lower levels of displacement. ECA also increased at lower levels of displacement, likely due to increased Ir utilization. At 4.2 wt. % Ir, the Ir—Co nanowires produced a maximum OER activity of 7.0 A mg$_{Ir}^{-1}$ with an ECA of 36.8 m$^2$ g$_{Ir}^{-1}$. In comparison to Ir nanoparticle benchmark, the Ir—Co nanowires produced an OER mass activity 7.0 times higher (nanoparticles 1.0 A mg$_{Ir}^{-1}$), an OER specific activity 4.5 times higher (nanoparticles 4.3 mA cm$_{Ir}^{-2}$) and an ECA 1.6 times higher (nanoparticles 23.4 m$^2$ g$_{Ir}^{-1}$). At high levels of displacement, the Ir—Co nanowires produced similar activities to a polycrystalline Ir electrode (12.1 mA cm$_{Ir}^{-2}$); at lower levels of displacement, the specific activities of the as-synthesized materials increased and exceeded polycrystalline Ir by as much as 58%.

The extended surface and lattice compression were examined as potential contributors to the high specific activity of Ir—Co nanowires. It was previously modelled the OER activity of single metals as a function of oxygen binding strength, finding that Ir—O chemisorption was stronger than optimal (see J. Chem Cat Chem 2011, 3, 1159-1165). Lattice compression was anticipated to electronically tune Ir, modifying its band structure, and improve OER activity. Conversely, an expanded Ir lattice was anticipated to increase Ir—O chemisorption and reduce activity. Although an Ir particle size effect has not been demonstrated, it was possible that nanoparticle surface tension expanded the Ir lattice, reducing the OER specific activity of the Ir nanoparticles. It was also possible that the extended surface allowed for Ir—Co nanowires to produce a specific OER activity comparable to polycrystalline Ir. Any benefit from the extended surface, however, would have been diluted due to the surface features of the nanowires (typically 4 nm) and the relatively large particle size of the Ir nanoparticles (approximately 5 nm). Lattice compression by a Co alloying effect potentially improved the nanowire OER activity and may have accounted for the increasing specific activity at low levels of displacement. Although lattice compression may have improved OER activity, the extended surface was expected to be the dominant factor. Ir—Co nanowires (99.8 wt. %) likely had little lattice tuning due to the high level of displacement, but produced an OER specific activity 2.5 times greater than the Ir nanoparticles.

Figure 34A:
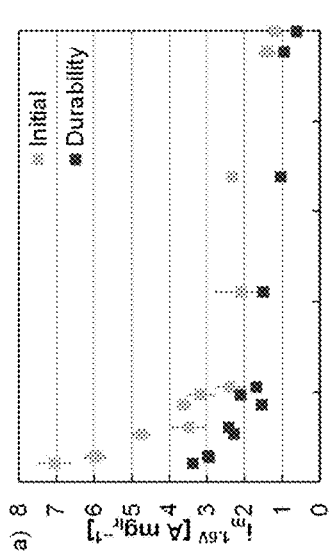
FIGS. 34a-c show experimental data derived by some embodiments of the present invention: OER mass activities (FIG. 34a), specific activities (FIG. 34b), and ECAs of as-synthesized Ir—Co nanowires prior to and following durability testing at 1.5 V vs. RHE (FIG. 34c).
Figure 34B:
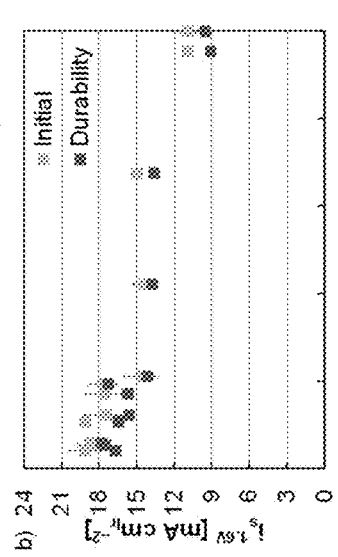
Figure 34C:
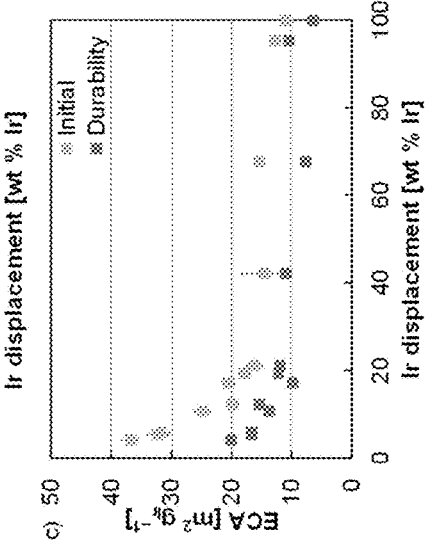

Durability testing was completed by potential holds at 1.5 and 1.6 V vs. RHE over a period of 13.5 h. Holds at these potentials were previously found to result in particle growth and ECA losses in Ir nanoparticles without excessive Ir dissolution. Ir—Co nanowire activity loss at 1.5 V vs. RHE was primarily due to ECA (see FIGS. 34a-c). At moderate to high levels of displacement, activity loss was generally less than observed on the Ir nanoparticles. Although the nanowires likely contained small surface features, the large morphology and extended nature of the catalyst potentially reduced the likelihood of Ir aggregation. At low levels of displacement, activity losses increased and were comparable on a percentage basis to Ir nanoparticles. The increased activity loss was likely due to the increased Co content, prone to dissolution in acid. ICP-MS of electrolytes following durability testing confirmed an increasing loss of Ir and Co at low displacement levels. Ir—Co nanowires (4.2 wt. % Ir) were the highest performing catalyst following durability testing, but lost 52.1% mass activity and 45.2% ECA; in comparison, Ir nanoparticles lost 47.6% mass activity and 50.4% ECA following durability at 1.5 V vs. RHE. Comparable ECA losses and metal dissolution rates were observed from durability testing at 1.6 V vs. RHE. Specific activities, however, dropped particularly at low levels of displacement adversely affecting mass activity. It was possible that metal dissolution was incrementally higher, resulting in deterioration of the catalyst layer or morphology loss.

Figure 35A:
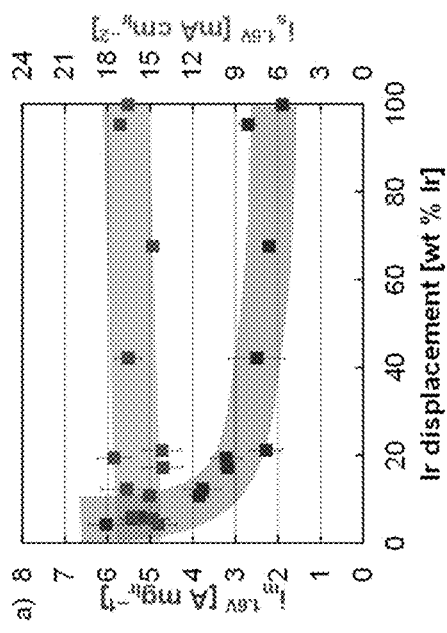
FIGS. 35a and 35b show experimental data derived by some embodiments of the present invention: Mass and specific OER activities (FIG. 35a) and ECAs of acid treated Ir—Co nanowires as a function of the as-synthesized level of Ir displacement (FIG. 35b). Activities were corrected for internal resistance at 1.6 V vs. RHE and taken with a rotation speed of 2500 rpm and at a scan rate of 20 mV s$^{-1}$ in a 0.1 m perchloric acid electrolyte.
Figure 35B:
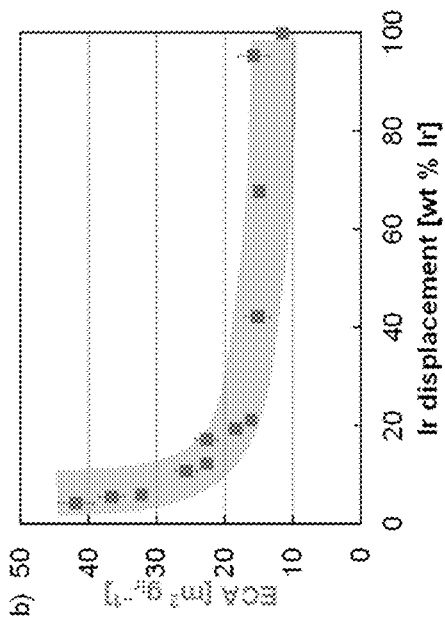

Ir—Co nanowires were treated in acid to remove the Co substrate prior to electrochemical testing. The Ir content in the nanowires, originally 4.2-99.8 wt. %, increased to 95.1-99.8 wt. % and it was anticipated that exposure to acid removed all Co not contained in the Ir-rich phase. ECAs also increased, to a maximum of 41.9 $m^2$ $g_{Ir}^{-1}$ (see FIGS. 35a and 35b). The specific activity increased at high levels of displacement, potentially due to acid treatment cleaning the catalyst surface. At low levels of displacement, however, the specific activity dropped, potentially due to the high Co content where leaching may have resulted in morphology loss. Following acid leaching, Ir—Co nanowires produced a maximum mass activity of 6.0 A $mg_{Ir}^{-1}$, 6.0 times greater than Ir nanoparticles.

Figure 36A:
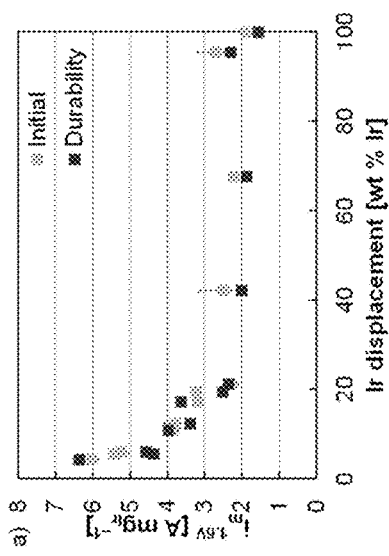
FIGS. 36a-c show experimental data derived by some embodiments of the present invention: OER mass activities (FIG. 36a), specific activities (FIG. 36b), and ECAs of acid treated Ir—Co nanowires prior to and following durability testing at 1.5 V vs. RHE (FIG. 36c).
Figure 36B:
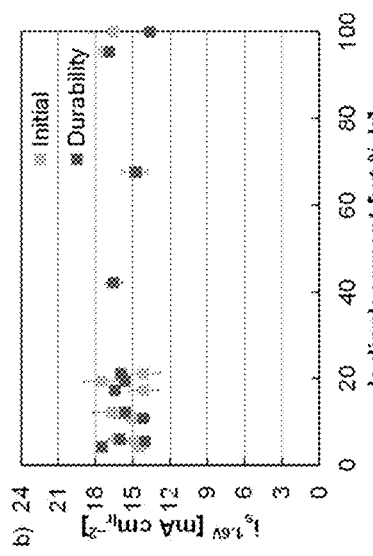
Figure 36C:
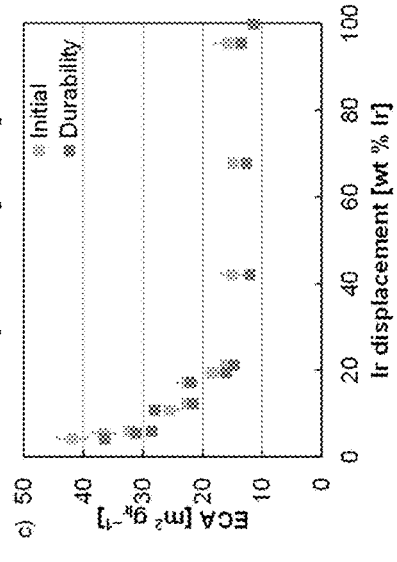

Following durability testing at 1.5 V vs. RHE, the acid treated Ir—Co nanowires retained a far greater proportion of OER activity than the as-synthesized material and the Ir nanoparticles (see FIGS. 36a-c). Ir—Co nanowires (acid treated, 4.2 wt. % Ir as-synthesized) produced a peak mass activity of 6.4 A $mg_{Ir}^{-1}$, 12.1 times greater than the Ir nanoparticles, with an ECA of 36.5 $m^2$ $g_{Ir}^{-1}$ (3.1 times greater than Ir nanoparticles) and a specific activity of 3.9 mA $cm_{Ir}^{-2}$ (3.9 times greater than Ir nanoparticles). The extended nature of the catalyst, an agglomeration of Ir nanoscale surface features, potentially reduced aggregation through durability testing and improved ECA and activity retention. Acid treating also significantly reduced leaching of Ir and Co into the electrolyte in electrochemical break-in and durability testing, attributed to the reduced Co content. Slightly higher but comparable losses were observed following durability testing at 1.6 V vs. RHE. Higher losses were similarly observed in the as-synthesized material and likely due to the higher potential slightly increasing Ir dissolution.

Embodiment 1

A method including contacting, with a gas, a nanostructure that comprises a first metal and a second metal; and heating the nanostructure to a first temperature, wherein: the nanostructure has an outside layer substantially covering an interior layer that comprises the first metal, the outside layer of the nanostructure comprises a first concentration of the first metal, the heating and the contacting cause the movement of a first portion of the first metal from the interior layer to the outside layer to create a modified nanostructure, and the outside layer of the modified nanostructure has a second concentration of the first metal that is higher than the first concentration of the first metal.

Embodiment 2

The method of Embodiment 1, wherein: the nanostructure further comprises an inside layer substantially covering the interior layer, the inside layer comprises a third concentration of the first metal, the inside layer defines a channel positioned within the nanostructure, the heating and the contacting cause the movement a second portion of the first metal from the interior layer to the inside layer, and the inside layer of the modified nanostructure has a fourth concentration of the first metal that is higher than the third concentration of the first metal.

Embodiment 3

The method of Embodiments 1-2, wherein the nanostructure comprises at least one of a fiber, a wire, a filament, a thread, a whisker, a ribbon, or a helix.

Embodiment 4

The method of Embodiments 1-3, wherein the nanostructure has a width of about 0.1 nm to about 1000 nm.

Embodiment 5

The method of Embodiments 1-4, wherein the first metal comprises at least one transition metal.

Embodiment 6

The method of Embodiments 1-5, wherein the second metal comprises at least one transition metal that is different from the first metal.

Embodiment 7

The method of Embodiments 1-5, wherein the first metal comprises at least one of silver, gold, platinum, palladium, ruthenium, copper, nickel, or cobalt.

Embodiment 8

The method of Embodiments 1-6, wherein the second metal comprises at least one of silver, gold, platinum, palladium, ruthenium, copper, nickel, or cobalt.

Embodiment 9

The method of Embodiments 1-6, wherein the gas comprises hydrogen.

Embodiment 10

The method of Embodiments 1-9, wherein the gas further comprises an inert.

Embodiment 11

The method of Embodiments 1-10, wherein the first temperature is about 100° to about 1000° C.

Embodiment 12

The method of Embodiments 1-11, wherein the first temperature is about 100° to about 300° C.

Embodiment 13

The method of Embodiments 1-12, wherein the heating is for a time period of about 30 minutes to about 6 hours.

Embodiment 14

The method of Embodiments 1-13, wherein the time period is about 1 hour to about 3 hours.

Embodiment 15

The method of Embodiments 1-14, wherein the outside layer has a thickness of about 10 pm to about 100 nm.

Embodiment 16

The method of Embodiments 1-15, wherein the outside layer has thickness of about 1 atom to about 4 atoms of the second metal.

Embodiment 17

The method of Embodiments 2-16, wherein the inside layer has a thickness of about 10 pm to about 100 nm.

Embodiment 18

The method of Embodiments 2-17, wherein the inside layer has thickness of about 1 atom to about 4 atoms of the second metal.

Embodiment 19

The method of Embodiments 1-18, wherein the first concentration of the first metal is about 1 m % to about 99 m %.

Embodiment 20

The method of Embodiments 2-19, wherein the third concentration of the first metal is about 1 m % to about 99 m %.

Embodiment 21

The method of Embodiments 1-20, wherein prior to the contacting and the heating, the method further comprises: mixing a starting nanostructure with a solution comprising a salt and a solvent, wherein: the starting nanostructure has a first shape and comprises a first metal having a first redox potential, the salt comprises a counter-ion and a second metal having a second redox potential that is larger than the first redox potential, and the mixing results in replacing a fraction of the first metal by the second metal to form the nanostructure having a second shape that is substantially the same as the first shape.

Embodiment 22

A method comprising: treating, with a solution, a nanostructure that comprises a first metal and a second metal, wherein: the nanostructure has an outside layer substantially covering an interior layer that comprises the first metal, the outside layer of the nanostructure comprises a first concentration of the first metal, the treating removes a first portion of the first metal from the outside layer to create a modified nanostructure, and the outside layer of the modified nanostructure has a second concentration of the first metal that is lower than the first concentration of the first metal.

Embodiment 23

The method of Embodiment 22, wherein: the nanostructure further comprises an inside layer substantially covering the interior layer, the inside layer comprises a third concentration of the first metal, the inside layer defines a channel positioned within the nanostructure, the treating removes a second portion of the first metal from the inside layer, and the inside layer of the modified nanostructure has a fourth concentration of the first metal that is lower than the third concentration of the first metal.

Embodiment 24

The method of Embodiments 22-23, wherein the nanostructure comprises at least one of a fiber, a wire, a filament, a thread, a whisker, a ribbon, or a helix.

Embodiment 25

The method of Embodiments 22-24, wherein the nanostructure has a width of about 0.1 nm to about 1000 nm.

Embodiment 26

The method of Embodiments 22-25, wherein the first metal comprises at least one transition metal.

Embodiment 27

The method of Embodiments 22-26, wherein the second metal comprises at least one transition metal that is different from the first metal.

Embodiment 28

The method of Embodiments 22-26, wherein the first metal comprises at least one of silver, gold, platinum, palladium, ruthenium, copper, nickel, or cobalt.

Embodiment 29

The method of Embodiments 22-27, wherein the second metal comprises at least one of silver, gold, platinum, palladium, ruthenium, copper, nickel, or cobalt.

Embodiment 30

The method of Embodiments 22-29, wherein the solution is acidic.

Embodiment 31

The method of Embodiments 22-30, wherein the acidic solution comprises at least one of acetic acid, hydrochloric acid, sulfuric acid, or nitric acid.

Embodiment 32

The method of Embodiments 22-31, wherein the acidic solution has an acid concentration of about 0.01 M to about 1 M.

Embodiment 33

The method of Embodiments 22-32, wherein the treating is performed at a temperature of about 10° C. to about 100° C.

Embodiment 34

The method of Embodiments 22-33, wherein the temperature is about 20° C. to about 25° C.

Embodiment 35

The method of Embodiments 22-34, wherein the amount of the first element removed from the outside layer is about 1% to about 100%.

Embodiment 36

The method of Embodiments 23-35, wherein the amount of the first element removed from the inside layer is about 1% to about 100%.

Embodiment 37

The method of Embodiments 22-36, wherein prior to the contacting and the heating, the method further comprises: mixing a starting nanostructure with a solution comprising a salt and a solvent, wherein: the starting nanostructure has a first shape and comprises a first metal having a first redox potential, the salt comprises a counter-ion and a second metal having a second redox potential that is larger than the first redox potential, and the mixing results in replacing a fraction of the first metal by the second metal to form the nanostructure having a second shape that is substantially the same as the first shape.

Embodiment 38

A method comprising: contacting, with a gas, a nanostructure that comprises a first metal and a second metal; and heating the nanostructure to a first temperature, wherein: the nanostructure has an outside layer substantially covering an interior layer that comprises the first metal, the outside layer of the nanostructure comprises a first concentration of the first metal, and the heating and the contacting cause the oxidation of a first portion of the first metal in the outside layer to create a modified nanostructure.

Embodiment 39

The method of Embodiment 38, wherein: the nanostructure further comprises an inside layer substantially covering the interior layer, the inside layer comprises a third concentration of the first metal, the inside layer defines a channel positioned within the nanostructure, the heating and the contacting cause the oxidation of a first portion of the first metal in the outside layer of the modified nanostructure.

Embodiment 40

The method of Embodiments 38-39, wherein the first metal comprises at least one transition metal.

Embodiment 41

The method of Embodiments 38-40, wherein the second metal comprises at least one transition metal that is different from the first metal.

Embodiment 42

The method of Embodiments 38-40, wherein the first metal comprises at least one of silver, gold, platinum, palladium, ruthenium, copper, nickel, or cobalt.

Embodiment 43

The method of Embodiments 38-41, wherein the second metal comprises at least one of silver, gold, platinum, palladium, ruthenium, copper, nickel, or cobalt.

Embodiment 44

The method of Embodiments 38-43, wherein the gas comprises oxygen.

Embodiment 45

The method of Embodiments 38-44, wherein the gas further comprises an inert.

Embodiment 46

The method of Embodiments 38-45, wherein the first temperature is about 100° to about 1000° C.

Embodiment 47

The method of Embodiments 38-46, wherein the first temperature is about 100° to about 300° C.

Embodiment 48

The method of Embodiments 38-47, wherein the heating is for a time period of about 30 minutes to about 6 hours.

Embodiment 49

The method of Embodiments 38-48, wherein the time period is about 1 hour to about 3 hours.

Embodiment 50

The method of Embodiments 38-49, wherein prior to the contacting and the heating, the method further comprises: mixing a starting nanostructure with a solution comprising a salt and a solvent, wherein: the starting nanostructure has a first shape and comprises a first metal having a first redox potential, the salt comprises a counter-ion and a second metal having a second redox potential that is larger than the first redox potential, and the mixing results in replacing a fraction of the first metal by the second metal to form the nanostructure having a second shape that is substantially the same as the first shape.

Embodiment 51

A method comprising: mixing a starting nanostructure with a solution comprising a salt and a solvent, wherein: the starting nanostructure has a first shape and comprises a first metal having a first redox potential, the salt comprises a counter-ion and a second metal having a second redox potential that is larger than the first redox potential, the mixing results in replacing a fraction of the first metal by the second metal to form a nanostructure having a second shape that is substantially the same as the first shape, the nanostructure has an outer layer substantially covering an internal mass, and the internal mass has a first concentration of the first metal; contacting, with a first gas, the nanostructure; heating the nanostructure to a first temperature, wherein: the heating and the contacting cause the movement of a first portion of the first metal from the interior mass to the outside layer to create a first modified nanostructure, and the outside layer of the first modified nanostructure has a second concentration of the first metal that is higher than the first concentration of the first metal; treating, with a solution, the first modified nanostructure, wherein: the treating removes a second portion of the first metal from the outside layer to create a second modified nanostructure, and the outside layer of the second modified nanostructure has a third concentration of the first metal that is lower than the second concentration of the first metal; contacting, with a second gas, the second modified nanostructure; and heating the second modified nanostructure to a second temperature, wherein: the heating and the contacting of the second modified nanostructure cause the oxidation of a fraction of the first metal in the outside layer to create a final modified nanostructure.

What is claimed is:

1. A method comprising:
   a first mixing of a starting nanostructure consisting essentially of nickel with a solution comprising a platinum salt to produce by spontaneous Galvanic displacement a first nanostructure intermediate comprising platinum at a first concentration between 7.3 wt % and 16.4 wt % and nickel;
   a first annealing of the first nanostructure intermediate in the presence of a first gas comprising hydrogen ($H_2$) to produce a second nanostructure intermediate;
   a second mixing of the second nanostructure intermediate with an acid to produce a third nanostructure intermediate comprising platinum at a second concentration between 17.5 wt % and 40 wt %; and
   a second annealing of the third nanostructure intermediate in the presence of a second gas comprising oxygen ($O_2$) to produce a final nanostructure, wherein:
   the second nanostructure intermediate lacks the platinum (111) peak, when tested by x-ray diffraction.

2. The method of claim 1, wherein the starting nanostructure comprises at least one of a fiber, a wire, a filament, a thread, a whisker, a ribbon, or a helix.

3. The method of claim 2, wherein:
   the starting nanostructure has a length and a diameter, and the length and the diameter define an aspect ratio between 1:1 and 100:1.

4. The method of claim 3, wherein the diameter is between 200 nm and 300 nm.

5. The method of claim 3, wherein the length is between 100 μm and 200 μm.

6. The method of claim 1, wherein the acid comprises at least one of hydrochloric acid, acetic acid, nitric acid, or sulfuric acid.

7. The method of claim 1, wherein the platinum salt comprises at least one of potassium tetrachloroplatinate or dipotassium platinum hexachloride.

8. The method of claim 1, wherein the first mixing is performed at a temperature of about 90° C.

9. The method of claim 1, wherein the first annealing is performed at a temperature between 150° C. and 500° C.

10. The method of claim 1, wherein the first gas comprises $H_2$ at about 10 volume %.

11. The method of claim 1, wherein the second mixing is performed at about room temperature.

12. The method of claim 1, wherein the third nanostructure has a length between about 1 μm to about 100 μm.

13. The method of claim 1, wherein the second annealing is performed at a temperature of about 175° C.

14. The method of claim 1, wherein the second gas comprises $O_2$ at about 100 volume %.

15. The method of claim 1, wherein the final nanostructure has an oxygen reduction reaction activity between about 1000 mA $mg_{Pt}^{-1}$ and about 2500 mA $mg_{Pt}^{-1}$.

* * * * *